(12) United States Patent
Schierl et al.

(10) Patent No.: US 10,743,030 B2
(45) Date of Patent: *Aug. 11, 2020

(54) VIDEO DATA STREAM CONCEPT

(71) Applicant: GE VIDEO COMPRESSION, LLC, Albany, NY (US)

(72) Inventors: Thomas Schierl, Berlin (DE); Valeri George, Berlin (DE); Anastasia Henkel, Berlin (DE); Detlev Marpe, Berlin (DE); Karsten Grueneberg, Berlin (DE); Robert Skupin, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/392,785

(22) Filed: Apr. 24, 2019

(65) Prior Publication Data

US 2019/0253736 A1    Aug. 15, 2019

Related U.S. Application Data

(63) Continuation of application No. 15/928,742, filed on Mar. 22, 2018, which is a continuation of application
(Continued)

(51) Int. Cl.
*H04N 19/68*    (2014.01)
*H04N 19/167*    (2014.01)
(Continued)

(52) U.S. Cl.
CPC .......... *H04N 19/68* (2014.11); *H04N 19/167* (2014.11); *H04N 19/174* (2014.11);
(Continued)

(58) Field of Classification Search
CPC .... H04N 19/68; H04N 19/167; H04N 19/174; H04N 19/188; H04N 19/423;
(Continued)

(56) References Cited

U.S. PATENT DOCUMENTS 5,020,121 A    5/1991    Rosenberg
5,736,947 A    4/1998    Imanaka
(Continued)

FOREIGN PATENT DOCUMENTS

CN    1795680    6/2006
CN    1957617    5/2007
(Continued)

OTHER PUBLICATIONS

Notice of Allowance U.S. Appl. No. 14/510,264 dated Apr. 2, 2018.
(Continued)

*Primary Examiner* — Patricia I Young
(74) *Attorney, Agent, or Firm* — Pillsbury Winthrop Shaw Pittman LLP

(57) ABSTRACT

Decoder retrieval timing information, ROI information and tile identification information are conveyed within a video data stream at a level which allows for an easy access by network entities such as MANEs or decoder. In order to reach such a level, information of such types are conveyed within a video data stream by way of packets interspersed into packets of access units of a video data stream. In accordance with an embodiment, the interspersed packets are of a removable packet type, i.e. the removal of these interspersed packets maintains the decoder's ability to completely recover the video content conveyed via the video data stream.

18 Claims, 37 Drawing Sheets

Related U.S. Application Data

No. 14/578,814, filed on Dec. 22, 2014, now Pat. No. 9,973,781, which is a continuation of application No. PCT/EP2013/063853, filed on Jul. 1, 2013.

(60) Provisional application No. 61/666,185, filed on Jun. 29, 2012.

(51) Int. Cl.

| | | |
|---|---|---|
| *H04N 19/174* | (2014.01) | |
| *H04N 19/18* | (2014.01) | |
| *H04N 19/423* | (2014.01) | |
| *H04N 19/436* | (2014.01) | |
| *H04N 19/46* | (2014.01) | |
| *H04N 19/55* | (2014.01) | |
| *H04N 19/67* | (2014.01) | |
| *H04N 19/70* | (2014.01) | |
| *H04N 19/91* | (2014.01) | |
| *H04N 21/2343* | (2011.01) | |
| *H04N 21/462* | (2011.01) | |
| *H04N 21/4728* | (2011.01) | |
| *H04N 19/169* | (2014.01) | |
| *H04L 12/66* | (2006.01) | |
| *G06F 15/173* | (2006.01) | |
| *H04L 12/54* | (2013.01) | |
| *H04L 12/833* | (2013.01) | |
| *H04L 12/801* | (2013.01) | |

(52) U.S. Cl.
CPC ......... *H04N 19/188* (2014.11); *H04N 19/423* (2014.11); *H04N 19/436* (2014.11); *H04N 19/46* (2014.11); *H04N 19/55* (2014.11); *H04N 19/67* (2014.11); *H04N 19/70* (2014.11); *H04N 19/91* (2014.11); *H04N 21/234327* (2013.01); *H04N 21/4621* (2013.01); *H04N 21/4728* (2013.01); *G06F 15/173* (2013.01); *H04L 12/56* (2013.01); *H04L 12/66* (2013.01); *H04L 47/10* (2013.01); *H04L 47/31* (2013.01)

(58) Field of Classification Search
CPC ...... H04N 19/436; H04N 19/46; H04N 19/55; H04N 19/67; H04N 19/70; H04N 19/91; H04N 21/234327; H04N 21/4621; H04N 21/4728
USPC ..................................... 375/240.28
See application file for complete search history.

(56) References Cited

U.S. PATENT DOCUMENTS

| | | | |
|---|---|---|---|
| 5,786,858 | A | 7/1998 | Yagasaki et al. |
| 6,025,932 | A | 2/2000 | Imanaka |
| 6,646,578 | B1 | 11/2003 | Au |
| 7,093,028 | B1 | 8/2006 | Shao et al. |
| 7,305,036 | B2 | 12/2007 | MacInnis et al. |
| 7,440,626 | B2 | 10/2008 | Kong et al. |
| 7,522,935 | B2 | 4/2009 | Rey et al. |
| 7,738,560 | B2 | 6/2010 | Gordon et al. |
| 7,782,947 | B2 | 8/2010 | Jeon et al. |
| 7,884,743 | B2 | 2/2011 | Sakaguchi |
| 8,031,778 | B2 | 10/2011 | Kusakabe |
| 8,345,767 | B2 | 1/2013 | Nanbu et al. |
| 8,548,064 | B2 | 10/2013 | Kitahara et al. |
| 8,670,486 | B2 | 3/2014 | Hannuksela |
| 8,831,095 | B2 | 9/2014 | Koto et al. |
| 8,885,731 | B2 | 11/2014 | Tomo et al. |
| 9,131,033 | B2 | 9/2015 | Chen et al. |
| 9,185,439 | B2 | 11/2015 | Chen et al. |
| 9,930,562 | B2 | 3/2018 | Lumbatis |
| 2004/0223551 | A1 | 11/2004 | Hannuksela |
| 2006/0268859 | A1 | 11/2006 | Smith |
| 2007/0022215 | A1 | 1/2007 | Singer et al. |
| 2007/0036215 | A1 | 2/2007 | Pan et al. |
| 2007/0230574 | A1 | 10/2007 | Valente |
| 2008/0031346 | A1 | 2/2008 | Segall |
| 2008/0247459 | A1 | 10/2008 | Hu |
| 2008/0285657 | A1 | 11/2008 | Fu et al. |
| 2008/0288441 | A1 | 11/2008 | Lee et al. |
| 2008/0292003 | A1 | 11/2008 | Wang et al. |
| 2009/0010337 | A1 | 1/2009 | Wang |
| 2009/0010338 | A1 | 1/2009 | Wang |
| 2009/0022219 | A1 | 1/2009 | Goel |
| 2009/0028247 | A1 | 1/2009 | Suh et al. |
| 2009/0037959 | A1 | 2/2009 | Suh et al. |
| 2009/0097704 | A1 | 4/2009 | Savidge |
| 2009/0119730 | A1 | 5/2009 | Perman et al. |
| 2009/0213938 | A1 | 8/2009 | Lee et al. |
| 2009/0279604 | A1 | 11/2009 | Chono |
| 2010/0091837 | A1 | 4/2010 | Zhu et al. |
| 2010/0098155 | A1 | 4/2010 | Demircin et al. |
| 2010/0135416 | A1 | 6/2010 | Huang et al. |
| 2010/0208735 | A1 | 8/2010 | Wiegand |
| 2010/0238998 | A1 | 9/2010 | Nanbu et al. |
| 2010/0246662 | A1 | 9/2010 | Koto et al. |
| 2010/0246683 | A1 | 9/2010 | Webb et al. |
| 2010/0254620 | A1 | 10/2010 | Iwahashi |
| 2010/0296428 | A1 | 11/2010 | Ho |
| 2010/0322317 | A1 | 12/2010 | Yoshimatsu |
| 2011/0032999 | A1 | 2/2011 | Chen et al. |
| 2011/0069153 | A1 | 3/2011 | Nakane |
| 2011/0116542 | A1 | 5/2011 | Oger et al. |
| 2011/0200104 | A1 | 8/2011 | Korodi |
| 2011/0228858 | A1 | 9/2011 | Budagavi et al. |
| 2011/0317769 | A1 | 12/2011 | Tanaka |
| 2012/0014429 | A1 | 1/2012 | Zhao |
| 2012/0014434 | A1 | 1/2012 | Hong |
| 2012/0014451 | A1 | 1/2012 | Lee et al. |
| 2012/0014454 | A1 | 1/2012 | Budagavi et al. |
| 2012/0027316 | A1 | 2/2012 | Wang et al. |
| 2012/0081241 | A1 | 4/2012 | Misra |
| 2012/0082218 | A1 | 4/2012 | Misra |
| 2012/0082232 | A1 | 4/2012 | Sole Rojals et al. |
| 2012/0082235 | A1 | 4/2012 | Lou et al. |
| 2012/0086587 | A1 | 4/2012 | Sze |
| 2012/0163457 | A1* | 6/2012 | Wahadaniah ........ H04N 19/105 375/240.13 |
| 2012/0189049 | A1 | 7/2012 | Coban |
| 2013/0294506 | A1 | 11/2013 | Kang et al. |
| 2014/0161190 | A1 | 6/2014 | Park et al. |
| 2014/0205008 | A1* | 7/2014 | Wu ..................... H04N 19/593 375/240.12 |
| 2014/0341549 | A1 | 11/2014 | Hattori |

FOREIGN PATENT DOCUMENTS

| | | |
|---|---|---|
| CN | 101106711 | 1/2008 |
| CN | 101150719 A | 3/2008 |
| CN | 101283351 | 10/2008 |
| CN | 101385350 | 3/2009 |
| CN | 101553988 | 10/2009 |
| CN | 101568037 | 10/2009 |
| CN | 101677430 | 3/2010 |
| CN | 101553988 A | 9/2010 |
| CN | 101842988 | 9/2010 |
| CN | 101842988 A | 9/2010 |
| CN | 101889442 A | 11/2010 |
| CN | 10196085 A | 1/2011 |
| CN | 101939994 A | 1/2011 |
| CN | 102474655 | 5/2012 |
| EP | 1667460 | 6/2006 |
| GB | 2360163 | 9/2001 |
| JP | 2005-347780 | 12/2005 |
| JP | 2006180521 | 7/2006 |
| JP | 2008017331 | 1/2008 |
| JP | 2009510888 | 3/2009 |
| JP | 2009177787 | 8/2009 |
| JP | 2010516085 | 5/2010 |
| JP | 2010-232720 | 10/2010 |

(56) References Cited

FOREIGN PATENT DOCUMENTS

| | | |
|---|---|---|
| JP | 2011-223358 | 11/2011 |
| JP | 2013132048 | 7/2013 |
| JP | 2013535886 | 9/2013 |
| JP | 2013535900 | 9/2013 |
| JP | 2013536623 | 9/2013 |
| KR | 10-2006-0079051 | 7/2006 |
| RU | 2093968 | 10/1997 |
| RU | 2374786 | 11/2009 |
| RU | 2375839 | 12/2009 |
| RU | 2375839 C2 | 12/2009 |
| RU | 2384970 | 3/2010 |
| TW | 488155 | 5/2002 |
| TW | 527798 | 4/2003 |
| TW | 200926654 | 6/2009 |
| WO | 1997/005747 | 2/1997 |
| WO | 2003/043345 | 5/2003 |
| WO | 2008/030067 | 3/2008 |
| WO | 2010/050157 | 5/2010 |
| WO | 2011038021 | 3/2011 |
| WO | 2011/100456 | 8/2011 |
| WO | 2012/009566 | 1/2012 |
| WO | 2012/033673 | 3/2012 |
| WO | 2012/045037 | 4/2012 |
| WO | 2013063094 | 5/2013 |
| WO | 2013063425 A | 5/2013 |
| WO | 2013/161203 | 10/2013 |
| WO | 2013151634 | 10/2013 |

OTHER PUBLICATIONS

Non-final Office Action U.S. Appl. No. 14/510,264 dated Aug. 15, 2017.
Official Communication issued in corresponding International Application PCT/EP2013/057803, dated Oct. 31, 2013.
T. Wiegand et al., "Overview of the H.264/AVC Video Coding Standard", IEEE Transactions on Circuits and Systems for Video Technology, Jul. 2003, pp. 1-19.
B. Bross et al. "High Efficiency Video Coding (HEVC) Text Specification Draft 6", $8^{th}$ JCT-VC Meeting, ITU-T SG 16 WP3 and ISO/IEC JTC1/SC29/WG11, Document: JCTVC-H1003, Feb. 1-10, 2012, 259 pgs.
Series H: Audiovisual and Multimedia Systems, Infrastructure of Audiovisual Services—Transmission Multiplexing and Synchronization, "Information Technology—Generic Coding of Moving Pictures and Associated Audio Information: Systems", International Standard ISO/IEC 13818-1, ITU-T Recommendation H.222.0, 2012, 234 pgs.
B. Bross et al., "High Efficiency Video Coding (HEVC) Text Specification Draft 7", $9^{th}$ JCT-VC Meeting, ITU-T SG16 WP3 and ISO/IEC JTCI/SC29/WG11, Document JCTVC-I1003_d6, Apr. 27-May 7, 2012, 278 pgs.
M. Alvarez-Mesa et al., "Parallel Video Decoding in the Emerging HEVC Standard", IEEE ICASSP, 2012, pp. 1545-1548.
K. Misra et al., "Entropy Slices for Parallel Entropy Coding", $3^{rd}$ JCT-VC Meeting, ITU-T SG16 WP3 and ISO/IEC JTC1/SC29/WG11, Document: JCTVC-C256, Oct. 7-15, 2010, pp. 1-6.
H. Schulzrinne et al., "RTP: A Transport Protocol for Real-Time Applications" Network Working Group, Request for Comments: 3550, Obsoletes: 1889, Category: Standards Track, Jul. 2003, pp. 1-78.
T. Lee et al., "Simplification on Tiles and Slices", $8^{th}$ JC-VC Meeting, ITU-T SG16 WP3 and ISO/IEC JTC1/SC29/WG11, Document: JCTVC-H0348, Feb. 1-10, 2012, pp. 1-9.
T. Schierl et al., "Dependent Slices", $9^{th}$ JCT-VC Meeting, ITU-T SG16 WP3 and ISO/IEC JTC1/SC29/WG11, Document: JCTVC-I0229, Apr. 27-May 7, 2012, pp. 1-7.
G. Clare et al., "Wavefront Parallel Processing for HEVC Encoding and Decoding", $6^{th}$ JTC-VC Meeting, ITU-T SG16 WP3 and ISO/IEC JTC1/SC29/WG11, Document: JCTVC-F274, Jul. 14-22, 2011, pp. 1-16.

Y. Wang et al., "RTP Payload Format for H.264 Video", Internet Engineering Task Force, Request for Comments: 6184, Obsoletes: 3984, Category: Standards Track, ISSN: 2070-1721, May 2011, pp. 1-101.
S. Wenger et al., "RTP Payload Format for Scalable Video Coding", Internet Engineering Task Force, Request for Comments: 6190, Category: Standards Track, ISSN: 2070-1721, May 2011, pp. 1-100.
T. Schierl, et al., "RTP Payload Format for High Efficiency Video Coding Draft-Schierl-Payload-rtp-h265-03.txt", Network Working Group, Internet Draft, Intended Status: Standards Track, Jun. 11, 2013, pp. 1-69.
R. Skupin et al., "Generic HEVC High Level Syntax for Scalability and Adaption", $9^{th}$ JCT-VC Meeting, ITU-T SG16 WP3 and ISO/IEC JTC1/SC29/WG11, Document: JCTVC-I0217, Apr. 27-May 7, 2012, pp. 1-6.
J. Kang et al., "Simple NAL Unit Header for HEVC", $8^{th}$ JCT-VC Meeting, ITU-T SG16 WP3 and ISO/IEC JTC1/SC29/WG11, Document: JCTVC-H0410, Feb. 1-10, 2012, pp. 1-5.
J. Boyce et al., "High Level Syntax Hooks for Future Extensions", $8^{th}$ JCT-VC Meeting, ITU-T SG16 WP3 and ISO/IEC JCT1/SC29/WG11, Document: JCTVC-H0388, Feb. 1-10, 2012, pp. 1-8.
Y. Wang et al., "On SVC Scalability Information Related SEI Messages", $23^{rd}$ JCT-VC Meeting, ISO/IEC MPEG and ITU-T VCEG, (ISO/IEC JTC1/SC29/WG11 and ITU-T SG 16 Q 6), Document: JVT-W051, Apr. 21-27, 2007, pp. 1-14.
Y. Chen et al., "View Scalability Information SEI Message for MVC", $23^{rd}$ JCT-VC Meeting, ISO/IEC MPEG and ITU-T VCEG, (ISO/IEC JTC1/SC29/WG11 and ITU-T SG 16 Q. 6) Document: JVT-W037, Apr. 21-27, 2007, pp. 1-10.
Y. Wang et al., "Sub-Picture Based CPB Operation", $9^{th}$ JCT-VC Meeting, ITU-T SG16 WP3 and ISO/IEC JTC1/SC29/WG11, Document: JCTVC-I0588, Apr. 27-May 7, 2012, pp. 1-2.
Y. Wang et al., "Sub-Picture-Level Low-Delay CPB Behavior", $9^{th}$ JCT-VC Meeting, ITU-T SG16 WP3 and ISO/IEC JTC1/SC29/WG11, Document: JCTVC-I0349 Apr. 27-May 7, 2012, pp. 1-3.
B. Bross et al., "High Efficiency Video Coding (HEVC) Text Specification Draft 7", $9^{th}$ JCT-VC Meeting, ITU-T SG16 WP3 and ISO/IEC JTC1/SC29/WG11 Document: JCTVC-I1003_d0, Apr. 27-May 7, 2012, 268 pgs.
T. Schierl et al., "Slice Prefix for Sub-Picture and Slice Level HLS Signaling," $10^{th}$ JCT-VC Meeting, ITU-T SG16 WP3 and ISO/IEC JTC1/SC29/WG11, Document: JCTVC-J0255, Jul. 11-20, 2012, pp. 1-12.
Office Action and Search Report dated Jan. 28, 2016, issued in parallel Russian Patent Application No. 2014145559, with English translation, 6 pgs.
Office Action dated Feb. 23, 2016, issued in parallel Japanese Patent Application No. 2015-519177, with English translation, 29 pgs.
Sakae Okubo, (Supervisor), Impress Standard Textbook Series, Modified $3^{rd}$ ed. H.264/AVC Textbook, $1^{st}$ ed., Jan. 1, 2009, Impress R&D, Corporation, pp. 99-107, 185-193, ISBN: 978-4-8843-2664-9, 27 pgs.
Benjamin Bross et al., "High efficiency video coding (HEVC) text specification draft 7, [online], Jun. 12, 2012, Joint Collaborative Team in Video Coding (JVT-VC) of ITU-T SG 16 WP 3 and ISO/IEC JTC1/SC29/WG11", Document: JCTVC-I1003_d4, searched on Feb. 9, 2016, Internet <URL: http://phenix.it-sudparis.eu/jct/doc_end_user/documents/9_Geneva/wg11/JCTVC-I1003-v5.zip, 297 pgs.
Office Action issued in parallel Japanese Patent Application No. 2015-504979 dated Nov. 17, 2015 with English translation, 26 pgs.
G. Clare et al., "Wavefront Parallel Processing for HEVC Encoding and Decoding", [online] Jul. 16, 2011, Joint Collaborative Team on Video Coding (JCT-VC) of ITU-T SG16 WP3 and ISO/IEC JTC1/SC29/WG11, Document: JCTVC-F274 (version 2), [Searched on Nov. 16, 2015], 21 pgs.
Xun Guo et al., "Ordered Entropy Slices for Parallel CABAC", [online], May 2, 2009, ITU-Telecommunications Standardization Sector Study Group 16 Question 6, Document: VCEG-AK25 (Filename:VCEG-AK25_r1.doc) [Searched on Nov. 16, 2015], 11 pgs.
Tammy Lee et al., "Simplification on tiles and slices", [online], Feb. 1, 2011, Joint Collaborative Team on Video Coding (JCT-VC) of

(56) References Cited

OTHER PUBLICATIONS

ITU-T SG16 WP3 and ISO/IEC JTC1/SC29/WG11, Document: JCTVC-H0348 (verison 3), [Searched on Nov. 16, 2015], 15 pgs.
Mauricio Alvarez-Mesa et al., "Parallel Video Decoding in the Emerging HEVC Standard" Proceedings of 2012 IEEE Int. Conf. on Acoustics, Speech, and Signal Processing (ICASSP), Mar. 30, 2012, pp. 1545-1548, ISBN:978-1-4673-0045-2; 4 pgs.
Hendry Sangoh Jeong et al., "AHG4: Harmonized Method for Signalling Entry Points of Tiles and WPP Substreams", [online], Feb. 10, 2011, Joint Collaborative Team on Video Coding (JCT-VC) of ITU-T SG16 WP3 and ISO/IEC JTC1/SC29/WG11, [Searched Nov. 16, 2015], 12 pages.
Office Action dated Apr. 4, 2016, issued in parallel Russian Application No. 2015102812, with English translation, 11 pgs.
Y.K. Wang et al., "Sub-picture-level low-delay CPB behavior" JCTVC-I0349, publ. May 4, 2010 30 pgs [found Mar. 25, 2016] Internet URL:http://phenix-it.subparis.eu/jct/doc_end_user/current_document.php?id=5607 text of the article found URL: http://phenix.it-subparis.eu/jct/doc_end_user/documents/9_Geneva/wg11/JCTVC-10349-VL.IP, sections "Abstract", "1.1. Video applications and end-to-end delay", "1.2 Hypothetical reference decoder: (HRD)", "1.3 Sub-picture based coded picture buffer (CPB) behavior" and "2 Proposal", 19 pgs.
European Search Report issued in European Application 16200327.1 dated Feb. 6, 2017.
Ye-Kui Wang et al., "AHG4: Tile groups" 7. JCT-VC Meeting; 98, MPEG Meeting; Nov. 21, 2011-Nov. 30, 2011; Geneva (Joint Collaborative Team on Video Coding of ISO/IEC JTC1/SC29/WG11 and ITU-T SG.16); URL: http://wftp3 itu.int/av-arch/jctvc-site/, No. JCTVC-G318, Nov. 9, 2011, XP030110302.
Fuldseth (Cisco) A: "Replacing slices with tiles for high level parallelism", JCT-VC Meeting; 95.MPEG Meeting; Jan. 20, 2011-Jan. 28, 2011, Daegu (Joint Collaborative Team on Video Coding of ISO/IEC JTC1/SC29/WG11and ITU-T SG.16); URL: http://wftp3.itu.int/av-arch/jctvc-site/, No. JCTVC-0227, Jan. 15, 2011 XP030008267, ISSN: 0000-0013.
Office Action issued in Korean Application 10-2016-7034316 dated Jan. 4, 2017.
Benjamin Bross et al., "High efficiency video coding (HEVC) text specification draft 6", (JCTVC-H1003_dj), JCT-VC of ITU-T SG16 WP3 and ISO/IEC JTC1/SC29/WG11, $7^{th}$ Meeting: Geneva, CH, Feb. 17, 2012.
P. Lambert et al.,"11 Flexible macroblock ordering in H.264/AVC", Journal of Visual Communication and Image Representation, Academic Press, Inc., US, vol. 17, No. 2, Apr. 1, 2006, pp. 358-375, XP024905097, ISSN: 1047-3203, DOI: 10.1016/J.JVCI R 2005.05. 008.
Office Action dated Feb. 24, 2017 in Taiwanese Patent Application No. 105130457.
Office Action dated Mar. 16, 2017 in European Patent Application No. 16206334.1.
M. Coban et al., "AHG4: Unification of picture partitioning schemes", 7. JCT-VC Meeting, 98, MPEG Meeting, Geneva, Nov. 2011 (Joint Collaborative Team on Video Coding of ISO/IEC JTC1/SC29/WG11 and ITU-T SG.16), URL: http://wftp3itu.int/av-arch/jctvc-site/, No. JCTV-G315, XP030110299.
Ching Chi C. et al., "A QHD-capable parallel H.264 decoder", Supercomputing, ACM, New York, May 2011, pp. 317-326, XP058003741, DOI: 10.1145/1995896 1995945, ISBN 978-1-4503-0102-2.
C. Gordon et al., "Wavefront Parallel Processing for HEVC Encoding and Decoding", 6, JCT-VC Meeting, 97. MPEG Meeting, Torino, Jul. 2011 (Joint Collaborative Team on Video Coding of ISO/IEC JTC1/SC29/WG11 and ITU-T SG.16) http://wftp3.itu.int/av-arch/jctvc-site/, No. JCTVC-F274.
Decision to Grant dated Mar. 21, 2017 in Japanese Application 2015-504980.
Sakai Okubo, "Impress Standard Textbook Series, revision $3^{rd}$ ed. H264/AVC Textbook", Japan Impress R&D Co., Ltd. Jan. 1, 2009, $1^{st}$ ed. pp. 315-319, ISBN:978-4-8443-2664-9.

R. Sjoberg et al., "NAL unit header concept with support for bit stream scalability" [online] Joint Collaborative Team on Video Coding (JCT-VC) of ITU-T SG16 WP3 and ISO/IEC JTC1/SC29/WG11, Mar. 19, 2011, Document: JCTVC-E422, [Searched on Oct. 2, 2013], Internet URL: http://phenix.it-sudparis.eu/jct/doc_end_user/documents/5_Geneva/wg11/JCTVC-E422-V2.Zip.
"H-264 (Jan. 2012)", [online], ITU-T, Jan. 13, 2012, p. 605, 606, 630-632, 646-649 [Searched on Aug. 12, 2-15], URL:https://www.itu.int/rec/dologin_pub.asp?lang=e&id=T-REC-H.264-201201-S!!PDF-E&type=items.
R. Sjoberg et al., "High-Level Syntax for Bitstream Extraction", [online], Joint Collaborative Team on Video Coding (JCT-VC) of ITU-TSG16 WP3 and ISO/IEC JTC1/SC29/WG11, Nov. 26, 2011, Document: JCTVC-G607, [Searched on Nov. 8, 2013], Internet URL:http://phenix.it-subparis.eu/jct/doc_end_user/documents/7_Geneva/wg11/JCTVC-G607-v2.zip.
J. Boyce et al., "Information for scalable Extension highly layer syntax", [online], Joint Collaborative Team on Video Coding (JCT-VC) of ITU-T SG16 WP3 and ISO/IEC JTC1/SC29/WG11, Jan. 25, 2012, Document: JCTVC-H0386, [Searched on Dec. 20, 2013] Internet URL: http://phenix.it-subparis.eu/jct/doc_end_user/documents/8_San%20Jose/wg11/JCTVC-H0386-v3.zip.
Office Action dated Mar. 24, 2017 in Chinese Application No. 201380031293.3.
Office Action dated Apr. 1, 2017 in Chinese Application No. 201380034944.4.
Office Action May 3, 2017 in Chinese Application No. 201380031308. 6.
Office Action dated Jun. 22, 2017 in Australian Application 2016204304.
Schwarz et al., "Overview of the Scalable Video Coding Extension of the H.264/AVC Standard", IEEE Transactions on Circuits and Systems for Video Technology, vol. 17, No. 9, Sep. 2007.
Office Action dated May 26, 2017 U.S. Appl. No. 14/511,200.
Office Action dated Jun. 20, 2017 in Japanese Patent Application No. 2016-160844.
T. Schierl et al., Dependent slices support in HEVC main profile, Joint Collaborative Team on Video Coding (JCT-VC) of ITU-T SG16 WP3 and ISO/IEC JTC1/SC29/WG11, $10^{th}$ Meeting: Stockholm, SE, Jul. 11-Jul. 20, 2012, Jul. 2, 2012, JCTVC-J0264, URL: http://phenix-it-subparis.eu/jct/doc_end_user/documents/10-Stockholm/wg11/jctvc-j0264-v1.zip.
Chih-Wei Hsu et al., AHG4: Wavefront tile parallel processing, Joint Collaborative Team on Video Coding (JCT-VC) of ITU-T SG16 WP3 and ISO/IEC JTC1/SC29/WG11, $7^{th}$ Meeting: Geneva, CH, Nov. 21-30, 2011, Nov. 27, 2011, JCTVC-G199 URL: http://phenix-it-sudparis.eu/jct/doc_end_user/documents/7-Geneva/wg11/JCTVC-G199-v6.zip.
Decision to Grant dated Sep. 11, 2017 in Korean Application No. 10-2016-7034316.
Kiran Misra et al., "Entropy slices for parallel entropy coding", JCT-VC of ITU-T SG16 WP3 and ISO/IEC JTC1/SC29/WG11, $2^{nd}$ Meeting: Geneva CH Jul. 21-28, 2010, Document: JCTVC-B111.
Office Action dated Jan. 8, 2018 in U.S. Appl. No. 14/511,200.
Search Report dated Nov. 30, 2017 in Taiwanese Application 116111143.
Office Action dated Dec. 12, 2017 in Japanese Application 2017-019898.
MenHuang Lee et al., "ROI Slice SEI message", Joint Video Team (JVT) of ISO/IEC MPEG & ITU-T VCED (ISO/IEC TCT1/SC29/WG11 and ITU-T SG16 Q.6), $18^{th}$ Meeting: Bangkok, Thailand, Jan. 2006, JVT-R024, pp. 1-8.
MenHuang Lee et al., "ROI Slice SEI message", Joint Video Team (JVT) of ISO/IEC MPEG & ITU-T VCED (ISO/IEC JTC1/SC29/WG11 and ITU-T SG16 Q.6), $19^{th}$ Meeting: Geneva, Switzerland, Apr. 2006, JVT-S054r1, pp. 1-13.
Ye-Kui Wang et al., "Tile groups", Joint Collaborative Team on Video Coding (JCT-VC) of ITU-T SG16 WP3 and ISO/IEC JTC1/SC29/WG11, $8^{th}$ Meeting: San Jose, CA, USA Jan. 2012, JCTVC-H0520r1, pp. 1-8.
R. Skupin et al., "Tile-based region-of-interest signaling with sub-picture SEI messages" Joint Collaborative Team on Video Coding (JCT-VC) of ITU-T SG16 WP3 and ISO/IEC JTC1/SC29/WG11, $11^{th}$ Meeting: Shanghai, CN, Oct. 2012, JCTVC-K0218, pp. 1-3.

(56) References Cited

OTHER PUBLICATIONS

Office Action dated Dec. 26, 2017 in Japanese Application No. 2017-019896.
Yoshihisa Yamada et al., "Standardization trend of High-quality Video Coding Technics", Mitsubishi Electric Technical Report, Japan, Mitsubishi Electric Engineering Company Limited, Dec. 25, 2008, vol. 82, No. 12, pp. 7-10.
Office Action dated Dec. 1, 2017 in Taiwanese Application No. 106110824.
Examination Report issued in corresponding Canadian Patent Application No. 2,877,045 dated Apr. 23, 2018.
Muhammed Coban et al., "On Entropy Slices", Joint Collaborative Team on Video Coding (JCT-VC) of ITU-T SG16 WP3 and ISO/IEC JTC1/SC29/WG11, 8th Meeting: San Jose, CA, USA Jan. 2012, JCTVC-H0515r2, pp. 1-7.
Felix Henry et al, "Wavefront Parallel Processing", Joint Collaborative Team on Video Coding (JCT-VC) of ITU-T SG16 WPO3 and ISO/IEC JTC1/SC29/WG11, 5th Meeting: Geneva, CH, Mar. 2011, JCTVC-E196, pp. 1-9.
Gordon Clare et al., "Wavefront and Cabac Flush: Different Degrees of Parallelism Without Transcoding", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F275, pp. 1-11.
Kiran Misra et al., "Harmonization of Entry Points for Tiles and Wavefront Processing", Joint Collaborative Team on Video Coding (JCT-VC) of ITU-T SG16 WP3 and ISO/IEC JTC1/SC29/WG11, 7th Meeting: Geneva, CH, Nov. 2011, JCTVC-G722-r1, pp. 1-4.
Notification of Reasons for Refusal Japanese Patent Application No. 2016-160844 dated Apr. 24, 2018 with English translation.
Non-final Office Action U.S. Appl. No. 15/928,742 dated Jul. 15, 2018.
Notice of Allowance U.S. Appl. No. 14/511,200 dated Jun. 22, 2018.
Notification of the First Office Action Chinese Patent Application No. 2016104209369 dated Jun. 27, 2018 with English translation.
Notification of the First Office Action Chinese Patent Application No. 2016104229593 dated Jul. 3, 2018 with English translation.
Notification of the First Office Action Chinese Patent Application No. 2016104153556 dated Jul. 2, 2018 with English translation.
Office Action Russian Patent Application No. 2016141337/08(066168) dated Aug. 16, 2018 with English translation.
Notification of Reasons for Refusal Japanese Patent Application No. 2017-019896 dated Jul. 17, 2018 with English translation.
Kimihiko Kazui et al., AHG9: Improvement of HRD for sub-picture based operation, Joint Collaborative Team on Video Coding (JCT-VC) of ITU-T SG16 WP3 and ISO/IEC JTC1/SC/29/EG11, 10th Meeting: Stockholm, SE, Jul. 2012, JCTVC-J0136, pp. 1-10.
Non-final Office Action U.S. Appl. No. 16/153,307 dated Dec. 11, 2018.
Jie Zhao, Parallel entropy decoding for high resolution video coding, Visual Communications and Image Processing 2009, p. 1-12.
Notification of Reasons for Refusal Japanese Patent Application No. 2016-160844 dated Nov. 20, 2018.
Notice of Acceptance of Application dated Jan. 7, 2019 issued in Australian Patent Application No. 2016259446.
Office Action dated Dec. 26, 2018 issued in India Patent Application No. 2390/KOLNP/2014.
Notice of Allowance U.S. Appl. No. 15/928,742 dated Jan. 24, 2019.
Extended European Search Report EP Application No. 18211768.9 dated Feb. 27, 2019.
Notice of Allowance Taiwanese Patent Application No. 2107128325 dated Mar. 29, 2019.
Notification of Reasons for Refusal Japanese Patent Application No. 2017-019896 dated Feb. 20, 2019.
Notification to Grant Chinese Patent Application No. 201380031293.3 dated Jul. 3, 2019 with English translation.
Notice of Allowance Philippines Patent Application No. 1/2017/501901 dated Jul. 3, 2019.
Notice of Allowance Philippines Patent Application No. Jan. 2017/501900 dated Jul. 3, 2019.
Office Action Korean Patent Application No. 10-2019-7014099 dated Jul. 3, 2019 with English translation.
Office Action Korean Patent Application No. 10-2019-7014098 dated Jul. 3, 2019 with English translation.
Office Action Korean Patent Application No. 10-2019-7014097 dated Jul. 3, 2019 with English translation.
Office Action India Patent Application No. 3035/KOLNP/2014 dated Jul. 16, 2019 with English translation.
Sullivan et al., "Meeting Report of the ninth meeting of the Joint Collaborative Team on Video Coding (JCT-VC)", Joint Collaborative Team on Video Coding (JCT-VC) of ITU-T SG16 WP3 and JTC1/SC29/WG11 9th Meeting: Geneva, CH, Apr. 27-May 7, 2012, pp. 1-239.
Office Action Taiwanese Patent Application No. 107125227 dated Jun. 28, 2019 with English translation.
Office Action Israeli Patent Application No. 261382 dated May 26, 2019 with English translation.
Decision to Grant Japanese Patent Application No. 2016-160844 dated Jun. 18, 2019 with English translation.
Notice of Allowance U.S. Appl. No. 16/153,307 dated Apr. 24, 2019.
Office Action dated Aug. 14, 2019 in U.S. Appl. No. 16/514,052.
Notice of Allowance dated Jul. 29, 2019 in Philippine Application 12017501899.
Office Action dated Aug. 22, 2019 in Israeli Application 268801.
Decision to Grant dated Sep. 10, 2019 in Japanese Application 2017-019896.
Office Action dated Sep. 10, 2019 in Korean Application 10-2018-7002787.
Office Action dated Sep. 11, 2019 in Australian Application 2018236689.
ITU-T H.222.0, Series H: Audiovisual and Multimedia Systems, Infrastructure of Audiovisual Services-Coding of Moving Video, Advanced Video Coding for Generic Audiovisual Services, Mar. 2005.
Schierl, T. et al., "Dependent Slices," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012.
Office Action dated Oct. 30, 2019 in U.S. Appl. No. 16/025,319.
Notice of Allowance dated Dec. 10, 2019 in U.S. Appl. No. 16/153,307.
Office Action dated Oct. 15, 2019 in Russian Patent Application 2016141337.
Decision to Grant dated Nov. 15, 2019 in Korean Application 10-2019-7014097.
Decision to Grant dated Nov. 15, 2019 in Korean Application 10-2019-7014098.
Office Action dated Nov. 26, 2019 in Mexican Application MX/a/2017/009967.
Notice of Allowance dated Dec. 12, 2019 in U.S. Appl. No. 16/514,052.
Office Action dated Nov. 25, 2019 in Philippine Application 1-2019-512219.
Office Action dated Dec. 10, 2019 in Australian Application 2019202551.
Decision to Grant dated Jan. 3, 2020 in Korean Application 10-2019-7014099.
Office Action dated Nov. 26, 2019 in Japanese Application 2018-207464.
Office Action dated Jan. 9, 2020 in Russian Application 2019141081.
Office Action dated Feb. 25, 2020 in Chinese Application 201810340437.8.
Decision to Grant dated Feb. 28, 2020 in Russian Application 2017137234.
Office Action dated Mar. 24, 2020 in Chinese Application 201810340438.2.
Office Action dated Mar. 24, 2020 in Chinese Application 201810340459.4.
Office Action dated May 9, 2020 in Singapore Application 10201809547W.
Kazui Kimihiko, et al., "Enhancement on operation of coded picture buffer", Joint Collaborative Team on Video Coding (JCT-VC) of

(56) References Cited

OTHER PUBLICATIONS

ITU-T SG16 WP 3 and ISO/IEC JTC1/SC291WG11, 7th Meeting: Geneva, CH, JCTVC-G188. Nov. 30, 2011.
Notice of Allowance dated May 27, 2020 in Canadian Application 2877045.
Office Action dated Apr. 8, 2020 in Chinese Application 201810340463.0.
Office Action dated Apr. 8, 2020 in Korean Application 10-2020-7004531.
Office Action dated Apr. 21, 2020 in U.S. Appl. No. 16/819,652.
Office Action dated May 18, 2020 in U.S. Appl. No. 16/514,052.

* cited by examiner

| buffering_period( payloadSize ) { | Descriptor |
|---|---|
|   seq_parameter_set_id | ue(v) |
|   if( !sub_pic_cpb_params_present_flag ) | |
|     rap_cpb_params_present_flag | u(1) |
|   if( NalHrdBpPresentFlag ) { | |
|     for( SchedSelIdx = 0; SchedSelIdx <= cpb_cnt_minus1; SchedSelIdx++ ) { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag \|\| | |
|         rap_cpb_params_present_flag ) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
|   if( VclHrdBpPresentFlag ) { | |
|     for( SchedSelIdx = 0; SchedSelIdx <= cpb_cnt_minus1; SchedSelIdx++ ) { | |
|       initial_cpb_removal_delay[ SchedSelIdx ] | u(v) |
|       initial_cpb_removal_delay_offset[ SchedSelIdx ] | u(v) |
|       if( sub_pic_cpb_params_present_flag \|\| | |
|         rap_cpb_params_present_flag) { | |
|         initial_alt_cpb_removal_delay[ SchedSelIdx ] | u(v) |
|         initial_alt_cpb_removal_delay_offset[ SchedSelIdx ] | u(v) |
|       } | |
|     } | |
|   } | |
| } | |

FIG.1

| pic_timing( payloadSize ) { | Descriptor |
|---|---|
|   if( CpbDpbDelaysPresentFlag ) { | |
|     cpb_removal_delay | u(v) |
|     dpb_output_delay | u(v) |
|     if( sub_pic_cpb_params_present_flag ) { | |
|       num_decoding_units_minus1 | ue(v) |
|       for( i = 0; i <= num_decoding_units_minus1; i++ ) { | |
|         num_nalus_in_du_minus1[ i ] | ue(v) |
|         du_cpb_removal_delay[ i ] | u(v) |
|       } | |
|     } | |
|   } | |
| } | |

FIG.2

| vui_parameters( ) { | Descriptor |
|---|---|
| aspect_ratio_info_present_flag | u(1) |
| if( aspect_ratio_info_present_flag ) { | |
| aspect_ratio_idc | u(8) |
| if( aspect_ratio_idc = = Extended_SAR ) { | |
| sar_width | u(16) |
| sar_height | u(16) |
| } | |
| } | |
| overscan_info_present_flag | u(1) |
| if( overscan_info_present_flag ) | |
| overscan_appropriate_flag | u(1) |
| video_signal_type_present_flag | u(1) |
| if( video_signal_type_present_flag ) { | |
| video_format | u(3) |
| video_full_range_flag | u(1) |
| colour_description_present_flag | u(1) |
| if( colour_description_present_flag ) { | |
| colour_primaries | u(8) |
| transfer_characteristics | u(8) |
| matrix_coefficients | u(8) |
| } | |
| } | |
| chroma_loc_info_present_flag | u(1) |
| if( chroma_loc_info_present_flag ) { | |
| chroma_sample_loc_type_top_field | ue(v) |
| chroma_sample_loc_type_bottom_field | ue(v) |
| } | |
| neutral_chroma_indication_flag | u(1) |

FIG.3A

| | |
|---|---|
| field_seq_flag | u(1) |
| timing_info_present_flag | u(1) |
| if( timing_info_present_flag ) { | |
|    num_units_in_tick | u(32) |
|    time_scale | u(32) |
|    fixed_pic_rate_flag | u(1) |
| } | |
| nal_hrd_parameters_present_flag | u(1) |
| if( nal_hrd_parameters_present_flag ) | |
|    hrd_parameters( ) | |
| vcl_hrd_parameters_present_flag | u(1) |
| if( vcl_hrd_parameters_present_flag ) | |
|    hrd_parameters( ) | |
| if(nal_hrd_parameters_present_flag \|\| vcl_hrd_parameters_present_flag) | |
|    low_delay_hrd_flag | u(1) |
|    sub_pic_cpb_params_present_flag | u(1) |
|    if( sub_pic_cpb_params_present_flag ) | |
|       num_units_in_sub_tick | u(32) |
| } | |
| bitstream_restriction_flag | u(1) |
| if( bitstream_restriction_flag ) { | |
|    tiles_fixed_structure_flag | u(1) |
|    motion_vectors_over_pic_boundaries_flag | u(1) |
|    max_bytes_per_pic_denom | ue(v) |
|    max_bits_per_mincu_denom | ue(v) |
|    log2_max_mv_length_horizontal | ue(v) |
|    log2_max_mv_length_vertical | ue(v) |
| } | |
| } | |

FIG.3B

| | Descriptor |
|---|---|
| hrd_parameters( ) { | |
|   cpb_cnt_minus1 | ue(v) |
|   bit_rate_scale | u(4) |
|   cpb_size_scale | u(4) |
|   for( SchedSelIdx = 0; SchedSelIdx <= cpb_cnt_minus1; SchedSelIdx++ ) { | |
|     bit_rate_value_minus1[ SchedSelIdx ] | ue(v) |
|     cpb_size_value_minus1[ SchedSelIdx ] | ue(v) |
|     cbr_flag[ SchedSelIdx ] | u(1) |
|   } | |
|   initial_cpb_removal_delay_length_minus1 | u(5) |
|   cpb_removal_delay_length_minus1 | u(5) |
|   dpb_output_delay_length_minus1 | u(5) |
|   time_offset_length | u(5) |
| } | |

FIG.4

| filler_data_rbsp( ) { | Descriptor |
|---|---|
|    while( next_bits( 8 ) == 0xFF ) | |
|       ff_byte /* equal to 0xFF */ | f(8) |
|    rbsp_trailing_bits( ) | |
| } | |

| slice_header( ) { | Descriptor |
|---|---|
|   first_slice_in_pic_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( RapPicFlag ) { | |
|       rap_pic_id | ue(v) |
|       no_output_of_prior_pics_flag | u(1) |
|     } | |
|     if( !IdrPicFlag ) { | |
| .... | |
|   } | |
|   if( tiles_or_entropy_coding_sync_idc == 1 \|\| | |
|     tiles_or_entropy_coding_sync_idc == 2 ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset[ i ] | u(v) |
|     } | |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte | u(8) |
|   } | |
|   byte_alignment( ) | |
| } | |

FIG.8

| pic_parameter_set_rbsp( ) { | Descriptor |
|---|---|
|   pic_parameter_set_id | ue(v) |
|   seq_parameter_set_id | ue(v) |
|   sign_data_hiding_flag | u(1) |
|   if( sign_data_hiding_flag ) | |
|     sign_hiding_threshold | u(4) |
|   cabac_init_present_flag | u(1) |
|   num_ref_idx_l0_default_active_minus1 | ue(v) |
|   num_ref_idx_l1_default_active_minus1 | ue(v) |
| [Ed. (BB): not present in HM software ] | |
|   pic_init_qp_minus26 | se(v) |
|   constrained_intra_pred_flag | u(1) |
|   slice_granularity | u(2) |
|   diff_cu_qp_delta_depth | ue(v) |
|   cb_qp_offset | se(v) |
|   cr_qp_offset | se(v) |
|   weighted_pred_flag | u(1) |
|   weighted_bipred_idc | u(2) |
|   output_flag_present_flag | u(1) |
|   transquant_bypass_enable_flag | u(1) |
|   dependent_slice_enabled_flag | u(1) |
|   tiles_or_entropy_coding_sync_idc | u(2) |
|   if( tiles_or_entropy_coding_sync_idc == 1 ){ | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width[ i ] | ue(v) |
|       for( i = 0; i < num_tile_rows_minus1; i++ ) | |
|         row_height[ i ] | ue(v) |
|     } | |
|     loop_filter_across_tiles_enabled_flag | u(1) |
|   } else if( tiles_or_entropy_coding_sync_idc == 3 ) | |
|     cabac_independent_flag | u(1) |
|   ... | |
| } | |

FIG.9

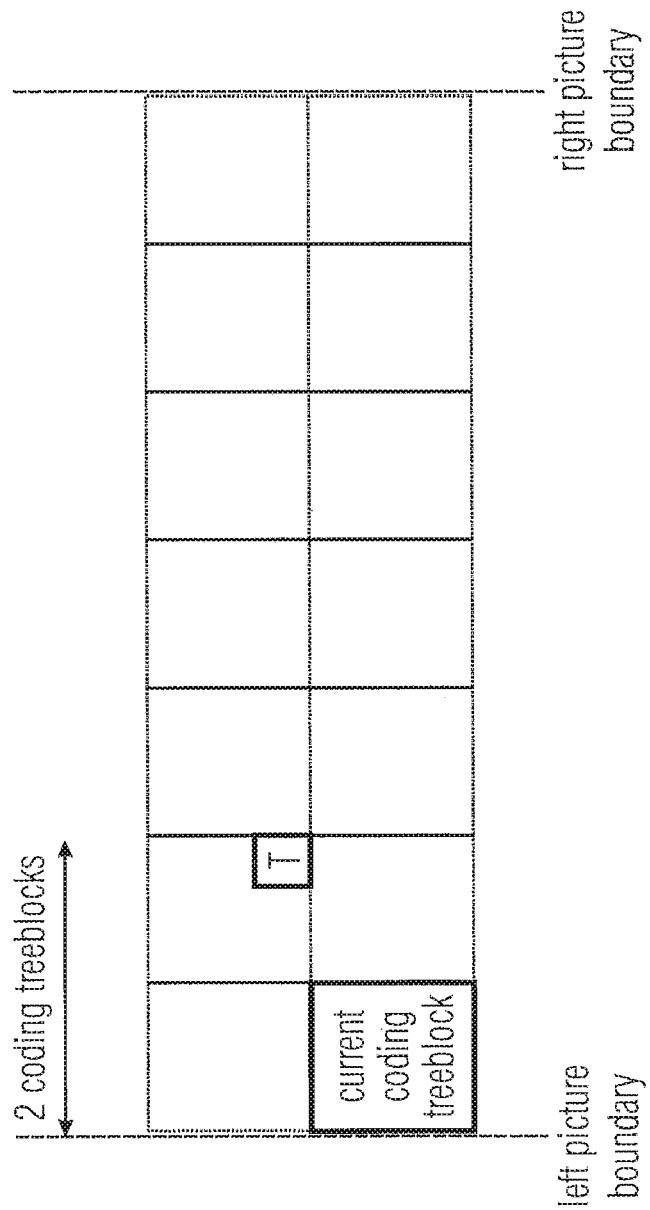

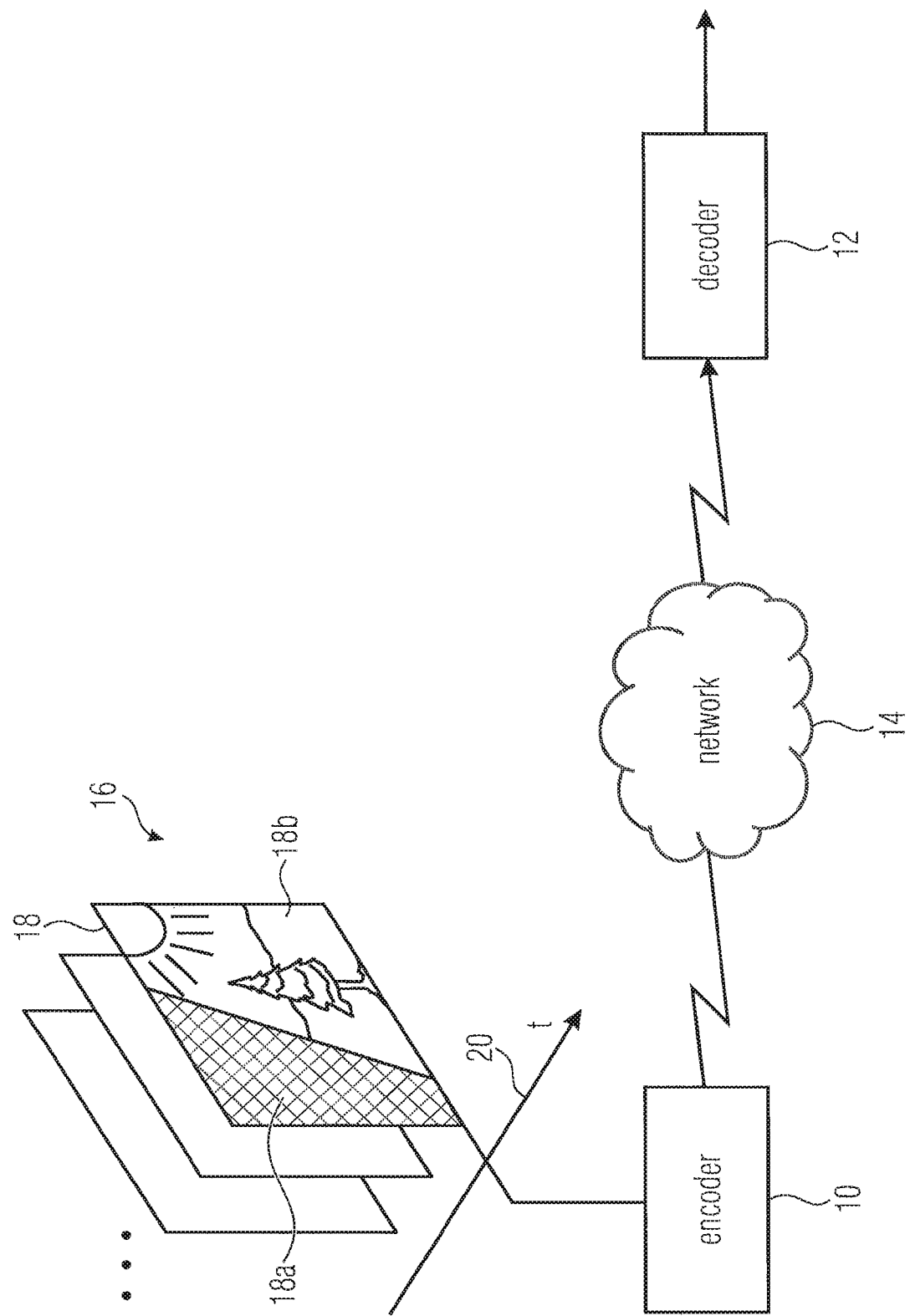

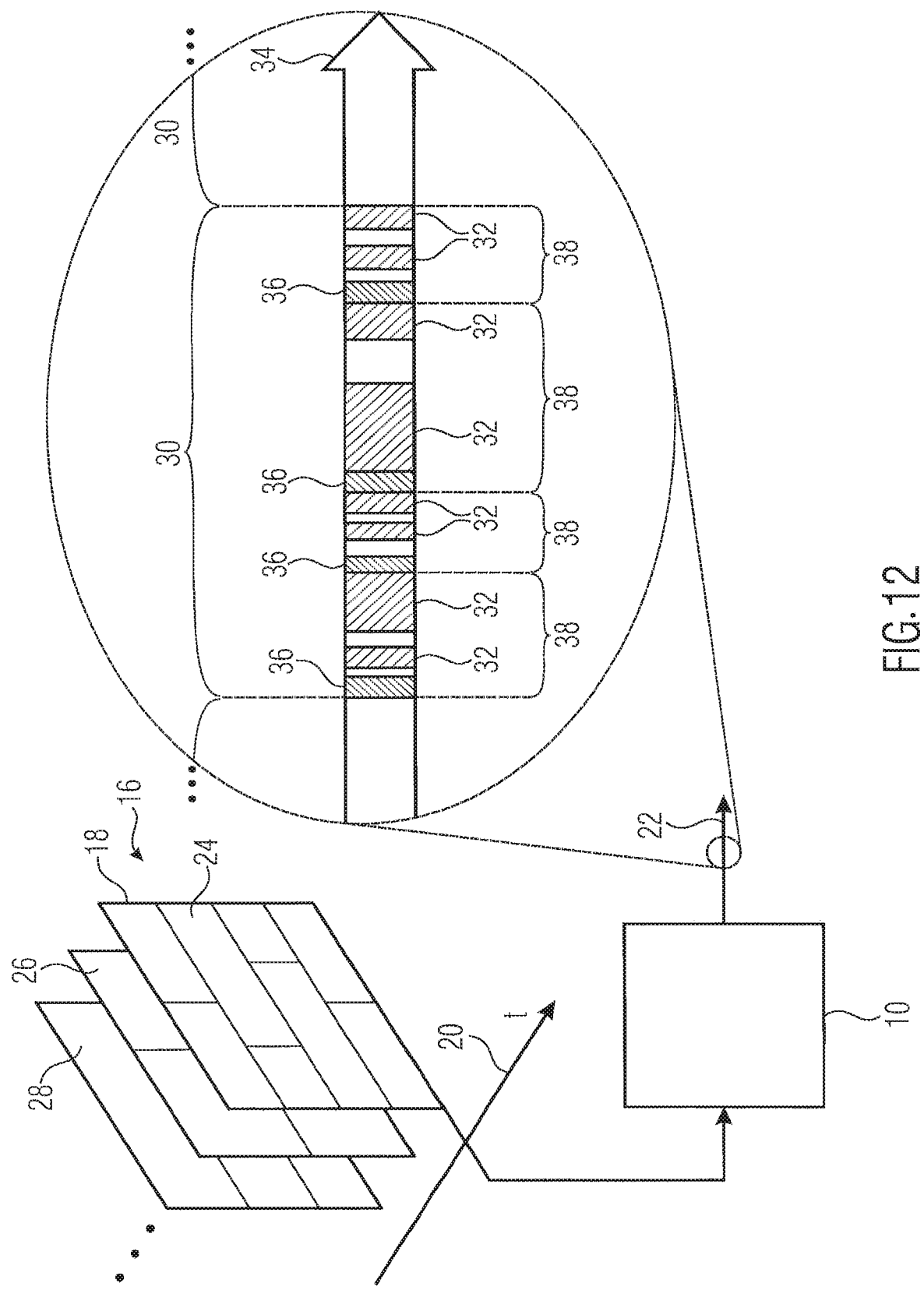

| slice_prefix_rbsp( ) { | Descriptor |
|---|---|
|    reserved_one_8bits | u(8) |
|    do | |
|       sei_message( ) | |
|    while( more_rbsp_data( ) ) | |
|    rbsp_trailing_bits( ) | |
| } | |

FIG.19

| slice_prefix_rbsp( ) { | Descriptor |
|---|---|
|    slice_prefix_id | u(2) |
|    rap_flag | u(1) |
|    decoding_unit_start_flag | u(1) |
|    single_slice_flag | u(1) |
|    tile_idc | u(2) |
|    prefix_slice_header_data_present_flag | u(1) |
|    if( prefix_slice_header_data_present_flag ) | |
|       slice_header_data() | |
|    if( tile_idc > 0 ) { | |
|       if( tile_idc == 2 ) /* multiple tiles in prefixed slices */ | |
|          num_tiles_in_prefixed_slices_minus1 | u(16) |
|       first_tile_id_in_prefixed_slices | u(16) |
|    } | |
|    do | |
|       sei_message( ) | |
|    while( more_rbsp_data( ) ) | |
|    rbsp_trailing_bits( ) | |
| } | |

FIG.20

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |
| 9..23 | Reserved | n/a |
| 24 | Slice Prefix NAL unit | non-VCL |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32..47 | Reserved | n/a |
| 48..63 | Unspecified | non-VCL |

FIG.21

| slice_header( ) { | Descriptor |
|---|---|
|    first_slice_in_pic_flag | u(1) |
|    ~~pic_parameter_set_id~~ | ~~ue(v)~~ |
|    if( !first_slice_in_pic_flag ) | |
|       slice_address | u(v) |
|    if( dependent_slice_enabled_flag && !first_slice_in_pic_flag ) | |
|       dependent_slice_flag | u(1) |
|    slice_header_data_present_flag | u(1) |
|    if ( slice_header_data_present_flag && !dependent_slice_flag ) | |
|       slice_header_data() | |
|    if( tiles_or_entropy_coding_sync_idc == 1 \|\| | |
|       tiles_or_entropy_coding_sync_idc == 2 ) { | |
|       num_entry_point_offsets | ue(v) |
|       if( num_entry_point_offsets > 0 ) { | |
|          offset_len_minus1 | ue(v) |
|          for( i = 0; i < num_entry_point_offsets; i++ ) | |
|             entry_point_offset[ i ] | u(v) |
|       } | |
|    } | |
|    if( slice_header_extension_present_flag ) { | |
|       slice_header_extension_length | ue(v) |
|       for( i = 0; i < slice_header_extension_length; i++ ) | |
|          slice_header_extension_data_byte | u(8) |
|    } | |
|    byte_alignment( ) | |
| } | |

FIG.22

| slice_header_data( ) { | Descriptor |
|---|---|
|   slice_type | ue(v) |
|   if( output_flag_present_flag ) | |
|     pic_output_flag | u(1) |
|   if( separate_colour_plane_flag = = 1 ) | |
|     colour_plane_id | u(2) |
|   if( RapPicFlag ) { | |
|     rap_pic_id | ue(v) |
|     no_output_of_prior_pics_flag | u(1) |
|   } | |
|   if( !IdrPicFlag ) { | |
|     pic_order_cnt_lsb | u(v) |
|     short_term_ref_pic_set_sps_flag | u(1) |
|     if( !short_term_ref_pic_set_sps_flag ) | |
|       short_term_ref_pic_set( num_short_term_ref_pic_sets ) | |
|     else | |
|       short_term_ref_pic_set_idx | u(v) |
|     if( long_term_ref_pics_present_flag ) { | |
|       num_long_term_pics | ue(v) |
|       for( i = 0; i < num_long_term_pics; i++ ) { | |
|         poc_lsb_lt[ i ] | u(v) |
|         delta_poc_msb_present_flag[ i ] | u(1) |
|         if( delta_poc_msb_present_flag[ i ] ) | |
|           delta_poc_msb_cycle_lt[ i ] | ue(v) |
|         used_by_curr_pic_lt_flag[ i ] | u(1) |
|       } | |
|     } | |
|   } | |
|   if( sample_adaptive_offset_enabled_flag ) { | |

FIG.23A

| | | |
|---|---|---|
| slice_sample_adaptive_offset_flag[ 0 ] | | u(1) |
| if( slice_sample_adaptive_offset_flag[ 0 ] ) { | | |
|    slice_sample_adaptive_offset_flag[ 1 ] | | u(1) |
|    slice_sample_adaptive_offset_flag[ 2 ] | | u(1) |
|    } | | |
| } | | |
| if(adaptive_loop_filter_enabled_flag) | | |
|    aps_id | | ue(v) |
| if( slice_type = = P | | slice_type = = B ) { | | |
|    if( sps_temporal_mvp_enable_flag ) | | |
|      pic_temporal_mvp_enable_flag | | u(1) |
|    num_ref_idx_active_override_flag | | u(1) |
|    if( num_ref_idx_active_override_flag ) { | | |
|      num_ref_idx_l0_active_minus1 | | ue(v) |
|      if( slice_type = = B ) | | |
|        num_ref_idx_l1_active_minus1 | | ue(v) |
|    } | | |
| } | | |
| if( lists_modification_present_flag ) | | |
|    ref_pic_list_modification( ) | | |
| if( slice_type = = B ) | | |
|    mvd_l1_zero_flag | | u(1) |
| if( cabac_init_present_flag && slice_type != I ) | | |
|    cabac_init_flag | | u(1) |
| slice_qp_delta | | se(v) |
| if( deblocking_filter_control_present_flag ) { | | |
|    if( deblocking_filter_override_enabled_flag ) | | |
|      deblocking_filter_override_flag | | u(1) |

FIG.23B

| | |
|---|---|
| if( deblocking_filter_override_flag ) { | |
|     slice_header_disable_deblocking_filter_flag | u(1) |
|     if( !slice_header_disable_deblocking_filter_flag ) { | |
|         beta_offset_div2 | se(v) |
|         tc_offset_div2 | se(v) |
|     } | |
|   } | |
| } | |
| if( pic_temporal_mvp_enable_flag ) { | |
|   if( slice_type = = B ) | |
|     collocated_from_l0_flag | u(1) |
|   if( slice_type != I && | |
|     collocated_ref_idx | ue(v) |
| } | |
| if( ( weighted_pred_flag && slice_type = = P) \|\| | |
|   pred_weight_table( ) | |
| if( slice_type = = P \|\| slice_type = = B ) | |
|   five_minus_max_num_merge_cand | ue(v) |
| if( adaptive_loop_filter_enabled_flag ) { | |
|   slice_adaptive_loop_filter_flag | u(1) |
|   if( slice_adaptive_loop_filter_flag && | |
|     alf_param( ) | |
|   if( slice_adaptive_loop_filter_flag | |
|     alf_cu_control_param( ) | |
| } | |
| if( seq_loop_filter_across_slices_enabled_flag && | |
|   slice_loop_filter_across_slices_enabled_flag | u(1) |
| } | |

FIG.23C

| sei_message( ) { | Descriptor |
|---|---|
|     payloadType = 0 | |
|     while( next_bits( 8 ) = = 0xFF ) { | |
|         ff_byte /* equal to 0xFF */ | f(8) |
|         payloadType += 255 | |
|     } | |
|     last_payload_type_byte | u(8) |
|     payloadType += last_payload_type_byte | |
|     payloadSize = 0 | |
|     while( next_bits( 8 ) = = 0xFF ) { | |
|         ff_byte /* equal to 0xFF */ | f(8) |
|         payloadSize += 255 | |
|     } | |
|     last_payload_size_byte | u(8) |
|     payloadSize += last_payload_size_byte | |
|     sei_payload( payloadType, payloadSize ) | |
| } | |

FIG.24

| | |
|---|---|
| sei_payload( payloadType, payloadSize ) { | Descriptor |
| if( payloadType == 0 ) | |
|     buffering_period( payloadSize ) | |
| else if( payloadType == 1 ) | |
|     pic_timing( payloadSize ) | |
| else if( payloadType == 2 ) | |
|     pan_scan_rect( payloadSize ) | |
| else if( payloadType == 3 ) | |
|     filler_payload( payloadSize ) | |
| else if( payloadType == 4 ) | |
|     user_data_registered_itu_t_t35( payloadSize ) | |
| else if( payloadType == 5 ) | |
|     user_data_unregistered( payloadSize ) | |
| else if( payloadType == 6 ) | |
|     recovery_point( payloadSize ) | |
| else if( payloadType == 9 ) | |
|     scene_info( payloadSize ) | |
| else if( payloadType == 15 ) | |
|     full_frame_snapshot( payloadSize ) | |
| else if( payloadType == 16 ) | |
|     progressive_refinement_segment_start( payloadSize ) | |
| else if( payloadType == 17 ) | |
|     progressive_refinement_segment_end( payloadSize ) | |
| else if( payloadType == 19 ) | |
|     film_grain_characteristics( payloadSize ) | |
| else if( payloadType == 20 ) | |
|     deblocking_filter_display_preference( payloadSize ) | |
| else if( payloadType == 22 ) | |
|     post_filter_hint( payloadSize ) | |
| else if( payloadType == 23 ) | |
|     tone_mapping_info( payloadSize ) | |

FIG.25A

```
else if( payloadType  = =  45 )
    frame_packing_arrangement( payloadSize )
else if( payloadType  = =  47 )
    display_orientation( payloadSize )
else if( payloadType  = =  128 )
    sop_description( payloadSize )
else if( payloadType  = =  129 )
    field_indication( payloadSize )
else if( payloadType  = =  130 )
    decoded_picture_hash( payloadSize )
else if( payloadType  = =  140 )
    roi_info( payloadSize )
else if( payloadType  = =  180 )
    subpic_buffering( payloadSize )
else if( payloadType  = =  181 )
    subpic_timing( payloadSize )
else if( payloadType  = =  182 )
    subpic_tile_info( payloadSize )
else if( payloadType  = =  183 )
    subpic_slice_info( payloadSize )
else if( payloadType  = =  184 )
    subpic_tile_dimensions_info( payloadSize )
if( !byte_aligned( ) ) {
    bit_equal_to_one /* equal to 1 */
    while( !byte_aligned( ) )
        bit_equal_to_zero /* equal to 0 */
    }
}
```

FIG. 25B

| | Descriptor |
|---|---|
| subpic_buffering( payloadSize ) { | |
|   seq_parameter_set_id | ue(v) |
|   if( NalHrdBpPresentFlag ) { | |
|     for( SchedSelIdx = 0; SchedSelIdx <= cpb_cnt_minus1, SchedSelIdx++ ) { | |
|       initial_cpb_removal_delay[ SchedSelIdx ] | u(v) |
|       initial_cpb_removal_delay_offset[ SchedSelIdx ] | u(v) |
|     } | |
|   } | |
|   if( VclHrdBpPresentFlag ) { | |
|     for( SchedSelIdx = 0; SchedSelIdx <= cpb_cnt_minus1, SchedSelIdx++ ) { | |
|       initial_cpb_removal_delay[ SchedSelIdx ] | u(v) |
|       initial_cpb_removal_delay_offset[ SchedSelIdx ] | u(v) |
|     } | |
|   } | |
| } | |

FIG.26

| subpic_timing( payloadSize ) { | Descriptor |
|---|---|
| reserved_one_8bits | u(8) |
| du_cpb_removal_delay | u(v) |
| du_dpb_output_delay | u(v) |
| } | |
| } | |

FIG.27

| subpic_slice_info( payloadSize ) { | Descriptor |
|---|---|
| reserved_one_7bits | u(7) |
| slice_header_data_flag | u(1) |
| if( slice_header_data_flag ) | |
| slice_header_data( ) | |
| byte_alignment() | |
| } | |

FIG.28

| subpic_tile_info( payloadSize ) { | Descriptor |
|---|---|
| reserved_one_4bits | u(4) |
| tile_priority | u(3) |
| multiple_tiles_in_prefixed_slices_flag | u(1) |
| if( multiple_tiles_in_prefixed_slices_flag ) | |
| num_tiles_in_prefixed_slices_minus1 | u(16) |
| first_tile_id_in_prefixed_slices | u(16) |
| } | |

FIG.29

| subpic_tile_dimensions_info( payloadSize ) { | Descriptor |
|---|---|
| reserved_one_7bits | u(7) |
| multiple_tiles_in_prefixed_slices_flag | u(1) |
| if( multiple_tiles_in_prefixed_slices_flag ) | |
| num_tiles_in_prefixed_slices_minus1 | u(16) |
| for( i = 0; i <= num_tiles_in_roi_minus1 ; i++ ) { | |
| tile_horz_start[ i ] | u(16) |
| tile_width[ i ] | u(16) |
| tile_vert_start[ i ] | u(16) |
| tile_height[ i ] | u(16) |
| } | |
| } | |

FIG.30

| roi_info( payloadSize ) { | Descriptor |
|---|---|
| reserved_one_8bits | u(8) |
| roi_id | u(5) |
| roi_priority | u(3) |
| num_tiles_in_roi_minus1 | u(16) |
| for( i = 0; i <= num_tiles_in_roi_minus1 ; i++ ) { | |
| roi_tile_id[ i ] | u(16) |
| } | |
| } | |

FIG.31

| roi_info( payloadSize ) { | Descriptor |
|---|---|
| reserved_one_3bits | u(3) |
| num_rois_minus1 | u(5) |
| for( i = 0; i <= num_roi_minus1 ; i++ ) { | u(5) |
| roi_id[ i ] | u(5) |
| roi_priority[ i ] | u(3) |
| num_tiles_in_roi_minus1[ i ] | u(16) |
| for( n = 0; n <= num_tiles_in_roi_minus1 ; n++ ) { | |
| roi_tile_id[ i ][ n ] | u(16) |
| } | |
| roi_presentation_on_seperate_screen [ i ] | u(1) |
| } | |
| } | |

FIG.32

| decoding_unit_info( payloadSize ) { | Descriptor |
|---|---|
| decoding_unit_idx | ue(v) |
| if( !sub_pic_cpb_params_in_pic_timing_sei_flag ) | |
| du_spt_cpb_removal_delay_increment | u(v) |
| dpb_output_du_delay_present_flag | u(1) |
| if( dpb_output_du_delay_present_flag ) | |
| pic_spt_dpb_output_du_delay | u(v) |
| } | |

FIG.33

| region_refresh_info( payloadSize ) { | Descriptor |
|---|---|
| refreshed_region_flag | u(1) |
| } | |

FIG.34

VIDEO DATA STREAM CONCEPT

CROSS-REFERENCE TO RELATED APPLICATIONS

This application is a Continuation of U.S. Ser. No. 15/928,742, filed Mar. 22, 2018, which is a Continuation of U.S. Ser. No. 14/578,814, filed Dec. 22, 2014, now U.S. Pat. No. 9,973,781, which is a Continuation of International Application No. PCT/EP2013/063853, filed Jul. 1, 2013, which claims priority from U.S. Application No. 61/666,185, filed Jun. 29, 2012. The subject matter of each of these applications is incorporated herein by reference in entirety.

The present application is concerned with video data stream concepts which are, in particular, advantageous in connection with low delay applications.

BACKGROUND OF THE INVENTION

HEVC [2] allows for different means of High Level Syntax signaling to the application layer. Such means are the NAL unit header, Parameter Sets and Supplemental Enhancement Information (SEI) Messages. The latter are not used in the decoding process. Other means of High Level Syntax signaling originate from respective transport protocol specifications such as MPEG2 Transport Protocol [3] or the Realtime Transport Protocol [4], and its payload specific specifications, for example the recommendations for H.264/AVC [5], scalable video coding (SVC) [6] or HEVC [7]. Such transports protocols may introduce High Level signaling that employs similar structures and mechanism as the High Level signaling of the respective application layer codec spec, e.g. HEVC [2]. One example of such signaling is the Payload Content Scalability Information (PACSI) NAL unit as described in [6] that provides supplementary information for the transport layer.

For parameter sets, HEVC includes Video Parameter Set (VPS), which compiles most important stream information to be used by the application layer at a single and central location. In earlier approaches, this information needed to be gathered from multiple Parameter Sets and NAL unit headers.

Prior to the present application, the status of the standard with respect to Coded Picture Buffer (CPB) operations of Hypothetical Reference Decoder (HRD), and all related syntax provided in Sequence Parameter Set (SPS)/Video Usability Information (VUI), Picture Timing SEI, Buffering Period SEI as well as the definition of the decoding unit, describing a sub-picture and the syntax of the Dependent Slices as present in the slice header as well as the Picture Parameter Set (PPS), were as follows.

In order to allow for low delay CPB operation on sub-picture level, sub-picture CPB operations have been proposed and integrated into the HEVC draft standard 7 JCTVC-I1003 [2]. Here especially, the decoding unit has been defined in section 3 of [2] as:

decoding unit: An access unit or a subset of an access unit. If SubPicCpbFlag is equal to 0, a decoding unit is an access unit. Otherwise, a decoding unit consists of one or more VCL NAL units in an access unit and the associated non-VCL NAL units. For the first VCL NAL unit in an access unit, the associated non-VCL NAL units are and the filler data NAL units, if any, immediately following the first VCL NAL unit and all non-VCL NAL units in the access unit that precede the first VCL NAL unit. For a VCL NAL unit that is not the first VCL NAL unit in an access unit, the associated non-VCL NAL units are the filler data NAL unit, if any, immediately following the VCL NAL unit.

In the standard defined up to that time, the "Timing of decoding unit removal and decoding of decoding unit" has been described and added to Annex C "Hypothetical reference decoder". In order to signal sub-picture timing, the buffering period SEI message and the picture timing SEI message, as well as the HRD parameters in the VUI have been extended to support decoding units, as sub-picture units.

Buffering period SEI message syntax of [2] is shown in FIG. 1.

When NalHrdBpPresentFlag or VclHrdBpPresentFlag are equal to 1, a buffering period SEI message can be associated with any access unit in the bitstream, and a buffering period SEI message shall be associated with each RAP access unit, and with each access unit associated with a recovery point SEI message.

For some applications, the frequent presence of a buffering period SEI message may be desirable.

A buffering period was specified as the set of access units between two instances of the buffering period SEI message in decoding order.

The semantics were as follows:

seq_parameter_set_id specifies the sequence parameter set that contains the sequence HRD attributes. The value of seq_parameter_set_id shall be equal to the value of seq_parameter_set_id_in the picture parameter set referenced by the primary coded picture associated with the buffering period SEI message. The value of seq_parameter_set_id shall be in the range of 0 to 31, inclusive.

rap_cpb_params_present_flag equal to 1 specifies the presence of the initial_alt_cpb_removal_delay [SchedSelIdx] and initial_alt_cpb_removal_delay_offset [SchedSelIdx] syntax elements. When not present, the value of rap_cpb_params_present_flag is inferred to be equal to 0. When the associated picture is neither a CRA picture nor a BLA picture, the value of rap_cpb_params_present_flag shall be equal to 0.

initial_cpb_removal_delay [SchedSelIdx] and initial_alt_cpb_removal_delay [SchedSelIdx] specify the initial CPB removal delays for the SchedSelIdx-th CPB. The syntax elements have a length in bits given by initial_cpb_removal_delay_length_minus1+1, and are in units of a 90 kHz clock. The values of the syntax elements shall not be equal to 0 and shall not exceed 90000*(CpbSize [SchedSelIdx] ÷ BitRate [SchedSelIdx]), the time-equivalent of the CPB size in 90 kHz clock units.

initial_cpb_removal_delay_offset [SchedSelIdx] and initial_alt_cpb_removal_delay_offset [SchedSelIdx] are used for the SchedSelIdx-th CPB to specify the initial delivery time of coded data units to the CPB. The syntax elements have a length in bits given by initial_cpb_removal_delay_length_minus1+1 and are in units of a 90 kHz clock. These syntax elements are not used by decoders and may be needed only for the delivery scheduler (HSS).

Over the entire coded video sequence, the sum of initial_cpb_removal_delay [SchedSelIdx] and initial_cpb_removal_delay_offset [SchedSelIdx] shall be constant for each value of SchedSelIdx, and the sum of initial_alt_cpb_removal_delay [SchedSelIdx] and initial_alt_cpb_removal_delay_offset [SchedSelIdx] shall be constant for each value of SchedSelIdx.

The picture timing SEI message syntax of [2] is shown in FIG. 2.

The syntax of the picture timing SEI message was dependent on the content of the sequence parameter set that is active for the coded picture associated with the picture timing SEI message. However, unless the picture timing SEI message of an IDR or BLA access unit is preceded by a buffering period SEI message within the same access unit, the activation of the associated sequence parameter set (and, for IDR or BLA pictures that are not the first picture in the bitstream, the determination that the coded picture is an IDR picture or a BLA picture) does not occur until the decoding of the first coded slice NAL unit of the coded picture. Since the coded slice NAL unit of the coded picture follows the picture timing SEI message in NAL unit order, there may be cases in which it is useful for a decoder to store the RBSP containing the picture timing SEI message until determining the parameters of the sequence parameter that will be active for the coded picture, and then perform the parsing of the picture timing SEI message.

The presence of picture timing SEI message in the bitstream was specified as follows.

If CpbDpbDelaysPresentFlag is equal to 1, one picture timing SEI message shall be present in every access unit of the coded video sequence.

Otherwise (CpbDpbDelaysPresentFlag is equal to 0), no picture timing SEI messages shall be present in any access unit of the coded video sequence.

The semantics were defined as follows:

cpb_removal_delay specifies how many clock ticks to wait after removal from the CPB of the access unit associated with the most recent buffering period SEI message in a preceding access unit before removing from the buffer the access unit data associated with the picture timing SEI message. This value is also used to calculate an earliest possible time of arrival of access unit data into the CPB for the HSS. The syntax element is a fixed length code whose length in bits is given by cpb_removal_delay_length_minus1+1. The cpb_removal_delay is the remainder of a modulo $2^{(cpb\_removal\_delay\_length\_minus1+1)}$ counter.

The value of cpb_removal_delay_length_minus1 that determines the length (in bits) of the syntax element cpb_removal_delay is the value of cpb_removal_delay_length_minus1 coded in the sequence parameter set that is active for the primary coded picture associated with the picture timing SEI message, although cpb_removal_delay specifies a number of clock ticks relative to the removal time of the preceding access unit containing a buffering period SEI message, which may be an access unit of a different coded video sequence.

dpb_output_delay is used to compute the DPB output time of the picture. It specifies how many clock ticks to wait after removal of the last decoding unit in an access unit from the CPB before the decoded picture is output from the DPB.

A picture is not removed from the DPB at its output time when it is still marked as "used for short-term reference" or "used for long-term reference".

Only one dpb_output_delay is specified for a decoded picture.

The length of the syntax element dpb_output_delay is given in bits by dpb_output_delay_length_minus1+1. When sps_max_dec_pic_buffering [max_temporal_layers_minus1] is equal to 0, dpb_output_delay shall be equal to 0.

The output time derived from the dpb_output_delay of any picture that is output from an output timing conforming decoder shall precede the output time derived from the dpb_output_delay of all pictures in any subsequent coded video sequence in decoding order.

The picture output order established by the values of this syntax element shall be the same order as established by the values of PicOrderCntVal.

For pictures that are not output by the "bumping" process because they precede, in decoding order, an IDR or BLA picture with no_output_of_prior_pics flag equal to 1 or inferred to be equal to 1, the output times derived from dpb_output_delay shall be increasing with increasing value of PicOrderCntVal relative to all pictures within the same coded video sequence.

num_decoding_units_minus1 plus 1 specifies the number of decoding units in the access unit the picture timing SEI message is associated with. The value of num_decoding_units_minus1 shall be in the range of 0 to PicWidthInCtbs*PicHeightInCtbs−1, inclusive.

num_nalus_in_du_minus1 [i] plus 1 specifies the number of NAL units in the i-th decoding unit of the access unit the picture timing SEI message is associated with. The value of num_nalus_in_du_minus1 [i] shall be in the range of 0 to PicWidthInCtbs*PicHeightInCtbs−1, inclusive.

The first decoding unit of the access unit consists of the first num_nalus_in_du_minus1 [0]+1 consecutive NAL units in decoding order in the access unit. The i-th (with i greater than 0) decoding unit of the access unit consists of the num_nalus_in_du_minus1 [i]+1 consecutive NAL units immediately following the last NAL unit in the previous decoding unit of the access unit, in decoding order. There shall be at least one VCL NAL unit in each decoding unit. All non-VCL NAL units associated with a VCL NAL unit shall be included in the same decoding unit.

du_cpb_removal_delay [i] specifies how many sub-picture clock ticks to wait after removal from the CPB of the first decoding unit in the access unit associated with the most recent buffering period SEI message in a preceding access unit before removing from the CPB the i-th decoding unit in the access unit associated with the picture timing SEI message. This value is also used to calculate an earliest possible time of arrival of decoding unit data into the CPB for the HSS. The syntax element is a fixed length code whose length in bits is given by cpb_removal_delay_length_minus1+1. The du_cpb_removal_delay [i] is the remainder of a modulo $2^{(cpb\_removal\_delay\_length\_minus1+1)}$ counter.

The value of cpb_removal_delay_length_minus1 that determines the length (in bits) of the syntax element du_cpb_removal_delay [i] is the value of cpb_removal_delay_length_minus1 coded in the sequence parameter set that is active for the coded picture associated with the picture timing SEI message, although du cpb_removal_delay [i] specifies a number of sub-picture clock ticks relative to the removal time of the first decoding unit in the preceding access unit containing a buffering period SEI message, which may be an access unit of a different coded video sequence.

Some information was contained in the VUI syntax of [2]. The VUI parameters syntax of [2] is shown in FIGS. 3A and 3B. The HRD parameters syntax of [2] is shown in FIG. 4. The semantics were defined as follows:

sub_pic_cpb_params_present_flag equal to 1 specifies that sub-picture level CPB removal delay parameters are present and the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

num_units_in_sub_tick is the number of time units of a clock operating at the frequency time_scale Hz that corresponds to one increment (called a sub-picture clock tick) of a sub-picture clock tick counter. num_units_in_sub_tick shall be greater than 0. A sub-picture clock tick is the minimum interval of time that can be represented in the coded data when sub_pic_cpb_params_present_flag is equal to 1.

tiles_fixed_structure_flag equal to 1 indicates that each picture parameter set that is active in the coded video sequence has the same value of the syntax elements num_tile_columns_minus1, num_tile_rows_minus1, uniform_spacing_flag, column_width[i], row_height[i] and loop_filter_across_tiles_enabled_flag, when present. tiles_fixed_structure_flag equal to 0 indicates that tiles syntax elements in different picture parameter sets may or may not have the same value. When the tiles_fixed_structure_flag syntax element is not present, it is inferred to be equal to 0.

The signaling of tiles_fixed_structure_flag equal to 1 is a guarantee to a decoder that each picture in the coded video sequence has the same number of tiles distributed in the same way which might be useful for workload allocation in the case of multi-threaded decoding.

Filler data of [2] was signaled using filter data RB SP syntax shown in FIG. 5.

The hypothetical reference decoder of [2] used to check bitstream and decoder conformance was defined as follows:

Two types of bitstreams are subject to HRD conformance checking for this Recommendation|International Standard. The first such type of bitstream, called Type I bitstream, is a NAL unit stream containing only the VCL NAL units and filler data NAL units for all access units in the bitstream. The second type of bitstream, called a Type II bitstream, contains, in addition to the VCL NAL units and filler data NAL units for all access units in the bitstream, at least one of the following:
  additional non-VCL NAL units other than filler data NAL units,
  all leading_zero_8bits, zero_byte, start_code_prefix_one_3 bytes, and trailing_zero_8bits syntax elements that form a byte stream from the NAL unit stream.

FIG. 6 shows the types of bitstream conformance points checked by the HRD of [2].

Two types of HRD parameter sets (NAL HRD parameters and VCL HRD parameters) are used. The HRD parameter sets are signaled through video usability information, which is part of the sequence parameter set syntax structure.

All sequence parameter sets and picture parameter sets referred to in the VCL NAL units, and corresponding buffering period and picture timing SEI messages shall be conveyed to the HRD, in a timely manner, either in the bitstream, or by other means.

The specification for "presence" of non-VCL NAL units is also satisfied when those NAL units (or just some of them) are conveyed to decoders (or to the HRD) by other means not specified by this Recommendation|International Standard. For the purpose of counting bits, only the appropriate bits that are actually present in the bitstream are counted.

As an example, synchronization of a non-VCL NAL unit, conveyed by means other than presence in the bitstream, with the NAL units that are present in the bitstream, can be achieved by indicating two points in the bitstream, between which the non-VCL NAL unit would have been present in the bitstream, had the encoder decided to convey it in the bitstream.

When the content of a non-VCL NAL unit is conveyed for the application by some means other than presence within the bitstream, the representation of the content of the non-VCL NAL unit is not required to use the same syntax specified in this annex.

Note that when HRD information is contained within the bitstream, it is possible to verify the conformance of a bitstream to the requirements of this subclause based solely on information contained in the bitstream. When the HRD information is not present in the bitstream, as is the case for all "stand-alone" Type I bitstreams, conformance can only be verified when the HRD data is supplied by some other means not specified in this Recommendation|International Standard.

The HRD contains a coded picture buffer (CPB), an instantaneous decoding process, a decoded picture buffer (DPB), and output cropping as shown in FIG. 7.

The CPB size (number of bits) is CpbSize[SchedSelIdx]. The DPB size (number of picture storage buffers) for temporal layer X is sps_max_dec_pic_buffering[X] for each X in the range of 0 to sps_max_temporal_layers_minus1, inclusive.

The variable SubPicCpbPreferredFlag is either specified by external means, or when not specified by external means, set to 0.

The variable SubPicCpbFlag is derived as follows:
SubPicCpbFlag=SubPicCpbPreferredFlag && sub_pic_cpb_params_present_flag If SubPicCpbFlag is equal to 0, the CPB operates at access unit level and each decoding unit is an access unit. Otherwise the CPB operates at sub-picture level and each decoding unit is a subset of an access unit.

The HRD operates as follows. Data associated with decoding units that flow into the CPB according to a specified arrival schedule are delivered by the HSS. The data associated with each decoding unit are removed and decoded instantaneously by the instantaneous decoding process at CPB removal times. Each decoded picture is placed in the DPB. A decoded picture is removed from the DPB at the later of the DPB output time or the time that it becomes no longer needed for inter-prediction reference.

The HRD is initialized as specified by the buffering period SEI. The removal timing of decoding units from the CPB and output timing of decoded pictures from the DPB are specified in the picture timing SEI message. All timing information relating to a specific decoding unit shall arrive prior to the CPB removal time of the decoding unit.

The HRD is used to check conformance of bitstreams and decoders.

While conformance is guaranteed under the assumption that all frame-rates and clocks used to generate the bitstream match exactly the values signaled in the bitstream, in a real system each of these may vary from the signaled or specified value.

All the arithmetic is done with real values, so that no rounding errors can propagate. For example, the number of bits in a CPB just prior to or after removal of a decoding unit is not necessarily an integer.

The variable $t_c$ is derived as follows and is called a clock tick:
$t_c$=num_units_in_tick÷time_scale The variable $t_{c\_sub}$ is derived as follows and is called a sub-picture clock tick:
$t_{c\_sub}$=num_units_in_sub_tick÷time_scale The following is specified for expressing the constraints:
  Let access unit n be the n-th access unit in decoding order with the first access unit being access unit 0.
  Let picture n be the coded picture or the decoded picture of access unit n.
  Let decoding unit m be the m-th decoding unit in decoding order with the first decoding unit being decoding unit 0.

In [2], the slice header syntax allowed for so-called dependent slices.

FIG. 8 shows the slice header syntax of [2].

Slice header semantics were defined as follows:

dependent_slice_flag equal to 1 specifies that the value of each slice header syntax element not present is inferred to be equal to the value of corresponding slice header syntax element in the preceding slice containing the coding tree block for which the coding tree block address is SliceCtbAddrRS−1. When not present, the value of dependent_slice_flag is inferred to be equal to 0. The value of dependent_slice_flag shall be equal to 0 when SliceCtbAddrRS equal to 0.

slice_address specifies the address in slice granularity resolution in which the slice starts. The length of the slice address syntax element is (Ceil(Log 2(PicWidthInCtbs*PicHeightInCtbs))+SliceGranularity) bits.

The variable SliceCtbAddrRS, specifying the coding tree block in which the slice starts in coding tree block raster scan order, is derived as follows.
SliceCtbAddrRS=(slice_address>>SliceGranularity)

The variable SliceCbAddrZS, specifying the address of first coding block in the slice in minimum coding block granularity in z-scan order, is derived as follows.

---

SliceCbAddrZS = slice_address
<< ((log2_diff_max_min_coding_block_size − SliceGranularity) <<1)

---

The slice decoding starts with the largest coding unit possible at the slice starting coordinate.

first_slice_in_pic_flag indicates whether the slice is the first slice of the picture. If first_slice_in_pic_flag is equal to 1, the variables SliceCbAddrZS and SliceCtbAddrRS are both set to 0 and the decoding starts with the first coding tree block in the picture.

pic_parameter_set_id specifies the picture parameter set in use. The value of pic_parameter_set_id shall be in the range of 0 to 255, inclusive.

num_entry_point_offsets specifies the number of entry_point_offset[i] syntax elements in the slice header. When tiles_or_entropy_coding_sync_idc is equal to 1, the value of num_entry_point_offsets shall be in the range of 0 to (num_tile_columns_minus1+1)*(num_tile_rows_minus1+1)−1, inclusive. When tiles_or_entropy_coding_sync_idc is equal to 2, the value of num_entry_point_offsets shall be in the range of 0 to PicHeightInCtbs−1, inclusive. When not present, the value of num_entry_point_offsets is inferred to be equal to 0.

offset_len_minus1 plus 1 specifies the length, in bits, of the entry_point_offset[i] syntax elements.

entry_point_offset[i] specifies the i-th entry point offset, in bytes and shall be represented by offset_len_minus1 plus 1 bits. The coded slice data after the slice header consists of num_entry_point_offsets+1 subsets, with subset index values ranging from 0 to num_entry_point_offsets, inclusive. Subset 0 consists of bytes 0 to entry_point_offset[0]−1, inclusive, of the coded slice data, subset k, with k in the range of 1 to num_entry_point_offsets−1, inclusive, consists of bytes entry_point_offset[k−1] to entry_point_offset[k]+entry_point_offset[k−1]−1, inclusive, of the coded slice data, and the last subset (with subset index equal to num_entry_point_offsets) consists of the remaining bytes of the coded slice data.

When tiles_or_entropy_coding_sync_idc is equal to 1 and num_entry_point_offsets is greater than 0, each subset shall contain all coded bits of exactly one tile, and the number of subsets (i.e., the value of num_entry_point_offsets+1) shall be equal to or less than the number of tiles in the slice.

When tiles_or_entropy_coding_sync_idc is equal to 1, each slice includes either a subset of one tile (in which case signaling of entry points is unnecessary) or an integer number of complete tiles.

When tiles_or_entropy_coding_sync_idc is equal to 2 and num_entry_point_offsets is greater than 0, each subset k with k in the range of 0 to num_entry_point_offsets−1, inclusive, shall contain all coded bits of exactly one row of coding tree blocks, the last subset (with subset index equal to num_entry_point_offsets) shall contain all coded bits of the remaining coding blocks included in the slice, wherein the remaining coding blocks consist of either exactly one row of coding tree blocks or a subset of one row of coding tree blocks, and the number of subsets (i.e., the value of num_entry_point_offsets+1) shall be equal to the number of rows of coding tree blocks in the slice, wherein a subset of one row of coding tree blocks in the slice is also counted.

When tiles_or_entropy_coding_sync_idc is equal to 2, a slice may include a number of rows of coding tree blocks and a subset of a row of coding tree blocks. For example, if a slice include two and a half rows of coding tree blocks, the number of subsets (i.e., the value of num_entry_point_offsets+1) shall be equal to 3.

FIG. 9 shows the picture parameter set RBSP syntax of [2], the picture parameter set RBSP semantics of [2] being defined as:

dependent_slice_enabled_flag equal to 1 specifies the presence of the syntax element dependent_slice_flag in the slice header for coded pictures referring to the picture parameter set. dependent_slice_enabled_flag equal to 0 specifies the absence of the syntax element dependent_slice_flag in the slice header for coded pictures referring to the picture parameter set. When tiles_or_entropy_coding_sync_idc is equal to 3, the value of dependent_slice_enabled_flag shall be equal to 1.

tiles_or_entropy_coding_sync_idc equal to 0 specifies that there shall be only one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set shall not be both equal to 1.

When cabac_independent_flag and dependent_slice_flag are both equal to 1 for a slice, the slice is an entropy slice.]

tiles_or_entropy_coding_sync_idc equal to 1 specifies that there may be more than one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set shall not be both equal to 1.

tiles_or_entropy_coding_sync_idc equal to 2 specifies that there shall be only one tile in each picture referring to the picture parameter set, a specific synchronization process for context variables shall be invoked before decoding the first coding tree block of a row of coding tree blocks in each picture referring to the picture parameter set and a specific memorization process for context variables shall be invoked after decoding two coding tree blocks of a row of coding tree blocks in each picture referring to the picture parameter set, and the values of cabac_independent_flag and dependent_slice_flag for coded pictures referring to the picture parameter set shall not be both equal to 1.

tiles_or_entropy_coding_sync_idc equal to 3 specifies that there shall be only one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set may both be equal to 1.

When dependent_slice_enabled_flag shall be equal to 0, tiles_or_entropy_coding_sync_idc shall not be equal to 3.

It is a requirement of bitstream conformance that the value of tiles_or_entropy_coding_sync_idc shall be the same for all picture parameter sets that are activated within a coded video sequence.

For each slice referring to the picture parameter set, when tiles_or_entropy_coding_sync_idc is equal to 2 and the first coding block in the slice is not the first coding block in the first coding tree block of a row of coding tree blocks, the last coding block in the slice shall belong to the same row of coding tree blocks as the first coding block in the slice.

num_tile_columns_minus1 plus 1 specifies the number of tile columns partitioning the picture.

num_tile_rows_minus1 plus 1 specifies the number of tile rows partitioning the picture.

When num_tile_columns_minus1 is equal to 0, num_tile_rows_minus1 shall not be equal to 0.

uniform_spacing_flag equal to 1 specifies that column boundaries and likewise row boundaries are distributed uniformly across the picture. uniform_spacing_flag equal to 0 specifies that column boundaries and likewise row boundaries are not distributed uniformly across the picture but signaled explicitly using the syntax elements column_width[i] and row_height[i].

column_width[i] specifies the width of the i-th tile column in units of coding tree blocks.

row_height[i] specifies the height of the i-th tile row in units of coding tree blocks.

The vector colWidth[i] specifies the width of the i-th tile column in units of CTBs with the column i ranging from 0 to num_tile_columns_minus1, inclusive.

The vector CtbAddrRStoTS[ctbAddrRS] specifies the conversation from a CTB address in raster scan order to a CTB address in tile scan order with the index ctbAddrRS ranging from 0 to (picHeightInCtbs*picWidthInCtbs)−1, inclusive.

The vector CtbAddrTStoRS[ctbAddrTS] specifies the conversation from a CTB address in tile scan order to a CTB address in raster scan order with the index ctbAddrTS ranging from 0 to (picHeightInCtbs*picWidthInCtbs)−1, inclusive.

The vector TileId[ctbAddrTS] specifies the conversation from a CTB address in tile scan order to a tile id with ctbAddrTS ranging from 0 to (picHeightInCtbs*picWidthInCtbs) −1, inclusive.

The values of colWidth, CtbAddrRStoTS, CtbAddrTStoRS and TileId are derived by invoking the CTB raster and tile scanning conversation process as specified in subclause 6.5.1 with PicHeightInCtbs and PicWidthInCtbs as inputs and the output is assigned to colWidth, CtbAddrRStoTS and TileId.

The values of ColumnWidthInLumaSamples[i], specifying the width of the i-th tile column in units of luma samples, are set equal to colWidth[i]<<Log 2CtbSize.

The array MinCbAddrZS[x][y], specifying the conversation from a location (x, y) in units of minimum CBs to a minimum CB address in z-scan order with x ranging from 0 to picWidthInMinCbs−1, inclusive, and y ranging from 0 to picHeightInMinCbs−1, inclusive, is derived by invoking the Z scanning order array initialization process as specified in subclause 6.5.2 with Log 2MinCbSize, Log 2CtbSize, PicHeightInCtbs, PicWidthInCtbs, and the vector CtbAddrRStoTS as inputs and the output is assigned to MinCbAddrZS.

loop_filter_across_tiles_enabled_flag equal to 1 specifies that in-loop filtering operations are performed across tile boundaries. loop_filter_across_tiles_enabled_flag equal to 0 specifies that in-loop filtering operations are not performed across tile boundaries. The in-loop filtering operations include the deblocking filter, sample adaptive offset, and adaptive loop filter operations. When not present, the value of loop_filter_across_tiles_enabled_flag is inferred to be equal to 1.

cabac_independent_flag equal to 1 specifies that CABAC decoding of coding blocks in a slice is independent from any state of the previously decoded slice. cabac_independent_flag equal to 0 specifies that CABAC decoding of coding blocks in a slice is dependent from the states of the previously decoded slice. When not present, the value of cabac_independent_flag is inferred to be equal to 0.

A derivation process for the availability of a coding block with a minimum coding block address was described as follows:

Inputs to this process are a minimum coding block address minCbAddrZS in z-scan order the current minimum coding block address currMinCBAddrZS in z-scan order Output of this process is the availability of the coding block with minimum coding block address cbAddrZS in z-scan order cbAvailable.

Note, that the meaning of availability is determined when this process is invoked.

Note, that any coding block, regardless of its size, is associated with a minimum coding block address, which is the address of the coding block with the minimum coding block size in z-scan order.

If one or more of the following conditions are true, cbAvailable is set to FALSE.

minCbAddrZS is less than 0 minCbAddrZS is greater than currMinCBAddrZS the coding block with minimum coding block address minCbAddrZS belongs to a different slice than the coding block with the current minimum coding block address currMinCBAddrZS and the dependent_slice_flag of the slice containing the coding block with the current minimum coding block address currMinCBAddrZS is equal to 0.

the coding block with minimum coding block address minCbAddrZS is contained in a different tile than the coding block with the current minimum coding block address currMinCBAddrZS.

Otherwise, cbAvailable is set to TRUE.

The CABAC parsing process for slice data of [2] was as follows:

This process is invoked when parsing syntax elements with descriptor ae(v).

Inputs to this process are a request for a value of a syntax element and values of prior parsed syntax elements.

Output of this process is the value of the syntax element.

When starting the parsing of the slice data of a slice, the initialization process of the CABAC parsing process is invoked.

The minimum coding block address of the coding tree block containing the spatial neighbor block T (FIG. 10A), ctbMinCbAddrT, is derived using the location (x0, y0) of the top-left luma sample of the current coding tree block as follows.

```
x = x0 + 2 << Log2CtbSize − 1
y = y0 − 1
ctbMinCbAddrT = MinCbAddrZS[x >> Log2MinCbSize][y >> Log2MinCbSize]
```

The variable availableFlagT is obtained by invoking the coding block availability derivation process with ctbMinCbAddrT as input.

When starting the parsing of a coding tree, the following ordered steps apply.

The arithmetic decoding engine is initialized as follows.

If CtbAddrRS is equal to slice_address, dependent_slice_flag is equal to 1 and entropy_coding_reset_flag is equal to 0, the following applies.

The synchronization process of the CABAC parsing process is invoked with TableStateIdxDS and TableMPSValDS as input.

The decoding process for binary decisions before termination is invoked, followed by the initialization process for the arithmetic decoding.

Otherwise if tiles_or_entropy_coding_sync_idc is equal to 2, and CtbAddrRS % PicWidthInCtbs is equal to 0, the following applies.

When availableFlagT is equal to 1, the synchronization process of the CABAC parsing process is invoked with TableStateIdxWPP and TableMPSValWPP as input The decoding process for binary decisions before termination is invoked, followed by the initialization process for the arithmetic decoding engine.

When cabac_independent_flag is equal to 0 and dependent_slice_flag is equal to 1, or when tiles_or_entropy_coding_sync_idc is equal to 2, the memorization process is applied as follows.

When tiles_or_entropy_coding_sync_idc is equal to 2 and CtbAddrRS % PicWidthInCtbs is equal to 2, the memorization process of the CABAC parsing process is invoked with TableStateIdxWPP and TableMPSValWPP as output.

When cabac_independent_flag is equal to 0, dependent_slice_flag is equal to 1, and end_of_slice_flag is equal to 1, the memorization process of the CABAC parsing process is invoked with TableStateIdxDS and TableMPSValDS as output.

The parsing of syntax elements proceeds as follows:

For each requested value of a syntax element a binarization is derived.

The binarization for the syntax element and the sequence of parsed bins determines the decoding process flow.

For each bin of the binarization of the syntax element, which is indexed by the variable binIdx, a context index ctxIdx is derived.

For each ctxIdx the arithmetic decoding process is invoked.

The resulting sequence ($b_0 \ldots b_{binIdx}$) of parsed bins is compared to the set of bin strings given by the binarization process after decoding of each bin. When the sequence matches a bin string in the given set, the corresponding value is assigned to the syntax element.

In case the request for a value of a syntax element is processed for the syntax element pcm-flag and the decoded value of pcm_flag is equal to 1, the decoding engine is initialized after the decoding of any pcm_alignment_zero_bit, num_subsequent_pcm, and all pcm_sample_luma and pcm_sample_chroma data.

In the design framework described so far the following problem occurred.

The timing of the decoding units need to be known before coding and sending the data in a low delay scenario, where NAL units will already be sent out by the encoder, while the encoder is still coding parts of the picture, i.e. other sub-picture decoding units. This is, because the NAL unit order in an access unit only allows SEI messages to precede the VCL (Video Coding NAL units) in an access unit, but in such a low delay scenario, the non-VCL NAL units need to be already on the wire, i.e. sent out, if the encoder starts encoding the decoding units. FIG. 10B illustrates the structure of an access unit as defined in [2]. [2] did not yet specify end of sequence or stream, so their presence in the access unit was tentative.

Furthermore, the number of NAL units associated with a sub-picture also needs to be known beforehand in a low delay scenario, as the picture timing SEI message contains this information and has to be compiled and send out before the encoder starts to encode the actual picture. An application designer reluctant to insert filler data NAL units, with potentially no filler data to comply with the NAL unit number, as signaled per decoding unit in the picture timing SEI, needs means to signal this information on a sub-picture level. The same holds for sub-picture timing, which is currently fixed at the being of an access unit by the parameters given in the timing SEI message.

Further shortcomings of the draft specification [2] include numerous signaling of sub-picture level, which is used for specific applications, such as ROI signaling or tile dimensions signaling.

The above outlined problems are not specific to the HEVC standard. Rather, this problem also occurs in connection with other video codecs as well. FIG. 11 shows, more generally, a video transmission scenery where a pair encoder 10 and decoder 12 are connected via a network 14 in order to transmit a video 16 from encoder 10 to decoder 12 at short end-to-end delay. The problem already outlined above is the following. The encoder 10 encodes the sequence of frames 18 of the video 16 in accordance with a certain decoding order which substantially, but not necessarily, follows the reproduction order 20 of frames 18, and within each frame 18 travels through the frame area of frames 18 in some defined manner, such as for example in a raster scan manner with or without tile-sectioning of frames 18. The decoding order controls the availability of information for coding techniques used by encoder 10 such as, for example, prediction and/or entropy coding, i.e. the availability of information relating to spatially and/or temporally neighboring portions of video 16 available to serve as a basis for prediction or context selection. Even though encoder 10 might be able to use parallel processing in order to encode the frames 18 of video 16, encoder 10 needs some time to encode a certain frame 18, such as the current frame. FIG. 11, for example, illustrates a time instant where encoder 10 has already finished encoding portion 18a of a current frame 18, while another portion 18b of current frame 18 has not yet been encoded. As encoder 10 has not yet encoded portion 18b, encoder 10 may not forecast how the available bitrate for encoding current frame 18 should be distributed spatially over current frame 18 to achieve an optimum in terms of, for example, rate/distortion sense. Accordingly, encoder 10 merely has two choices: either encoder 10 estimates a nearly-optimum distribution of the available bitrate for current frame 18 onto the slices into which current frame 18 is spatially subdivided in advance, accordingly accepting that the estimation may be wrong, or encoder 10 finalizes encoding current frame 18 prior to transmitting the packets containing the slices from encoder 10 to decoder 12. In any case, in order to be able to take advantage of any transmission of slice packets of current coded frame 18 prior to the finalization of its encoding, network 14 should be informed of the bitrates associated with each such slice packet in the form of coded picture buffer retrieval times. However, as indicated above, although encoder 10 is, in accordance with the current version of HEVC, able to vary the bitrate distributed over frames 18 by use of defining decoder buffer retrieval times for sub-picture areas individually, encoder 10 needs to transmit or send out such information via network 14 to decoder 12 at the beginning of each access unit collecting all data relating to current frame 18, thereby urging encoder 10 to choose among the just outlined two alternatives, one leading to lower delay but worse rate/distortion, the other leading to optimum rate/distortion, however at increased end-to-end delay.

Thus, so far there is no video codec enabling the achievement of such a low delay that the encoder would be enabled to start transmitting packets relating to portions 18a of the current frame prior to encoding a remaining portion 18b of the current frame, the decoder being able to exploit this intermediate transmission of packets relating to preliminary portions 18a by way of the network 16, which obeys the decoding buffer retrieval timing conveyed within the video data stream sent from encoder 12 to decoder 14. Applications which would, for example, take advantage of such low delay exemplarily encompass industrial applications such as, for example, work piece or fabrication surveillance for automation or inspection purposes or the like. Until now, there is also no satisfactory solution for informing the decoding side on the packets' association to tiles into which a current frame is structured, and interesting regions (region of interest) of a current frame so that intermediate network entities within network 16 are enabled to gather such information from the data stream without having to deeply inspect the inside of the packets, i.e. the slices syntax.

SUMMARY

According to an embodiment, a video data stream may have: video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, wherein the sequence of packets has interspersed thereinto timing control packets so that the timing control packets subdivide the access units into decoding units so that at least some access units are subdivided into two or more decoding units, with each timing control packet signaling a decoder buffer retrieval time for a decoding unit, the payload packets of which follow the respective timing control packet in the sequence of packets.

According to another embodiment, an encoder for encoding into a video data stream video content in units of sub-portions of pictures of the video content, with respectively encoding each sub-portion into one or more payload packets of a sequence of packets of the video data stream so that the sequence of packets is divided into a sequence of access units and each access unit collects the payload packets relating to a respective picture of the video content, may be configured to intersperse into the sequence of packets timing control packets so that the timing control packets subdivide the access units into decoding units so that at least some access units are subdivided into two or more decoding units, with each timing control packet signaling a decoder buffer retrieval time for a decoding unit, the payload packets of which follow the respective timing control packet in the sequence of packets.

According to another embodiment, a method for encoding into a video data stream video content in units of sub-portions of pictures of the video content, with respectively encoding each sub-portion into one or more payload packets of a sequence of packets of the video data stream so that the sequence of packets is divided into a sequence of access units and each access unit collects the payload packets relating to a respective picture of the video content, may have the steps of: interspersing into the sequence of packets timing control packets so that the timing control packets subdivide the access units into decoding units so that at least some access units are subdivided into two or more decoding units, with each timing control packet signaling a decoder buffer retrieval time for a decoding unit, the payload packets of which follow the respective timing control packet in the sequence of packets.

According to another embodiment, a decoder for decoding a video data stream having video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, may have a buffer for buffering the video data stream or a reconstruction of the video content acquired therefrom by the decoding of the video data stream and be configured to look for timing control packets interspersed into the sequence of packets, subdivide the access units into decoding units at the timing control packets so that at least some access units are subdivided into two or more decoding units, and empty the buffer in units of the decoding units.

According to another embodiment, a method for decoding a video data stream having video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, may have the steps of: using a buffer for buffering the video data stream or a reconstruction of the video content acquired therefrom by the decoding of the video data stream and including looking for timing control packets interspersed into the sequence of packets, subdividing the access units into decoding units at the timing control packets so that at least some access units are subdivided into two or more decoding units, and emptying the buffer in units of the decoding units.

According to another embodiment, a network entity for transmitting a video data stream may have video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, the decoder being configured to look for timing control packets interspersed into the sequence of packets, subdivide the access units into decoding units at the timing control packets so that at least some access units are subdivided into two or more decoding units, derive from each timing control packet a decoder buffer retrieval time for a decoding unit, the payload packets of which follow the respective timing control packet in the sequence of packets, and perform the transmission of the video data stream dependent on the decoder buffer retrieval times for the decoding units.

According to another embodiment, a method for transmitting a video data stream having video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, may have the steps of: looking for timing control packets interspersed into the sequence of packets, subdivide the access units into decoding units at the timing control packets so that at least some access units are subdivided into two or more decoding units, deriving from each timing control packet a decoder buffer retrieval time for a decoding unit, the payload packets of which follow the respective timing control packet in the sequence of packets, and performing the transmission of the video data stream dependent on the decoder buffer retrieval times for the decoding units.

Another embodiment may have a video data stream having video content encoded therein, using predictive and entropy coding, in units of slices into which pictures of the video content are spatially sub-divided, using a coding order among the slices, with restricting predictions of the predictive coding and/or entropy coding to the inner of tiles into which the pictures of the video content are spatially sub-divided, wherein the sequence of the slices are packetized into payload packets of a sequence of packets of the video data stream in the coding order, the sequence of packets being divided into a sequence of access units so that each access unit collects the payload packets having packetized thereinto slices relating to a respective picture of the video content, wherein the sequence of packets has tile identification packets interspersed thereinto between payload packets of one access unit, identifying one or more tiles overlaid by any slice packetized into one or more payload packets immediately following the respective tile identification packet in the sequence of packets.

According to another embodiment, a network entity may be configured to receive a video data stream according to claim 15 and identify, based on the tile identification packets, tiles which are overlaid by slices packetized into one or more payload packets immediately following the respective tile identification packet in the sequence of packets.

According to another embodiment, a method may have the steps of: receiving a video data stream according to claim 15 and identifying, based on the tile identification packets, tiles which are overlaid by slices packetized into one or more payload packets immediately following the respective tile identification packet in the sequence of packets.

Another embodiment may have a video data stream having video content encoded therein in units of sub-portions of pictures of the video content, each sub-portion being respectively encoded into one or more payload packets of a sequence of packets of the video data stream, the sequence of packets being divided into a sequence of access units so that each access unit collects the payload packets relating to a respective picture of the video content, wherein at least some access units have the sequence of packets has interspersed thereinto ROI packets so that the timing control packets subdivide the access units into decoding units so that at least some access units have ROI packets interspersed between payload packets relating to the picture of the respective access unit, with each ROI packet relating to one or more following payload packets in the sequence of packets, following the respective ROI packet, and identifying as to whether the sub-portions encoded into any of the one or more payload packets to which the respective ROI packet relates, overlay a region of interest of the video content.

According to another embodiment, a network entity may be configured to receive a video data stream according to claim 24 and identify, based on the ROI packets, the ROI of the video content.

According to another embodiment, a method may have the steps of: receiving a video data stream according to claim 24 and identifying, based on the ROI packets, the ROI of the video content.

Another embodiment may have a computer-program having a program code for performing, when running on a computer, a method according to claims 9, 12, 14, 23, and 33.

One idea on which the present application is based, is that decoder retrieval timing information, ROI information and tile identification information should be conveyed within a video data stream at a level which allows for an easy access by network entities such as MANEs or decoders and that, in order to reach such a level, information of such types should be conveyed within a video data stream by way of packets interspersed into packets of access units of a video data stream. In accordance with an embodiment, the interspersed packets are of a removable packet type, i.e. the removal of these interspersed packets maintains the decoder's ability to completely recover the video content conveyed via the video data stream.

In accordance with an aspect of the present application, the achievement of low end-to-end delay is rendered more effective by using the interspersed packets in order to convey information on decoder buffer retrieval times for decoding units formed by payload packets which follow the respective timing control packet in the video data stream within the current access unit. By this measure, the encoder is enabled to determine the decoder buffer retrieval times on the fly during encoding a current frame, thereby being able to, while encoding a current frame, continuously determine the bitrate actually spent for the portion of the current frame having already been encoded into payload packets and transmitted, or sent out, prefixed with timing control packets, on the one hand, and accordingly adapt the distribution of the remaining bitrate available for the current frame over the remaining portion of the current frame not yet having been encoded. By this measure, the bitrate available is effectively exploited and the delay is nevertheless kept shorter as the encoder does not need to wait to finish encoding the current frame completely.

In accordance with a further aspect of the present application, packets interspersed into a payload packet of an access unit are exploited to convey information on a region of interest, thereby enabling as outlined above an easy access of this information by network entities as they do not have to inspect the intermediate payload packets. Further, the encoder is still free to determine the packets belonging to the ROI during encoding a current frame on the fly without having to determine the current frame's subdivision into sub-portions and respective payload packets in advance. Moreover, in accordance with the embodiment according to which the interspersed packets are of a removable packet type, the ROI information may be disregarded by recipients of the video data stream not interested in the ROI information, or not able to process same.

Similar thoughts are exploited in the present application in accordance with another aspect according to which the interspersed packets convey information on which tile certain packets within an access unit belong to.

BRIEF DESCRIPTION OF THE DRAWINGS

Embodiments of the present invention will be detailed subsequently referring to the appended drawings, in which:

FIGS. 1 to 10B show a current status of the HEVC with FIG. 1 showing a buffering period SEI message syntax, FIG. 2 showing a picture timing SEI message syntax, FIGS. 3A and 3B showing a VUI parameter syntax, FIG. 4 showing an HRD parameter syntax, FIG. 5 showing filler data RBSP syntax, FIG. 6 showing a structure of byte streams and NAL unit streams for HRD conformance checks, FIG. 7 showing an HRD buffer model, FIG. 8 showing a slice header syntax, FIG. 9 showing a picture parameter set RB SP syntax, FIG. 10A showing a schematic illustrating a spatially neighboring code tree block T possibly used to invoke the coding tree block availability derivation process relative to the current coding tree block and FIG. 10B showing a definition of a structure of an access unit;

FIG. 11 schematically shows a pair of encoder and decoder connected via a network for illustrating problems occurring in video data stream transmission;

FIG. 12 shows a schematic block diagram of an encoder in accordance with an embodiment using timing control packets;

FIG. 19 shows the first simple syntax/version 1;

FIG. 20 shows the extended syntax/version 2 including tile_id signaling, decoding unit start identifier, slice prefix ID and slice header data apart from the SEI message concept;

FIG. 21 shows NAL unit type code and NAL unit type classes;

FIG. 22 shows a possible syntax for a slice header, where certain syntax elements present in the slice header according to the current version are shifted to a lower hierarchy syntax element, referred to as slice_header_data( );

FIGS. 23A to 23C show a table where all syntax elements removed from the slice header are signaled through the syntax element slice_header_data;

FIG. 24 shows a supplemental enhancement information message syntax;

FIGS. 25A and 25B show an adapted SEI payload syntax in order to introduce new slice or sub-picture SEI message types;

FIG. 26 shows an example for a sub-picture buffering SEI message;

FIG. 27 shows an example for a sub-picture timing SEI message;

FIG. 28 shows how the sub-picture slice info SEI message may look like;

FIG. 29 shows an example for a sub-picture tile info SEI message;

FIG. 30 shows a syntax example for a sub-picture tile dimension info SEI message;

FIG. 31 shows a first variant of a syntax example for a region of interest SEI message where each ROI is signaled in an individual SEI message;

FIG. 32 shows a second variant of a syntax example for a region of interest SEI message where all ROIs are signaled in a single SEI message;

FIG. 33 shows a possible syntax for a timing control packet in accordance with a further embodiment;

FIG. 34 shows a possible syntax for a tile identification packet in accordance with an embodiment;

DETAILED DESCRIPTION OF THE INVENTION

Figures 5, 6:
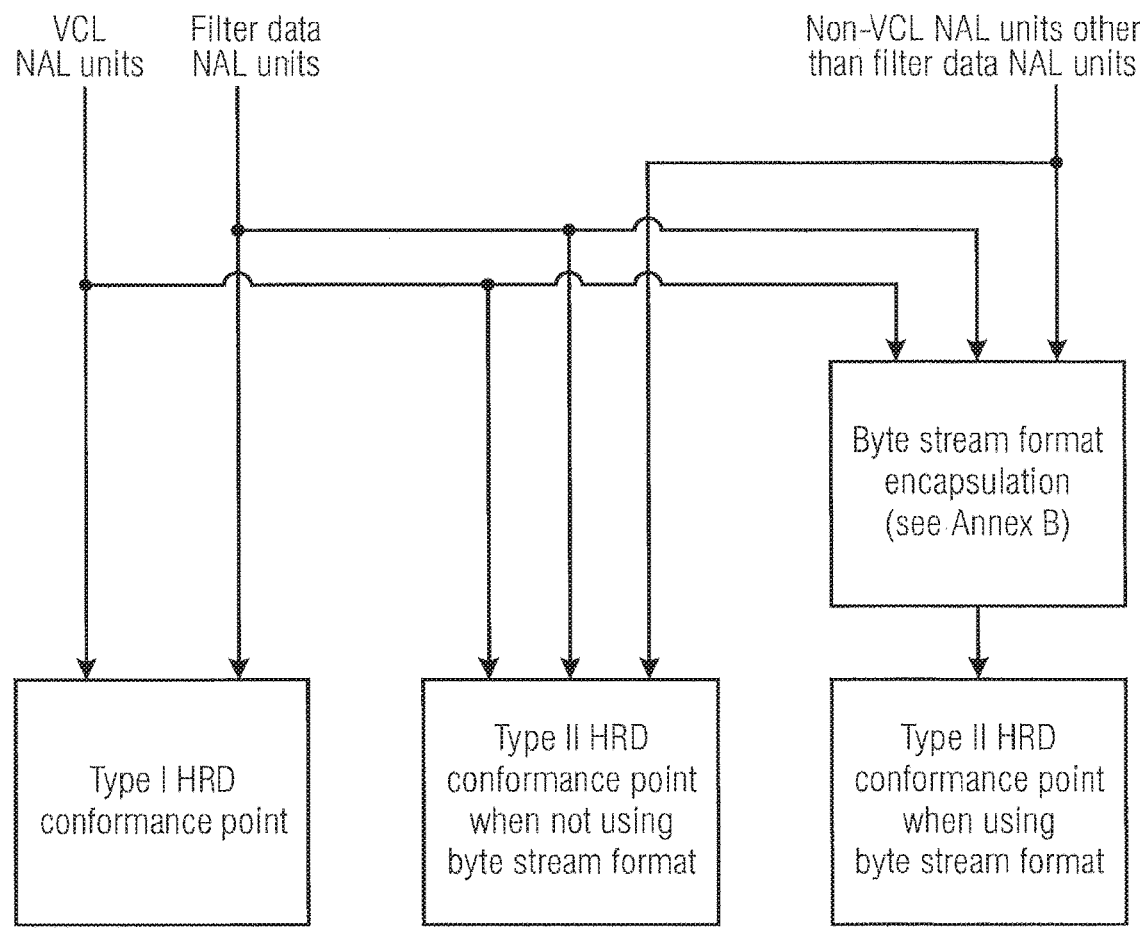
Figure 7:
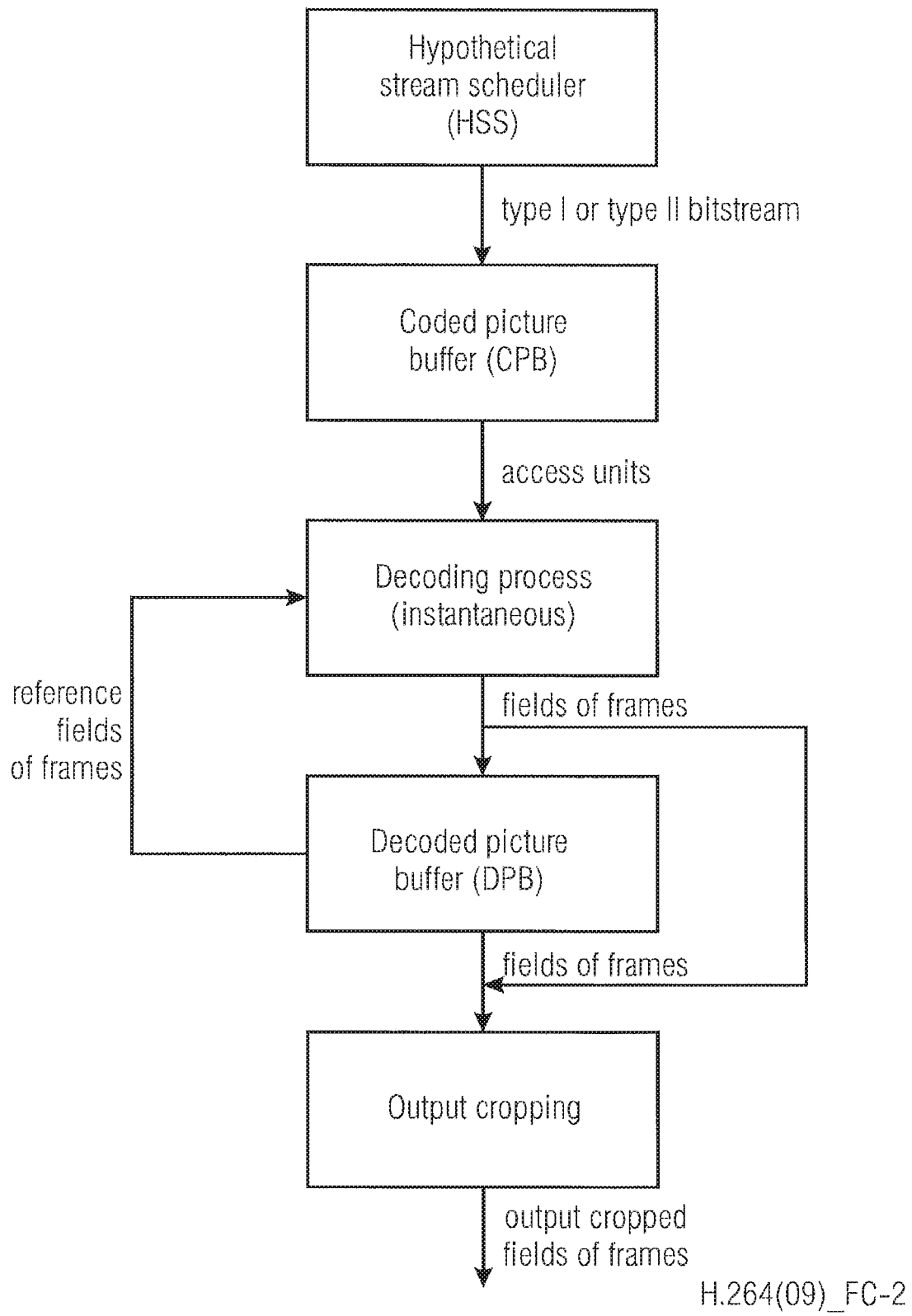
Figure 10B:
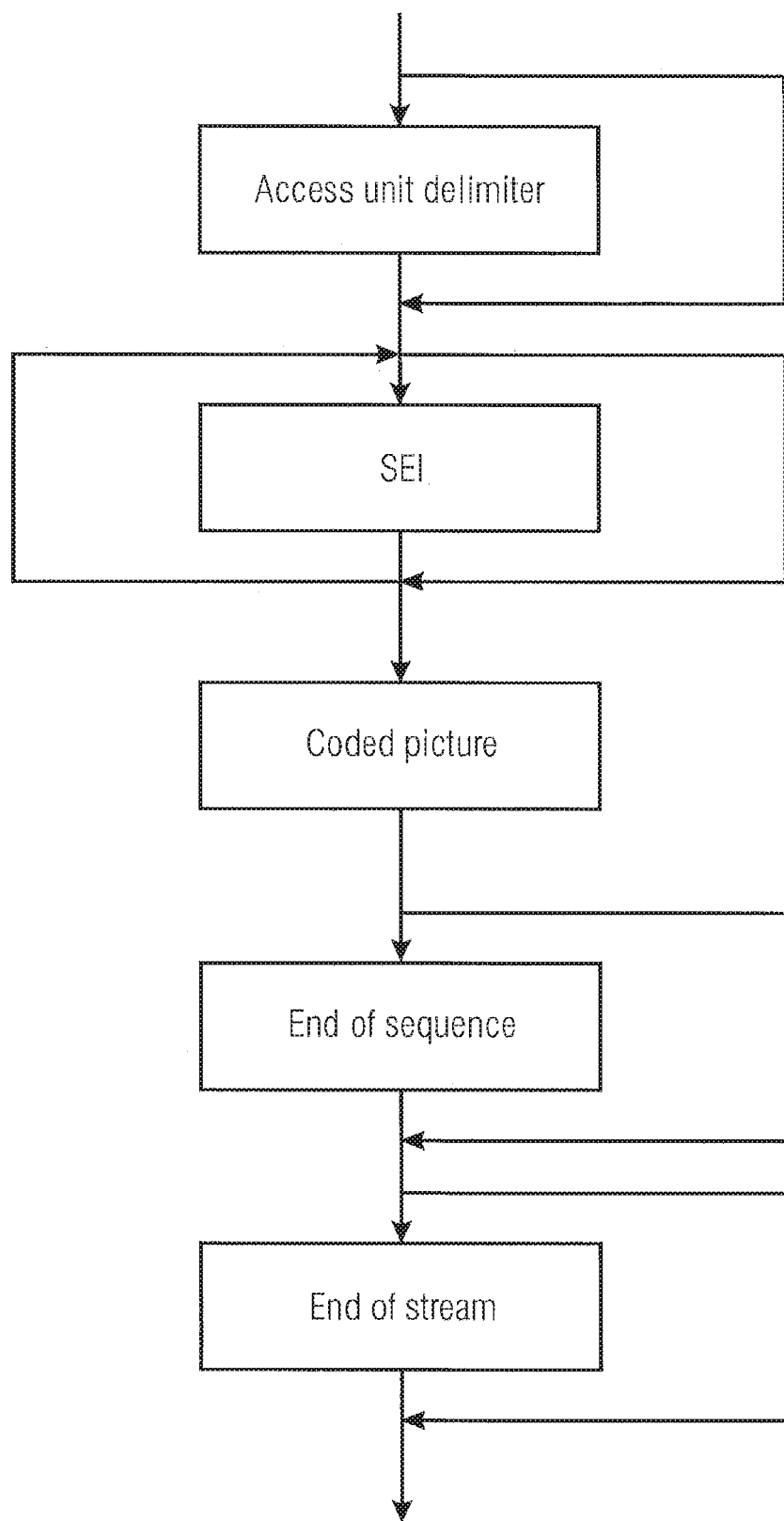

With regard to FIG. 12, an encoder 10 in accordance with an embodiment of the present application and its mode of operation is described. The encoder 10 is configured to encode video content 16 into a video data stream 22. The encoder is configured to do this in units of sub-portions of the frames/pictures 18 of the video content 16, wherein the sub-portions may, for example, be slices 24 into which the pictures 18 are partitioned, or some other spatial segments such as, for example, tiles 26 or WPP substreams 28, all of which are illustrated in FIG. 12 merely for the sake of illustrative purposes rather than suggesting that encoder 10 needs to be able to support tile or WPP parallel processing, for example, or that the sub-portions need to be slices.

In encoding the video content 16 in units of the sub-portions 24, the encoder 10 may obey a decoding order—or coding order—defined among the sub-portions 24, which for example traverses pictures 18 of video 16 in accordance with a picture decoding order which, for example, does not necessarily coincide with the reproduction order 20 defined among pictures 18, and traverses within each picture 18 blocks into which pictures 18 are partitioned, in accordance with a raster scan order, with the sub-portions 24 representing continuous runs of such blocks along the decoding order. In particular, encoder 10 may be configured to obey this decoding order in determining the availability of spatially and/or temporally neighboring portions of portions currently to be encoded in order to use attributes describing such neighboring portions in predictive coding and/or entropy coding such as, for example, to determine a prediction and/or an entropy context: Merely previously visited (coded/decoded) portions of the video are available. Otherwise, just-mentioned attributes are set to default values or some other substitute measures are taken.

On the other hand, encoder 10 does not need to serially encode sub-portions 24 along the decoding order. Rather, encoder 10 may use parallel processing to speed-up the encoding process, or to be able to perform a more complex encoding in real time. Likewise, encoder 10 may or may not be configured to transmit or send-out the data encoding the sub-portions along the decoding order. For example, encoder 10 may output/transmit the encoded data at some other order such as, for example, in accordance with the order at which the encoding of the sub-portions is finalized by encoder 10 which may, due to the parallel processing, for example, deviate from the decoding order just-mentioned.

In order to render the encoded versions of sub-portions 24 suitable for transmission over a network, encoder 10 encodes each sub-portion 24 into one or more payload packets of a sequences of packets of video data stream 22. In case of the sub-portions 24 being slices, encoder 10 may, for example, be configured to put each slice data, i.e. each encoded slice, into one payload packet, such as an NAL unit. This packetization may serve to render the video data stream 22 appropriate for transmission via a network. Accordingly, packets may represent the smallest units at which the video data stream 22 may take place, i.e. the smallest units which may be individually sent-out by encoder 10 for transmission via a network to a recipient.

Besides payload packets and the timing control packets interspersed therebetween and discussed hereinafter, other packets, i.e. packets of other type may exist as well, such as fill data packets, picture or sequence parameter set packets for conveying infrequently changing syntax elements or EOF (end of file) or AUE (access unit end) packets or the like.

The encoder performs the encoding into the payload packets such that the sequence of packets is divided into a sequence of access units 30 and each access unit collects the payload packets 32 relating to one picture 18 of the video content 16. That is, the sequence 34 of packets forming video data stream 22 is subdivided into non-overlapping portions, called access units 30, each being associated with a respective one of the pictures 18. The sequence of access units 30 may follow the decoding order of the pictures 18 which the access units 30 relate to. FIG. 12 illustrates, for example, that the access unit 30 arranged at the mid of the portion of data stream 22, illustrated, comprises one payload packet 32 per sub-portion 24 into which picture 18 is subdivided. That is, each payload packet 32 carries a corresponding sub-portion 24. The encoder 10 is configured to intersperse into the sequence 34 of packets timing control packets 36 so that the timing control packets subdivide the access units 30 into decoding units 38 so that at least some access units 30, such as the middle one shown in FIG. 12, are subdivided into two or more decoding units 38, each timing control packet signaling a decoder buffer retrieval time for a decoding unit 38, the payload packets 32 of which follow the respective timing control packet in the sequence 34 of packets. In other words, encoder 10 prefixes subsequences of the sequence of payload packets 32 within one access unit 30 with a respective timing control packet 36 signaling for the respective subsequence of payload packets prefixed by the respective timing control packet 36 and forming a decoding unit 38, a decoder buffer retrieval time. FIG. 12, for example, illustrates the case where every second packet 32 represents the first payload packet of a decoding unit 38 of access unit 30. As illustrated in FIG. 12, the amount of data or bitrate spent for each decoding unit 38 varies and the decoder buffer retrieval times may correlate with this bitrate variation among the decoding units 38 in that the decoder buffer retrieval time of a decoding unit 38 may follow the decoder buffer retrieval time signaled by the timing control packet 36 of the immediately preceding decoding unit 38 plus a time interval corresponding to the bitrate spent for this immediately preceding decoding unit 38.

Figure 13:
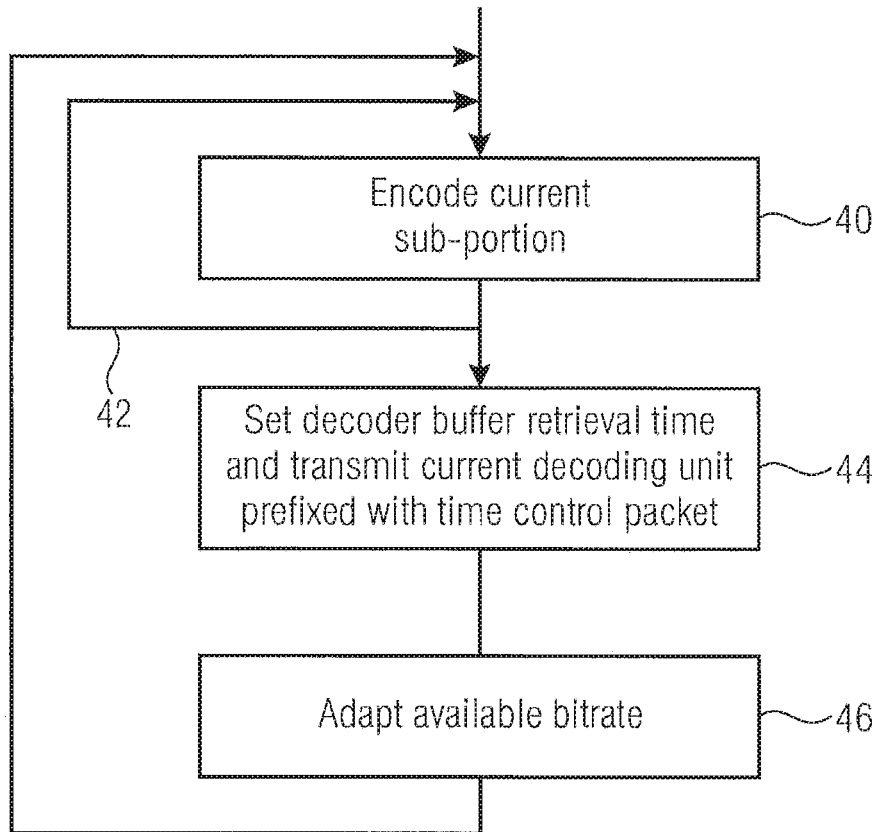
FIG. 13 shows a flow diagram illustrating a mode of operation of the encoder of FIG. 12 in accordance with an embodiment.

That is, the encoder 10 may operate as shown in FIG. 13. In particular, as mentioned above encoder 10 may, in a step 40, subject a current sub-portion 24 of a current picture 18 to an encoding. As already mentioned, encoder 10 may sequentially cycle through the sub-portions 24 in the aforementioned decoding order as illustrated by arrow 42, or encoder 10 may use some parallel processing such as WPP and/or tile processing in order to concurrently encode several "current sub-portions" 24. Irrespective of using parallel processing or not, encoder 10 forms a decoding unit out of one or several of the sub-portions just encoded in step 40 and proceeds with step 44, where the encoder 10 sets a decoder buffer retrieval time for this decoding unit and transmits this decoding unit prefixed with a time control packet signaling the just set decoder buffer retrieval time for this decoding unit. For example, the encoder 10 may determine the decoder buffer retrieval time in step 44 on the basis of the bitrate spent for encoding the sub-portions having been encoded into the payload packets forming the current decoding unit including, for example, all further intermediate packets within this decoding unit, if any, i.e. the "prefixed packets".

Then, in step 46, the encoder 10 may adapt the available bitrate on the basis of the bitrate having been spent for the decoding unit just having been transmitted in step 44. If, for example, the picture content within the decoding unit just-transmitted in step 44 was quite complex in terms of compression rate, then encoder 10 may reduce the available bitrate for the next decoding unit so as to obey some externally set target bitrate having been determined, for example, on the basis of a current bandwidth situation faced in connection with the network transmitting the video data stream 22. Steps 40 to 46 are then repeated. By this measure, pictures 18 are encoded and transmitted, i.e. sent out, in units of decoding units, each being prefixed by a corresponding timing control packet.

In other words, the encoder 10, during encoding a current picture 18 of the video content 16, encodes 40 a current sub-portion 24 of the current picture 18 into a current payload packet 32 of a current decoding unit 38, transmits 44, within the data stream, the current decoding unit 38 prefixed with a current timing control packet 36 with setting a decoder buffer retrieval time signaled by the current timing control packet (36), at a first time instant, and encodes 44, by looping back from step 46 to 40, a further sub-portion 24 of the current picture 18 at a second time instant second time visiting step 40—, later than the first time instant—first time visiting step 44.

As the encoder is able to send-out a decoding unit prior to the encoding of a remainder of the current picture to which this decoding unit belongs, encoder 10 is able to lower the end-to-end delay. On the other hand, encoder 10 does not need to waste available bitrate, as the encoder 10 is able to react to the specific nature of the content of the current picture and its spatial distribution of complexity.

Figure 14:
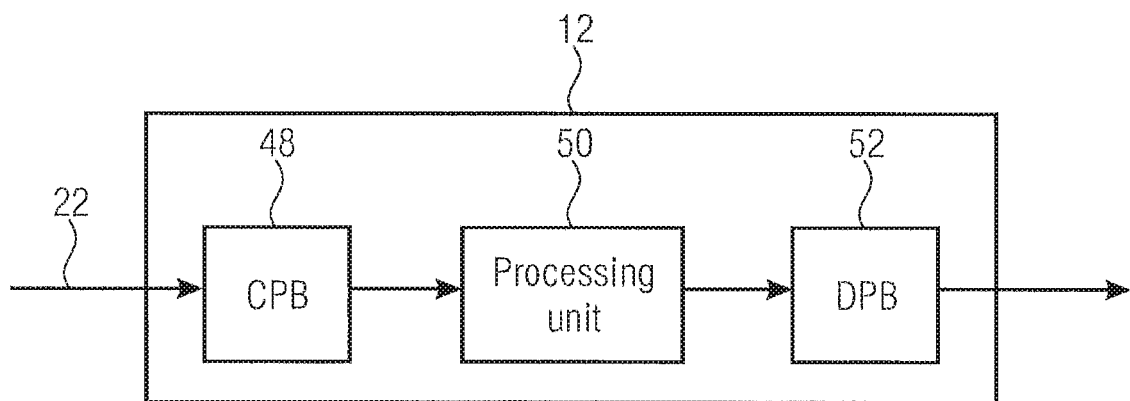
FIG. 14 shows a block diagram of an embodiment of a decoder so as to explain its functionality in connection with a video data stream generated by an encoder according to FIG. 12.

On the other hand, intermediate network entities, responsible for transmitting the video data stream 22 further from the encoder to the decoder, are able to use the timing control packets 36 so as to guarantee that any decoder receiving the video data stream 22 receives the decoding units in time so as to be able to gain advantage of the decoding unit-wise encoding and transmission by encoder 10. See, for example, FIG. 14 showing an example for a decoder for decoding the video data stream 22. Decoder 12 receives the video data stream 22 at a coded picture buffer CPB 48 by way of a network via which encoder 10 transmitted the video data stream 22 to decoder 12. In particular, as network 14 is assumed to be able to support the low delay application, network 10 inspects the decoder buffer retrieval times so as to forward the sequence 34 of packets of video data stream 22 to the coded picture buffer 48 of decoder 12 so that each decoding unit is present within the coded picture buffer 48 prior to the decoder buffer retrieval time signaled by the timing control packet prefixing the respective decoding unit. By this measure, the decoder is able to, without stalling, i.e. without running out of available payload packets within coded picture buffer 48, use the decoder buffer retrieval times in the timing control packets so as to empty the decoder's coded picture buffer 48 in units of the decoding units rather than complete access units. FIG. 14, for example, shows for illustrative purposes, a processing unit 50 as being connected to an output of coded picture buffer 48, the input of which receives the video data stream 22. Similar to encoder 10, decoder 12 may be able to perform parallel processing such as, for example, using tile parallel processing/decoding and/or WPP parallel processing/decoding.

As will be outlined in more detail below, the decoder buffer retrieval times mentioned so far do not necessarily pertain to retrieval times concerning the coded picture buffer 48 of decoder 12. Rather, the timing control packets may additionally, or alternatively, steer the retrieval of already decoded picture data of a corresponding decoded picture buffer of a decoder 12. FIG. 14 shows, for example, decoder 12 as comprising a decoder picture buffer in which the decoded version of the video content, as obtained by processing unit 50 by decoding video data stream 22, is buffered, i.e. stored and output, in units of decoded versions of decoding units. Decoder's decoded picture buffer 22 thus may be connected between decoder's 12 output and the output of processing unit 50. By having the ability to set the retrieval times for outputting decoded versions of decoding units from decoded picture buffer 52, the encoder 10 is given the opportunity to, on the fly, i.e. during encoding a current picture, control the reproduction, or end-to-end, delay of the reproduction of the video content at decoding side even at a granularity smaller than the picture rate or frame rate. Obviously, over-segmenting each picture 18 into a huge amount of sub-portions 24 at the encoding side would negatively affect the bitrate for transmitting the video data stream 22, although on the other hand, the end-to-end delay may be minimized since the time needed to encode and transmit and decode and output such a decoding unit would be minimized. On the other hand, increasing the size of the sub-portions 24 increases the end-to-end delay. Accordingly, a compromise has to be found. Using the just mentioned decoder buffer retrieval times so as to steer the output timing of decoded versions of sub-portions 24 in units of decoding units, enables the encoder 10 or some other unit at the encoding side to adapt this compromise spatially over the current picture's content. By this measure, it would be possible to control the end-to-end delay in such a way, that same varies spatially across the current pictures content.

In implementing the above outlined embodiments, it is possible to use, as the timing control packets, packets of a removable packet type. Packets of a removable packet type are not necessary in order to recover the video content at the decoding side. In the following, such packets are called SEI packets. Further packets of a removable packet type may exist as well, that is, removable packets of another type such as, if transmitted in-stream, redundancy packets. As another alternative, timing control packets may be packets of a certain removable packet type, additionally carrying, however, a certain SEI packet type field. For example, timing control packets may be SEI packets with each SEI packet carrying one or several SEI messages, and only those SEI packets which comprise an SEI message of a certain type form the aforementioned timing control packets.

Thus, the embodiment described so far with respect to FIGS. 12 to 14 is, in accordance with a further embodiment, applied onto the HEVC standard, thereby forming a possible concept for rendering HEVC more effective in achieving lower end-to-end delay. In doing so, the above mentioned packets are formed by NAL units and the aforementioned payload packets are the VCL NAL units of an NAL unit stream with slices forming the above mentioned sub-portions.

Before such a description of a more detailed embodiment, however, further embodiments are described which coincide with the above outlined embodiments in that interspersed packets are used in order to convey, in an efficient manner, information describing the video data stream, but the sort of information differs from the above embodiments where the timing control packets conveyed decoder buffer retrieval timing information. In the embodiments described further below, the kind of information transferred via interspersed packets interspersed into the payload packets belonging to an access unit, relate to region of interest (ROI) information and/or tile identification information. The embodiments described further below may or may not be combined with the embodiments described with respect to FIGS. 12 to 14.

Figure 15:
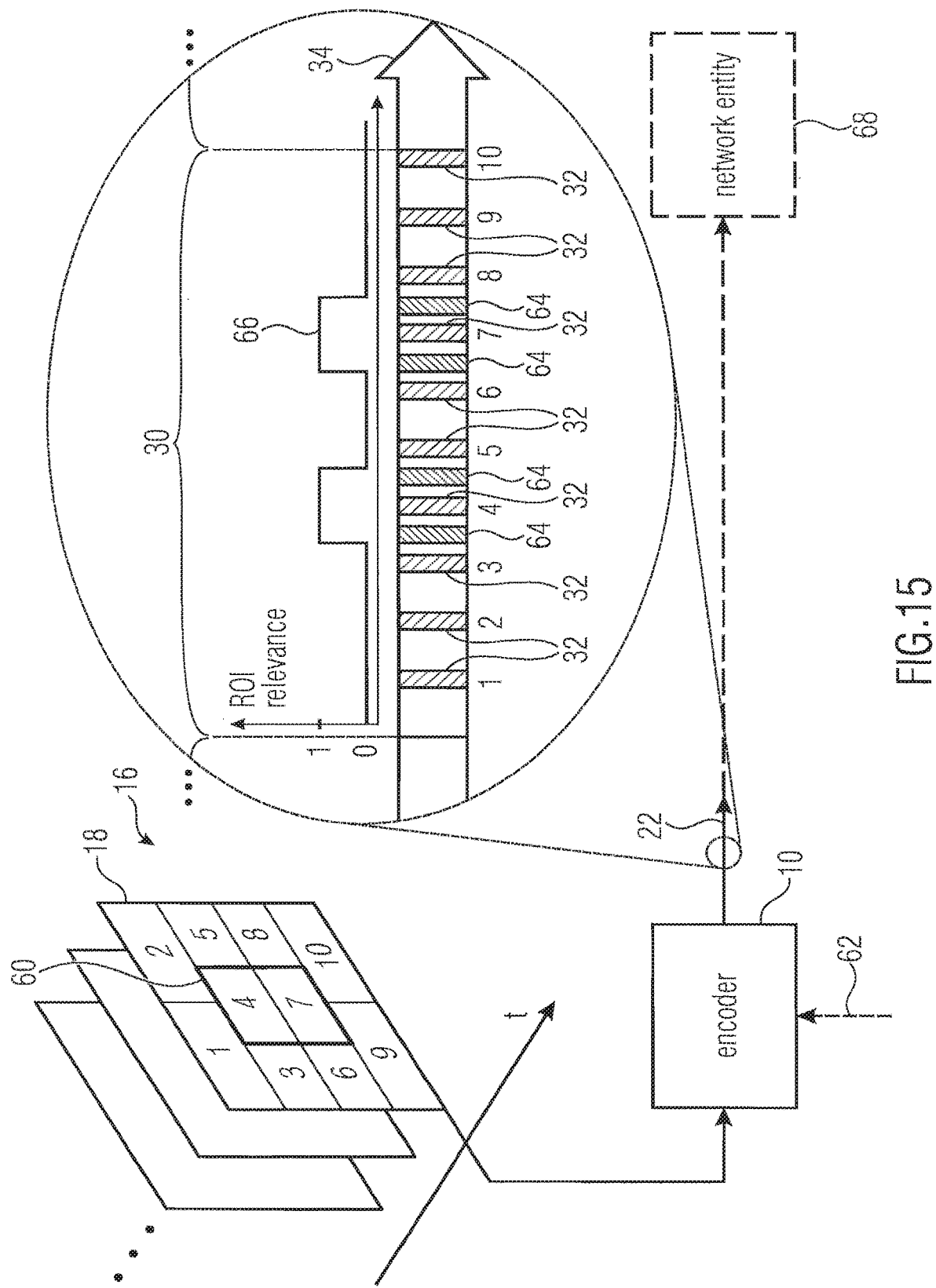
FIG. 15 shows a schematic block diagram illustrating an encoder, network entity and video data stream in accordance with a further embodiment using ROI packets.

FIG. 15 shows an encoder 10 which operates similar to the one explained above with respect to FIG. 12, except for the interspersing of timing control packets and the functionality described above with respect to FIG. 13, which is optional for encoder 10 of FIG. 15. However, encoder 10 of FIG. 15 is configured to encode video content 16 into a video data stream 22 in units of sub-portions 24 of the pictures 18 of the video content 16 just as it was explained above with respect to FIG. 11. In encoding the video content 16, encoder 10 is interested in conveying, along with the video data stream 22, information on a region of interest ROI 60 to the decoding side. The ROI 60 is a spatial subarea of a current picture 18, which the decoder should, for example, pay special attention to. The spatial position of the ROI 60 may be input to encoder 10 from outside, as illustrated by a dashed line 62, such as by user input, or may be determined automatically by encoder 10 or by some other entity, on the fly during the encoding of current picture 18. In either case, encoder 10 faces the following problem: the indication of the location of the ROI 60 is in principle no problem for encoder 10. To do this, the encoder 10 may easily indicate the location of the ROI 60 within the data stream 22. However, in order to render this information easily accessible, encoder 10 of FIG. 15 uses the interspersing of ROI packets between the payload packets of the access units so that encoder 10 is free to, on an online basis, choose the segmentation of the current picture 18 into sub-portions 24 and/or the number of payload packets into which the sub-portions 24 are packetized, spatially outside and spatially inside the ROI 60. Using the interspersed ROI packets, any network entity may easily identify payload packets which belong to the ROI. On the other hand, in case of using removable packet type for these ROI packets, same may easily be disregarded by any network entity.

FIG. 15 shows an example for interspersing ROI packets 64 between the payload packets 32 of an access unit 30. The ROI packet 64 indicates where within the sequence 34 of packets of the video data stream 22 encoded data is contained which relates to, i.e. encodes, the ROI 60. How ROI packet 64 indicates the location of ROI 60 may be implemented in manifold ways. For example, the pure existence/occurrence of an ROI packet 64 may indicate the incorporation of encoded data relating to the ROI 60 within one or more of the following payload packets 32, following in the sequential order of sequence 34, i.e. belonging to the prefixed payload packets. Alternatively, a syntax element inside the ROI packet 64 may indicate whether one or more following payload packets 32 pertain to, i.e. at least partially encode, the ROI 60 or not. The high number of variance also stems from possible variations regarding the "scope" of the respective ROI packet 64, i.e. the number of prefixed payload packets prefixed by one ROI packet 64. For example, the indication of incorporation or non-incorporation of any encoded data relating to the ROI 60 within one ROI packet, may relate to all payload packets 32 following in the sequential order of sequence 34 up to the occurrence of the next ROI packet 64, or may merely relate to the immediately following payload packet 32, i.e. the payload packet 32 immediately following the respective ROI packet 64 in the sequential order of sequence 34. In FIG. 15, a graph 66 exemplarily illustrates a case where the ROI packets 64 indicate an ROI relevance, i.e. the incorporation of any encoded data relating to the ROI 60, or ROI-non-relevance, i.e. the absence of any encoded data relating to the ROI 60, in relation to all payload packets 32 occurring downstream of the respective ROI packet 64 up to the occurrence of the next ROI packet 64 or the end of the current access unit 30 whatever occurs earlier along the sequence 34 of packets. In particular, FIG. 15 illustrates the case where an ROI packet 64 has a syntax element inside, which indicates whether or not the payload packets 32 following in the sequential order of packet sequence 34 have any encoded data relating to the ROI 60 inside or not. Such an embodiment is also described hereinafter. However, another possibility is, as just mentioned, that each ROI packet 64 indicates merely by its presence in packet sequence 34 that the payload packet(s) 32 belonging to the "scope" of the respective ROI packet 64, has ROI 60 relating data inside, i.e. data relating to ROI 60. In accordance with an embodiment described hereinafter in more detail, the ROI packet 64 even indicates the location of the portion of the ROI 60 encoded into the payload packet(s) 32 belonging to its "scope".

Any network entity 68 receiving the video data stream 22 may exploit the indication of ROI relevance as realized by use of the ROI packets 64 so as to treat, for example, ROI relevant portions of the sequence 34 of packets with higher priority than other portions of the packet sequence 34, for example. Alternatively, the network entity 68 could use the ROI relevance information so as to perform other tasks relating to, for example, the transmission of the video data stream 22. The network entity 68 may be, for example, a MANE or a decoder for decoding and playing-back the video content 60 as conveyed via the video data stream 22. 28. In other words, network entity 68 may use a result of the identification of ROI packets so as to decide on transmission tasks pertaining the video data stream. The transmission tasks may comprise re-transmission requests concerning defect packets. The network entity 68 may be configured to handle the region of interest 70 with increased priority and assign a higher priority to ROI packets 72 and their associated payload packets, i.e. the ones prefixed by it, which are signaled as overlaying the region of interest, than compared to ROI packets and their associated payload packets, which are signaled as not overlaying the ROI. Network entity 68 may first request a retransmission of payload packets having the higher priority assigned thereto, before requesting any retransmission of payload packets having the lower priority assigned thereto.

The embodiment of FIG. 15 may easily be combined with the embodiment described previously with respect to FIGS. 12 to 14. For example, the ROI packets 64 mentioned above may also be SEI packets having a certain type of SEI message contained therein, namely an ROI SEI message. That is, an SEI packet may, for example, be a timing control packet and concurrently an ROI packet, namely if the respective SEI packet comprises both timing control information as well as ROI indication information. Alternatively, an SEI packet may be one of a timing control packet and an ROI packet, rather than the other one, or may be neither an ROI packet or a timing control packet.

Figure 16:
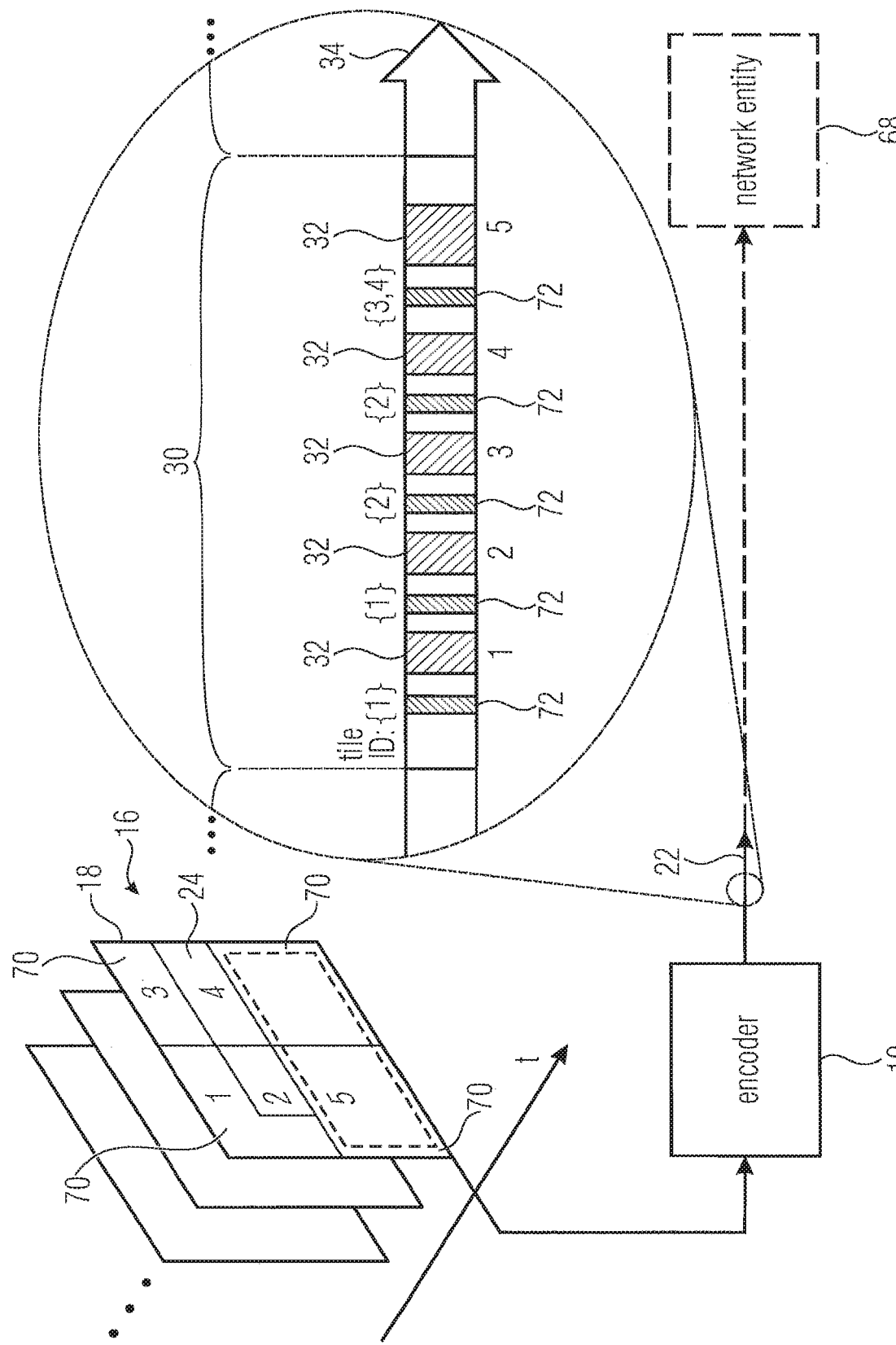
FIG. 16 shows a schematic block diagram illustrating an encoder, network entity and video data stream in accordance with a further embodiment using tile identification packets.

In accordance with the embodiment shown in FIG. 16, interspersing of packets between the payload packets of the access units is used to indicate, in a manner easily accessible for network entities 68 handling the video data stream 22, which tile or tiles of the current picture 18, which the current access unit 30 relates to, is overlaid by any sub-portion encoded into any of the payload packets 32 for which the respective packets serve as a prefix. In FIG. 16, for example, current picture 18 is shown to be sub-divided into four tiles 70, here exemplarily formed by the four quadrants of the current picture 18. The subdivision of the current picture 18 into tiles 70 may, for example, be signaled within the video data stream in units comprising sequences of pictures such as, for example, in VPS or SPS packets also interspersed into the sequence 34 of packets. As will be described in more detail below, a tile subdivision of current picture 18 may be a regular subdivision of picture 18 in columns and rows of tiles. The number of columns and the number of rows as well as the width of the columns and the height of the rows of tiles may be varied. In particular, the width and height of columns/rows of tiles may be different for different rows and different columns, respectively. FIG. 16 additionally shows the example where the sub-portions 24 are slices of picture 18. The slices 24 subdivide picture 18. As will be outlined in more detail below, picture's 18 subdivision into slices 24 may be subject to constraints according to which each slice 24 may either be completely contained within one single tile 70, or completely cover two or more tiles 70. FIG. 16 illustrates a case where picture 18 is subdivided into five slices 24. The first four of these slices 24 in the aforementioned decoding order cover the first two tiles 70, while the fifth slice completely covers the third and fourth tiles 70.

Further, FIG. 16 illustrates the case where each slice 24 is individually encoded into a respective payload packet 32. Further, FIG. 16 exemplarily illustrates the case where each payload packet 32 is prefixed by a preceding tile identification packet 72. Each tile identification packet 72, in turn, indicates for its immediately succeeding payload packet 32 as to which of the tiles 70 the sub-portion 24 encoded into this payload packet 32 overlays. Accordingly, while the first two tile identification packets 72 within access unit 30 relating to current picture 18 indicate the first tile, the third and fourth tile identification packet 72 indicate the second tile 70 of picture 18, and the fifth tile identification packet 72 indicates the third and fourth tiles 70. With regard to the embodiment of FIG. 16, the same variations are feasible as described above with respect to FIG. 15, for example. That is, the "scope" of the tile identification packets 72 may, for example, merely encompass the first immediately succeeding payload packet 32 or the immediately succeeding payload packets 32 up to the occurrence of the next tile identification packet.

With regard to the tiles, encoder 10 may be configured to encode each tile 70 such that, across tile boundaries, no spatial prediction or no context selection takes place. Encoder 10 may, for example, encode tile 70 in parallel. Likewise, any decoder such as network entity 68 may decode the tiles 70 in parallel.

The network entity 68 may be a MANE or a decoder or some other device in between encoder 10 and decoder, and may be configured to use the information conveyed by the tile identification packets 72 to decide on certain transmission tasks. For example, network entity 68 may handle a certain tile of the current picture 18 of video 16 with higher priority, i.e. may forward the respective payload packets indicated as relating to such a tile earlier or using safer FEC protection or the like. In other words, the network entity 68 may use a result of the identification so as to decide on transmission tasks pertaining the video data stream. The transmission tasks may comprise re-transmission requests concerning packets received in a defect state—i.e. with exceeding any FEC protection of the video data stream, if any. The network entity may handle, for example, different tiles 70 with different priority. To this end, the network entity may assign a higher priority to tile identification packets 72 and their payload packets, i.e. the ones prefixed thereby, pertaining to higher priority tiles, than compared to tile identification packets 72 and their payload packets pertaining to lower priority tiles. Network entity 68 may, for example, first request a retransmission of payload packets having the higher priority assigned thereto, before requesting any retransmission of payload packets having the lower priority assigned thereto.

The embodiments described so far may be built into the HEVC framework as described in the introductory portion of the specification of the present application as described in the following.

Figure 17:
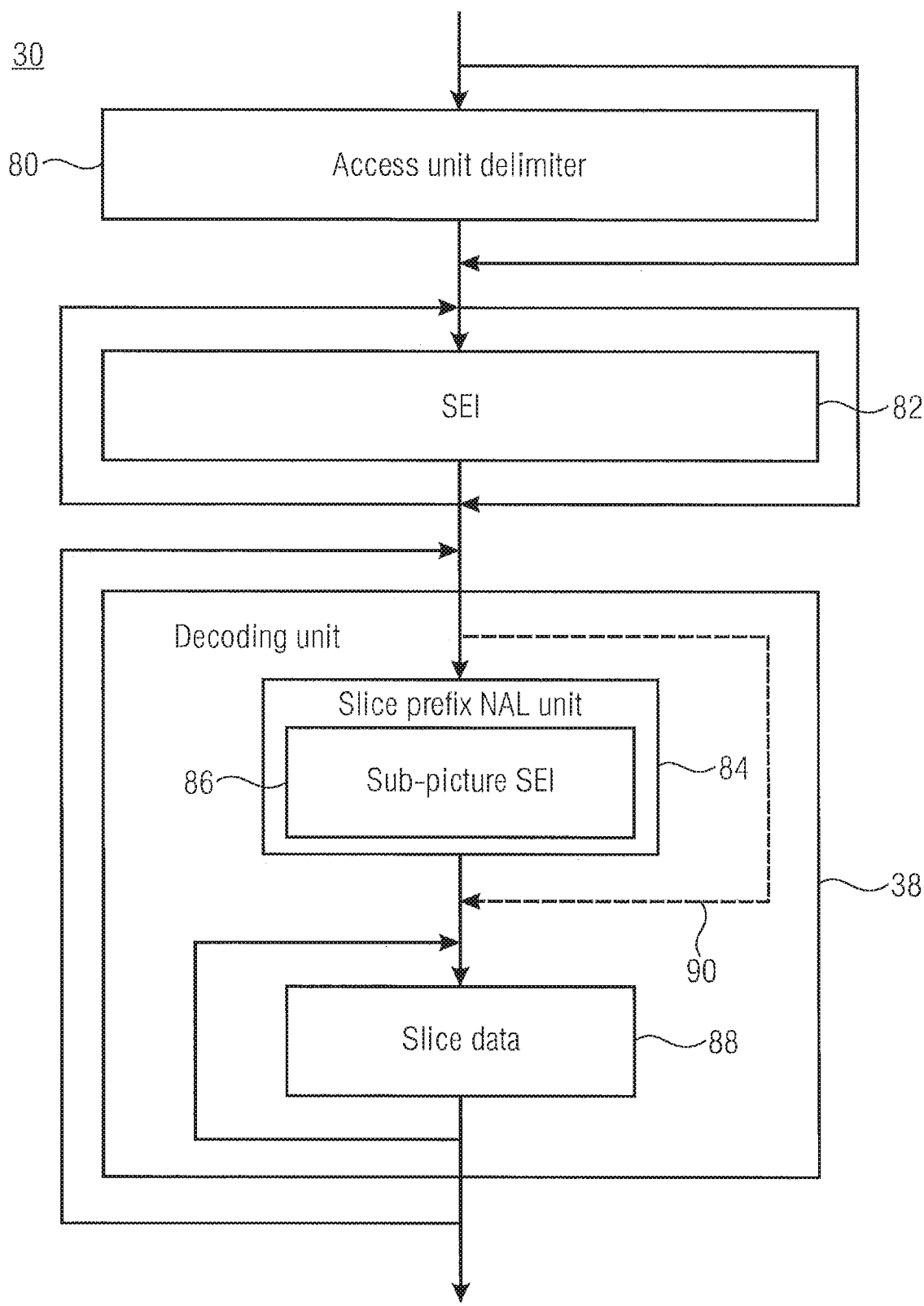
FIG. 17 shows a structure of an access unit according to an embodiment. The dashed line reflects the case of a non-mandatory slice prefix NAL unit.

In particular, SEI messages may be assigned to slices of decoding units in the sub-picture CPB/HRD case. That is, buffering period and timing SEI messages may be assigned to the NAL units containing the slices of a decoding unit. This can be achieved by a new NAL unit type which is a non-VCL NAL unit which is allowed to directly precede one or more slice/VCL NAL units of a decoding unit. This new NAL unit may be called slice prefix NAL unit. FIG. 17 illustrates the structure of an access unit omitting any tentative NAL units for end of sequence and stream.

In accordance with FIG. 17, an access unit 30 is construed as follows: in the sequential order of packets of the sequence 34 of packets, the access unit 30 may start with the occurrence of a special type of packet, namely an access unit delimiter 80. Then one or more SEI packets 82 of an SEI packet type relating to the whole access unit may follow within the access unit 30. Both packet types 80 and 82 are optional. That is, no packet of this type may occur within an access unit 30. Then, the sequence of decoding units 38 follows. Each decoding unit 38 optionally starts with a slice prefix NAL unit 84, including therein for example timing control information or in accordance with the embodiment of FIG. 15 or 16, an ROI information or tile information or, even more generally, a respective sub-picture SEI message 86. Then, the actual slice data 88 in respective payload packets or VCL NAL units follows as indicated in 88. Thus, each decoding unit 38 comprises a sequence of a slice prefix NAL unit 84 followed by respective slice data NAL unit(s) 88. The bypass arrow 90 in FIG. 17, bypassing the slice prefix NAL unit, shall indicate that in case of no decoding unit subdivision of the current access unit 30 there may be no slice prefix NAL unit 84.

As already noted above, all information signaled in the slice prefix and associated sub-picture SEI messages may be either valid for all VCL NAL units in the access unit or until the occurrence of a second prefix NAL unit or for the following VCL-NAL unit in decoding order, depending on a flag given in the slice prefix NAL unit.

The slice VCL NAL unit for which the information signaled in the slice prefix is valid are referred to as prefixed slices in the following. Prefixed slices associated with the a single slice prefixed do not necessarily constitute a complete decoding unit but can be a part of it. However, a single slice prefix cannot be valid for multiple decoding units (sub-pictures) and the start of a decoding unit is signaled in the slice prefix. If means for signaling are not given through the slice prefix syntax (as in the "simple syntax"/version 1 indicated below) the occurrence of a slice prefix NAL unit signals the start of a decoding unit. Only certain SEI messages (identified via payloadType in the syntax description below) can be sent exclusively on sub-picture level within the slice prefix NAL unit, while some SEI messages can be sent either in the slice prefix NAL unit on sub-picture level or as a regular SEI message on access unit level.

As discussed above with respect to FIG. 16, additionally or alternatively, a tile ID SEI message/tile ID signaling may be realized in high level syntax. In earlier designs of a HEVC, the slice header/the slice data contained an identifier for the tile contained in the respective slice. For example, the slice data semantics read:

tile_idx_minus_1 specifies the TileID in raster scan order. The first tile in the picture shall have a TileID of 0. The value of tile_idx_minus_1 shall be in the range of 0 to (num_tile_columns_minus1+1)*(num_tile_rows_minus1+1)−1.

This parameter however is not considered useful since this ID can be easily derived from the slice address and the slice dimensions as signaled in the picture parameter set, if tiles_or_entropy_coding_sync_idc is equal to 1.

Although the tile ID can be derived implicitly in the decoding process, the knowledge of this parameter on the application layer is also important for different use cases such as, for example, in a video conferencing scenario where different tiles may have different priority for the playback (those tiles typically form the region of interest which contain the speaker in a conversational use case) may have higher priority than other tiles. In case of losing network packets in the transmission of multiple tiles, those network packets containing tiles representing the region of interest may be retransmitted with higher priority in order to keep the quality of the experience at the receiver terminal higher than in the case retransmitting tiles without any priority order. Another use case may be to assign tiles, if the dimensions and their position are known, to different screens, e.g. in a video conferencing scenario.

In order to allow such an application layer to handle tiles with a certain priority in transmission scenarios, the tile_id may be provided as a sub-picture or slice-specific SEI message or in a special NAL unit in front of one or more NAL units of the tile or in a special header section of the NAL unit belonging to the tile.

As described above with respect to FIG. 15, region of interest SEI messages may also be additionally or alternatively provided. Such an SEI message could allow the signaling of the region of interest (ROI), in particular the signaling of an ROI that a certain tile_id/tile belongs to. The message could allow to give region of interest IDs plus a priority of a region of interest.

Figure 18:
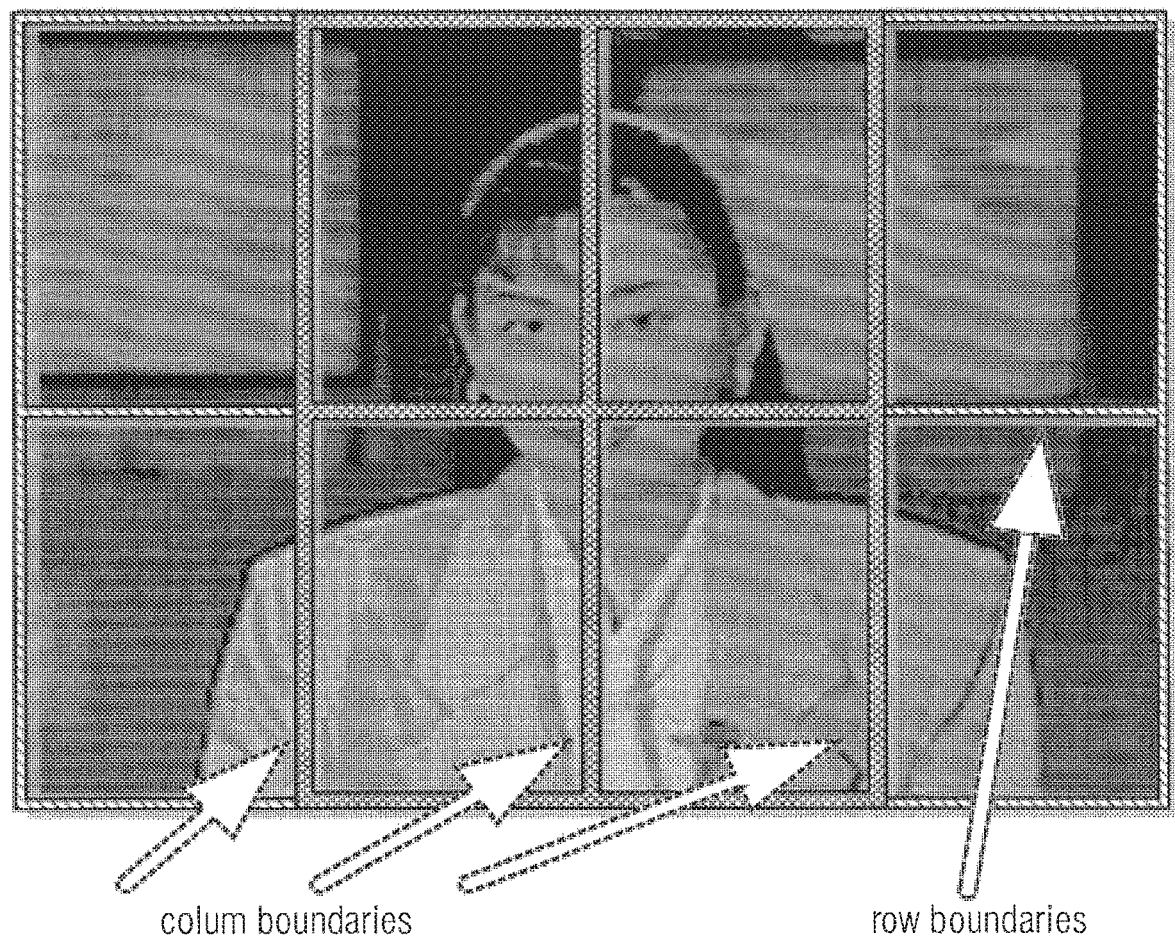
FIG. 18 shows the use of tiles in region of interest signaling.

FIG. 18 illustrates the use of tiles in region of interest signaling.

In addition to what has been described above, slice header signaling could be implemented. The slice prefix NAL unit may also contain the slice header for the following dependent slices, i.e. the slices prefixed by the respective slice prefix. If the slice header is only provisioned in the slice prefix NAL unit, the actual slice type needs to be derived by the NAL unit type of the NAL unit containing the respective dependent slice or by means of a flag in the slice prefix signaling whether the following slice data belongs to a slice type that serves as a random access point.

Furthermore, the slice prefix NAL unit may carry slice or sub-picture specific SEI messages to convey non-mandatory information such as sub-picture timing or a tile identifier. Non-mandatory sub-picture specific messaging is not supported in the HEVC specification described in the introductory portion of the specification of the present application, but is crucial for certain applications.

In the following, possible syntax for implementing the above-outlined concept of slice prefixing is described. In particular, it is described which changes could suffice on a slice level when using the HEVC status as outlined in the introductory portion of the specification of the present application as a basis.

In particular, in the following, two versions of a possible slice prefix syntax are presented, one with a functionality of SEI messaging only, and one with the extended functionality of signaling a portion of the slice header for the following slices. The first simple syntax/version 1 is shown in FIG. 19.

As a preliminary note, FIG. 19 thus shows a possible implementation for implementing any of the embodiments described above with respect to FIGS. 11 to 16. The interspersed packets shown therein may be construed as shown in FIG. 19 and in the following this is described in more detail with specific implementation examples.

The extended syntax/version 2 including tile_id signaling, decoding unit start identifier, slice prefix ID and slice_header_data apart from the SEI message concept is given in the table of FIG. 20.

The semantics could be defined as follows:

rap_flag with a value of 1 indicates that the access unit containing the slice prefix is a RAP picture. rap flag with a value of 0 indicates that the access unit containing the slice prefix is not a RAP picture.

decoding_unit_start_flag indicates the start of a decoding unit within the access unit, thus that the following slices up to the end of the access unit or the start of another decoding unit belong to the same decoding unit.

single_slice_flag with a value of 0 indicates that the information provided within the prefix slice NAL unit and the associated sub-picture SEI messages is valid for all following VCL-NAL units until the start of the next access unit, the occurrence of another slice prefix or another complete slice header, single_slice_flag with a value 1 indicates that all information provided in the slice prefix NAL unit and associated sub-picture SEI messages is valid only for the next VCL-NAL unit in decoding order.

tile_idc indicates the amount of tiles to be present in the following slice tile_idc equal to 0 indicates that no tiles are used in the following slice. tile_idc equal to 1 indicates that a single tile is used in the following slice and its tile identifier is signaled accordingly. tile_idc with a value of 2 indicates that multiple tiles are used within the following slice and number of tiles and the first tile identifier are signaled accordingly.

prefix_slice_header_data_present_flag indicates that data of the slice header, corresponding to the slices following in decoding order is signaled in the given slice prefix.

slice_header_data( ) is defined later in the text. It contains the relevant slice header information, which is not covered by the slice header, if dependent_slice_flag is set equal to 1.

Note that the decoupling of slice header and actual slice data allows for more flexible transmission schemes of header and slice data.

num_tiles_in_prefixed_slices_minus1 indicates the number of tiles used in the following decoding unit minus1.

first_tile_id_in_prefixed_slices indicates the tile identifier of the first tile in the following decoding unit.

For the simple syntax/version 1 of the slice prefix, the following syntax elements may be set to default values as follows, if not present:

decoding_unit_start equal to 1, i.e. the slice prefix indicates a start of a decoding unit.

single_slice_flag equal to 0, i.e. the slice prefix is valid for all slices in the decoding unit.

The slice prefix NAL unit is proposed to have a NAL unit type of 24 and the NAL unit type overview table to be extended according to FIG. 21.

That is, briefly summarizing FIGS. 19 to 21, the syntax details shown therein reveal that a certain packet type may be attributed to the above identified interspersed packets, here exemplarily NAL unit type 24. Moreover, especially the syntax example of FIG. 20 makes it clear that the above described alternatives regarding the "scope" of the interspersed packets, a switching mechanism controlled by a respective syntax element within these interspersed packets themselves, here exemplarily single_slice_flag, may be used in order to control this scope, i.e. to switch between different alternatives for the definition of this scope, respectively. Moreover, it has been made clear that the above described embodiments of FIGS. 1 to 16 may be extended in that the interspersed packets also comprise common slice_header_data for slices 24 contained in the packets belonging to the "scope" of the respective interspersed packets. That is, there may be a mechanism controlled by a respective flag within these interspersed packets, which indicates whether common slice_header_data is contained within the respective interspersed packet or not.

Of course, the concept just presented according to which part of the slice_header_data is shifted into the slice header prefix, entails changes to the slice headers as specified in the HEVC's current version. The table in FIG. 22 shows a possible syntax for such a slice header, where certain syntax elements present in the slice header according to the current version, are shifted to a lower hierarchy syntax element, referred to as slice_header_data( ). This syntax of the slice header and the slice_header_data only applies to the option according to which the extended slice header prefix NAL unit concept is used.

In FIG. 22, slice_header_data_present_flag indicates that slice_header_data for the present slice shall be predicted from the values signaled in the last slice prefix NAL unit in the access unit, i.e. the most recently occurring slice prefix NAL unit.

All syntax elements removed from the slice header are signaled through the syntax element slice_header_data as given in the table of FIGS. 23A to 23C.

That is, transferring the concept of FIG. 22 and FIGS. 23A to 23C onto the embodiments of FIGS. 12 to 16, the interspersed packets described therein may be extended by the concept of incorporating into these interspersed packets, a part of the slice header syntax of the slices (sub-portions) 24 encoded into the payload packets, i.e. VCL NAL units. The incorporation may be optional. That is, a respective syntax element in the interspersed packet may indicate whether such slice header syntax is contained in the respective interspersed packet or not. If incorporated, the respective slice header data incorporated into a respective interspersed packet may apply to all slices contained in the packet belonging to the "scope" of the respective interspersed packet. Whether the slice header data contained in an interspersed packet is adopted by a slice encoded into any of the payload packets belonging to the scope of this interspersed packet, may be signaled by a respective flag, such as slice_header_data_present_flag of FIG. 22. By this measure, the slice headers of the slices encoded into the packets belonging to the "scope" of a respective interspersed packet may be downsized accordingly using the just mentioned flag in the slices slice header and any decoder receiving the video data stream, such as the network entities shown in the above FIGS. 12 to 16, would be responsive to the just mentioned flag in the slices slice header so as to copy the slice header data incorporated into an interspersed packet into the slice header of a slice encoded into a payload packet belonging to the scope of this interspersed packet in case of the respective flag within that slice signaling the displacement of the slice header data to the slice prefix, i.e. the respective interspersed packet.

Proceeding further with the syntax example for implementing the embodiments of FIGS. 12 to 16, the SEI message syntax may be as shown in FIG. 24. In order to introduce slice or sub-picture SEI message types, the SEI payload syntax may be adapted as presented in the table of FIGS. 25A and 25B. Only the SEI message with payloadType in the range of 180 to 184 may be sent exclusively on sub-picture level within the slice prefix NAL unit. Additionally, the region of interest SEI messages with payloadType equal to 140 can be sent either in the slice prefix NAL unit on sub-picture level, or the regular SEI message on access unit level.

That is, in transferring the details shown in FIGS. 25 and 24 onto the embodiments described above with respect to FIGS. 12 to 16, the interspersed packets shown in these embodiments of FIGS. 12 to 16 may be realized by using slice prefix NAL units with a certain NAL unit type, e.g. 24, comprising a certain type of SEI message signaled by payloadType at the beginning of each SEI message within the slice prefix NAL unit, for example. In the specific syntax embodiment described now, payloadType=180 and payloadType=181 results in a timing control packet in accordance with the embodiments of FIGS. 11 to 14, while payloadType=140 results in an ROI packet in accordance with the embodiment of FIG. 15, and payloadType=182 results in a tile identification packet in accordance with the embodiment of FIG. 16. The specific syntax example described herein below may comprise merely one or a subset of the just mentioned payloadType options. Beyond this, FIGS. 25A and 25B reveal that any of the above described embodiments of FIGS. 11 to 16 may be combined with each other. Even further, FIGS. 25A and 25B reveal that any of the above embodiments of FIGS. 12 to 16, or any combination thereof, may be extended by a further interspersed packet, subsequently explained with payloadType=184. As already described above, an extension described below with respect to payloadType=183 ends-up in the possibility that any interspersed packets may have incorporated thereinto common slice header data for slice headers of slices encoded into any payload packet belonging to its scope.

The tables in the following figures define SEI messages which may be used on slice or sub-picture level. A region of interest SEI message is also presented which may be used on sub-picture and access unit level.

FIG. 26, for example, shows an example for a sub-picture buffering SEI message occurring whenever a slice prefix NAL unit of NAL unit type 24 has an SEI message type 180 contained therein, thus forming a timing control packet.

The semantics could be defined as follows:

seq_parameter_set_id specifies the sequence parameter set that contains the sequence HRD attributes. The value of seq_parameter_set_id shall be equal to the value of seq_parameter_set_id_in the picture parameter set referenced by the primary coded picture associated with the buffering period SEI message. The value of seq_parameter_set_id shall be in the range of 0 to 31, inclusive.

initial_cpb_removal_delay[SchedSelIdx] and initial_alt_cpb_removal_delay[SchedSelIdx] specify the initial CPB removal delays for the SchedSelIdx-th CPB of the decoding unit (the sub-picture). The syntax elements have a length in bits given by initial_cpb_removal_delay_length_minus1+1, and are in units of a 90 kHz clock. The values of the syntax elements shall not be equal to 0 and shall not exceed 90000*(CpbSize[SchedSelIdx]÷BitRate[SchedSelIdx]), the time-equivalent of the CPB size in 90 kHz clock units.

Over the entire coded video sequence, the sum of initial_cpb_removal_delay[SchedSelIdx] and initial_cpb_removal_delay offset[SchedSelIdx] per decoding unit (sub-picture) shall be constant for each value of SchedSelIdx, and the sum of initial_alt_cpb_removal_delay [SchedSelIdx] and initial_alt_cpb_removal_delay offset [SchedSelIdx] shall be constant for each value of SchedSelIdx.

FIG. 27 shows likewise an example for a sub-picture timing SEI message, wherein the semantics could be described as follows:

du_cpb_removal_delay specifies how many clock ticks to wait after removal from the CPB of the decoding unit (sub-picture) associated with the most recent sub-picture buffering period SEI message in a preceding access unit in the same decoding unit (sub-picture), if present, otherwise associated with the most recent buffering period SEI message in a preceding access unit, before removing from the buffer the decoding unit (sub-picture) data associated with the sub-picture timing SEI message. This value is also used to calculate an earliest possible time of arrival of decoding unit (sub-picture) data into the CPB for the HSS (Hypothetical Stream Scheduler [2]0). The syntax element is a fixed length code whose length in bits is given by cpb_removal_delay_length_minus1+1. The cpb_removal_delay is the remainder of a modulo $2^{(cpb\_removal\_delay\_length\_minus1+1)}$ counter.

du_dpb_output_delay is used to compute the DPB output time of the decoding unit (sub-picture). It specifies how many clock ticks to wait after removal of the decoded decoding unit (sub-picture) from the CPB before the decoding unit (sub-picture) of picture is output from the DPB.

Note that this allows for sub-picture updates. In such a scenario, the non-updated decoding units may remain unchanged of the last decoded picture, i.e. they remain visible.

Summarizing FIGS. 26 and 27 and transferring the specific details contained therein onto the embodiment of FIGS. 12 to 14, it may be said that the decoder buffer retrieval time for a decoding unit may be signaled in the associated timing control packet in a differentially coded manner, namely incrementally relative to another decoding buffer retrieval time. That is, in order to obtain the decoder buffer retrieval time for a certain decoding unit, a decoder receiving the video data stream adds the decoder retrieval time obtained from the timing control packet prefixing the certain decoding unit, to the decoder retrieval time of the immediately preceding decoding unit, i.e. the one preceding the certain decoding unit, and proceeding in this manner with the following decoding units. At the beginnings of coded video sequences of several pictures each or parts thereof, a timing control packet may additionally or alternatively comprise a decoder buffer retrieval time value coded absolutely rather than differentially relative to any preceding decoding unit's decoder buffer retrieval time.

FIG. 28 shows how the sub-picture slice info SEI message may look like. The semantics could be defined as follows:

slice_header_data _flag with a value of 1 indicates that slice header data is present in the SEI message. The slice header data provided in the SEI is valid for all slices following in decoding order until the end of the access unit, the occurrence of slice data in another SEI message, slice NAL unit or slice prefix NAL unit.

FIG. 29 shows an example for a sub-picture tile info SEI message, wherein the semantics could be defined as follows:

tile_priority indicates the priority of all tiles in the prefixed slices following in decoding order. The value of the priority shall be in the range of 0 to 7 inclusively, where 7 indicates the highest priority.

multiple_tiles_in_prefixed_slices_flag with a value of 1 indicates that there are more than 1 tiles in the prefixed slices to follow in decoding order. multiple_tiles_in_prefixed_slices_flag with a value of 0 indicates that the following prefixed slices contain only one tile.

num_tiles_in_prefixed_slices_minus1 indicates the number of tiles in the prefixed slices following in decoding order.

first_tile_id_in_prefixed_slices indicates the tile_id of the first tile in the prefixed slices following in decoding order.

That is, the embodiment of FIG. 16 could be implemented using the syntax of FIG. 29 for realizing the tile identification packets mentioned in FIG. 16. As shown therein, a certain flag, here multiple_tiles_in_prefixed_slices_flag, may be used to signal within the interspersed tile identification packet whether merely one tile or more than one tile is covered by any sub-portion of the current picture 18 encoded into any of the payload packets belonging to the scope of the respective interspersed tile identification packet. If the flag signals the overlaying of more than one tile, a further syntax element is contained in the respective interspersed packet, here exemplarily num_tiles_in_prefixed_slices_minus1 indicating the number of tiles overlaid by any sub-portion of any payload packet belonging to the scope of the respective interspersed tile identification packet. Finally, a further syntax element, here exemplarily first_tile_id_in_prefixed_slices, indicates the ID of the tile among the number of tiles indicated by the current interspersed tile identification packet, which is the first in accordance with the decoding order. Transferring the syntax of FIG. 29 onto the embodiment of FIG. 16, the tile identification packet 72 prefixing the fifth payload packet 32 could, for example, have all three just-discussed syntax elements with multiple_tiles_in_prefixed_slices_flag being set to 1, num_tiles_in_prefixed_slices_minus1 being set to 1, thereby indicating that two tiles belong to the current scope, and first tile_id_in_prefixed_slices being set to 3, indicating that the run of tiles in decoding order belonging to the scope of the current tile identification packet 72 starts at the third tile (having tile_id=2).

FIG. 29 also reveals that a tile identification packet 72 may possibly also indicate a tile_priority, i.e. a priority of the tiles belonging to its scope. Similar to the ROI aspect, the network entity 68 may use such priority information to control transmission tasks such as the request for retransmissions of certain payload packets.

FIG. 30 shows a syntax example for a sub-picture tile dimension info SEI message, wherein the semantics could be defined as:

multiple_tiles_in_prefixed_slices_flag with a value of 1 indicates that there are more than 1 tiles in the prefixed slices to follow in decoding order. multiple_tiles_in_prefixed_slices_flag with a value of 0 indicates that the following prefixed slices contain only one tile.

num_tiles_in_prefixed_slices_minus1 indicates the number of tiles in the prefixed slices following in decoding order.

tile_horz_start[i] indicates the start in horizontal direction of the i-th tile in pixels within the picture.

tile_width[i] indicates the width of the i-th tile in pixels within the picture.

tile_vert_start[i] indicates the start in horizontal direction of the i-th tile in pixels within the picture.

tile_height[i] indicates the height of the i-th tile in pixels within the picture.

Note that the tile dimension SEI message may be used to in display operations, e.g., for assigning a tile to a screen in multiple screen display scenario.

FIG. 30 thus reveals that the implementation syntax example of FIG. 29 with regard to the tile identification packets of FIG. 16 may be varied in that the tiles belonging to the scope of the respective tile identification packet are indicated by their location within the current picture 18 rather than their tile ID. That is, rather than signaling the tile ID of the first tile in decoding order covered by the respective sub-portions encoded into any of the payload packet belonging to the scope of the respective interspersed tile identification packet, for each tile belonging to the current tile identification packet, its position could be signaled by signaling, for example, the upper left corner position of each tile i, here exemplarily by tile_horz_start and tile_vert_start, and the width and height of tile i, here exemplarily by tile_width and tile_height.

A syntax example for a region of interest SEI message is shown in FIG. 31. To be even more precise, FIG. 32 shows a first variant. In particular, the region of interest SEI message may, for example, be used on access unit level or on sub-picture level to signal one or more regions of interest. In accordance with the first variant of FIG. 32, an individual ROI is signaled once per ROI SEI message, rather than signaling all ROIs of the respective ROI packet's scope within one ROI SEI message if multiple ROIs are within the current scope.

In accordance with FIG. 31, the region of interest SEI message signals each ROI individually. The semantics could be defined as follows:

roi_id indicates the identifier of the region of interest.

roi_priority indicates the priority of all tiles that belongs to the region of interest in the prefixed slices or all slices following in decoding order depending on whether the SEI message is sent on sub-picture level or access unit level. The value of roi_priority shall be in the range of 0 to 7 inclusively, where 7 indicates the highest priority. If both, roi_priority in the roi info SEI message and tile_priority in the sub-picture tile info SEI messages are given, the highest value of both is valid for the priority of the individual tiles.

num_tiles_in_roi_minus1 indicates the number of tiles in the prefixed slices following in decoding order that belong to the region of interest.

roi_tile_id[i] indicates the tile_id of the i-th tile that belongs to the region of interest in the prefixed slices following in decoding order.

That is, FIG. 31 shows that an ROI packet as shown in FIG. 15 could signal therein an ID of the region of interest which the respective ROI packet and the payload packet belonging to its scope refer to. Optionally, an ROI priority index may be signaled along with the ROI ID. However, both syntax elements are optional. Then, a syntax element num_tiles_in_roi_minus1 may indicate the number of tiles in the scope of the respective ROI packet belonging to the respective ROI 60. Then, roi_tile_id_indicates the tile-ID of the i-th tiles belonging to the ROI 60. Imagine, for example, picture 18 would be subdivided into tiles 70 in the way shown in FIG. 16, and that the ROI 60 of FIG. 15 would correspond to the left-hand half of picture 18, would be formed by the first and third tile in decoding order. Then, a ROI packet may be placed in front of the first payload packet 32 of access unit 30 in FIG. 16, followed by a further ROI packet between the fourth and fifth payload packets 32 of this access unit 30. Then, the first ROI packet would have num_tile_in_roi_minus1 be set to 0 with roi_tile_id[0] being 0 (thereby referring to the first tile in decoding order), wherein the second ROI packet in front of the fifth payload packet 32 would have num_tiles_in_roi_minus1 being set to 0 with roi_tile_id[0] being set to 2 (thereby denoting the third tile in decoding order at the left-hand bottom quarter of picture 18).

According to the second variant, the syntax of a region of interest SEI message could be as shown in FIG. 32. Here, all ROIs in a single SEI message are signaled. In particular, the same syntax as discussed above with respect to FIG. 31 would be used, but multiplying the syntax elements for each of ROIs of a number of ROIs which the respective ROI SEI message or ROI packet refers to, with a number being signaled by a syntax element, here exemplarily num_rois_minus1. Optionally, a further syntax element, here exemplarily roi_presentation_on_separate_screen, could signal for each ROI whether the respective ROI is suitable for being presented on a separate screen.

The semantic could be as follows:

num_rois_minus1 indicates the number of ROIs in the prefixed slices or regular slices following in decoding order.

roi_id[i] indicates the identifier of the i-th region of interest.

roi_priority[i] indicates the priority of all tiles that belongs to the i-th region of interest in the prefixed slices or all slices following in decoding order depending on whether the SEI message is sent on sub-picture level or access unit level. The value of roi_priority shall be in the range of 0 to 7 inclusively, where 7 indicates the highest priority. If both, roi_priority in the roi_info SEI message and tile_priority in the sub-picture tile info SEI messages are given, the highest value of both is valid for the priority of the individual tiles.

num_tiles_in_roi_minus1[i] indicates the number of tiles in the prefixed slices following in decoding order that belong to the i-th region of interest.

roi_tile_id[i][n] indicates the tile_id of the n-th tile that belongs to the i-th region of interest in the prefixed slices following in decoding order.

roi_presentation_on_seperate_screen[i] indicates that the region of interest, associated with the i-th roi_id is suitable for presentation on a separate screen.

Thus, briefly summarizing the various embodiments described so far, an additional high level syntax signaling strategy has been presented which allows to apply SEI messages as well as additional high level syntax items beyond the ones included in the NAL unit header on a per slice level. Therefore, we described the slice prefix NAL unit. The syntax and semantics of the slice prefix and slice_level/sub-picture SEI messages has been described along with use cases for low delay/sub-picture CPB operations, tile signaling and ROI signaling. An extended syntax has been presented to signal part of the slice header of following slices in the slice prefix additionally.

For the sake of completeness, FIG. 33 shows a further example for a syntax which could be used for a timing control packet according to the embodiment of FIGS. 12 to 14. The semantics could be:

du_spt_cpb_removal_delay_increment specifies the duration, in units of clock sub-ticks, between the nominal CPB times of the last decoding unit in decoding order in the current access unit and the decoding unit associated with the decoding unit information SEI message. This value is also used to calculate an earliest possible time of arrival of decoding unit data into the CPB for the HSS, as specified in Annex C. The syntax element is represented by a fixed length code whose length in bits is given by du_cpb_removal_delay_increment_length_minus1+1. When the decoding unit associated with the decoding unit information SEI message is the last decoding unit in the current access unit, the value of du_spt_cpb_removal_delay_increment shall be equal to 0.

dpb_output_du_delay_present_flag equal to 1 specifies the presence of the pic_spt_dpb_output_du_delay syntax element in the decoding unit information SEI message. dpb_output_du_delay_present_flag equal to 0 specifies the absence of the pic_spt_dpb_output_du_delay syntax element in the decoding unit information SEI message.

pic_spt_dpb_output_du_delay is used to compute the DPB output time of the picture when SubPicHrdFlag is equal to 1. It specifies how many sub clock ticks to wait after removal of the last decoding unit in an access unit from the CPB before the decoded picture is output from the DPB. When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.

It is a requirement of bitstream conformance that all decoding unit information SEI messages that are associated with the same access unit, apply to the same operation point, and have dpb_output_du_delay_present_flag equal to 1 shall have the same value of pic_spt_dpb_output_du_delay. The output time derived from the pic_spt_dpb_output_du_delay of any picture that is output from an output timing conforming decoder shall precede the output time derived from the pic_spt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, an TRAP picture with NoRaslOutputFlag equal to 1 that has no_output_of_prior_pics flag equal to 1 or inferred to be equal to 1, the output times derived from pic_spt_dpb_output_du_delay shall be increasing with increasing value of PicOrderCntVal relative to all pictures within the same CVS. For any two pictures in the CVS, the difference between the output times of the two pictures when SubPicHrdFlag is equal to 1 shall be identical to the same difference when SubPicHrdFlag is equal to 0.

Further, FIG. 34 shows a further example for signaling an ROI region using ROI packets. In accordance with FIG. 34, the syntax of an ROI packet comprises merely one flag indicating whether all sub-portions of picture 18 encoded into any payload packet 32 belonging to its scope belongs to the ROI or not. The "scope" extends up to the occurrence of the ROI packet or region_refresh_info SEI message. If the flag is 1, the region is indicated as being encoded into a respective subsequent payload packet(s), and if 0 the opposite applies, i.e. the respective sub-portions of picture 18 do not belong to the ROI 60.

Before discussing some of the above embodiments again in other words with additionally explaining some terms used above such as tile, slice and WPP sub-stream sub-divisioning, it should be noted that the above embodiments High Level signaling may alternatively be defined in transport specifications such as [3-7]. In other words, the packets mentioned above and forming sequence 34 may be transport packets some of which having the application layer's sub-portions such as slices, incorporated, such as packetized in full or fragmented, thereinto, some being interspersed between the latter in the manner, and with the aim, discussed above. In other words, above-mentioned interspersed packets are not restricted to be defined as SEI massages of other types of NAL units, defined in the application layer's video codec, but could alternatively be extra transport packet defined in transport protocols.

In other words, in accordance with one aspect of the present specification, above embodiments revealed a video data stream having video content encoded therein in units of sub-portions (see coding tree blocks or slices) of pictures of the video content, each sub-portion being respectively encoded into one or more payload packets (see VCL NAL units) of a sequence of packets (NAL units) of the video data stream, the sequence of packets being divided into a sequence of access units so that each access unit collects the payload packets relating to a respective picture of the video content, wherein the sequence of packets has interspersed thereinto timing control packets (slice prefix) so that the timing control packets subdivide the access units into decoding units so that at least some access units are subdivided into two or more decoding units, with each timing control packet signaling a decoder buffer retrieval time for a decoding unit, the payload packets of which follow the respective timing control packet in the sequence of packets.

As described above, the domain with respect to which the video content is encoded into the data stream in units of sub-portions of pictures, may cover the syntax elements relating to predictive coding such as coding modes (such as intra mode, inter mode, sub-division information and the like), prediction parameters (such as motion vectors, extrapolation directions or the like) and/or residual data (such as transform coefficient levels, with these syntax elements being associated with local portions of the picture such as coding tree blocks, prediction blocks and residual (such as transform) blocks, respectively.

As described above, the payload packets may each encompass one or more slices (in complete, respectively). The slices may be independently decodable or may show interrelations which hinder an independent decoding thereof. For example, entropy slices may be independently entropy decodable, but prediction beyond the slice boundaries may be prohibited. Dependent slices may allow for WPP processing, i.e. coding/decoding using entropy and predictive coding beyond the slice boundaries with the ability of parallelly coding/decoding the dependent slices in a time overlapping manner with, however, a staggered commence of the coding/decoding procedure of the individual dependent slices and the slice/slices referred to by the dependent slices.

The sequential order at which the payload packets of an access unit are arranged within the respective access unit may be known to the decoder in advance. For example, a coding/decoding order may be defined among the sub-portions of the pictures such as the scanning order among the coding tree blocks in the above examples.

Figure 35:
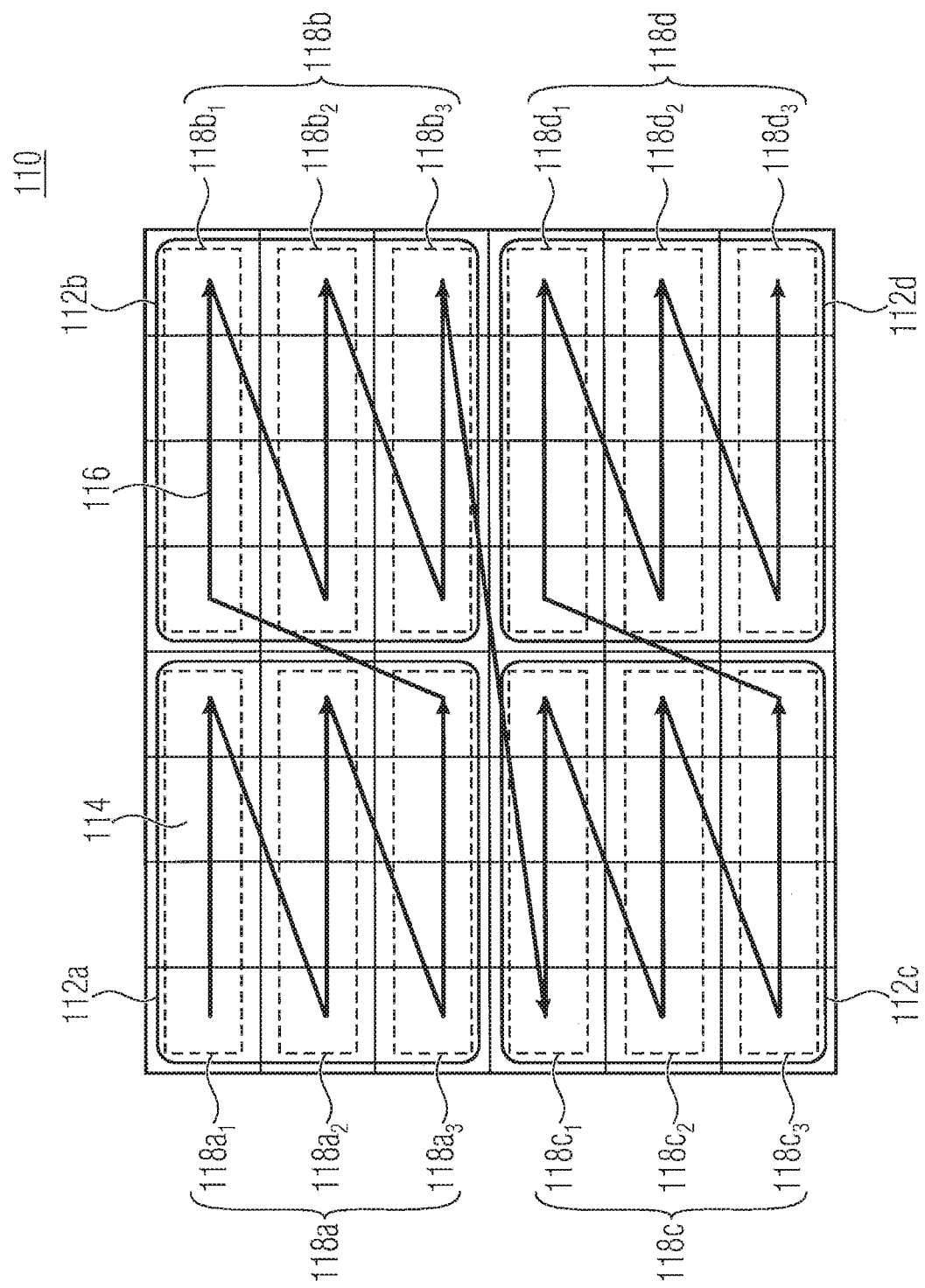
FIGS. 35 to 38 show possible subdivisions of a picture in accordance with different subdivision settings in accordance with an embodiment.
Figure 36:
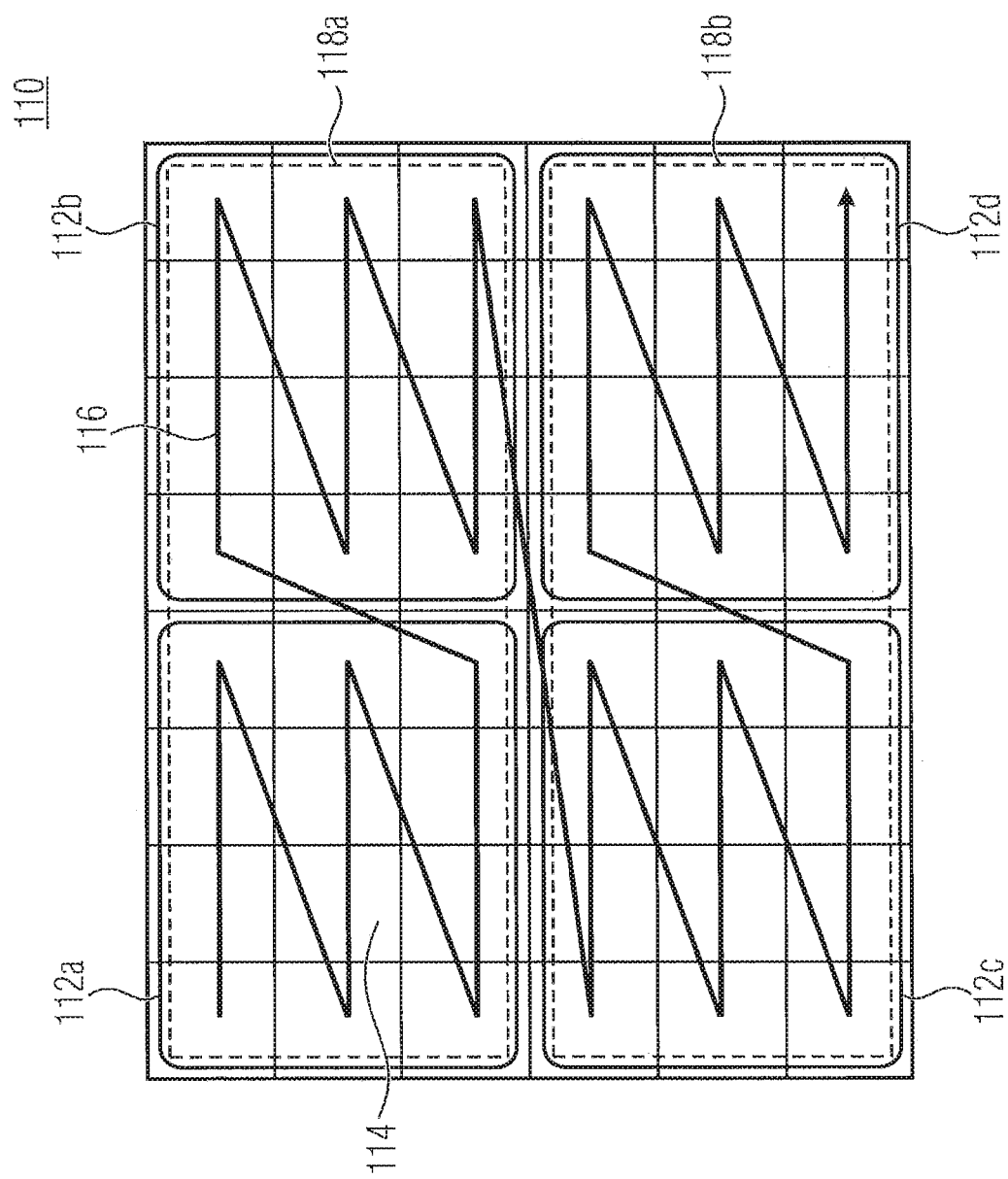

See, for example, the figure below. A currently coded/decoded picture 100 may be divided into tiles which, in FIGS. 35 and 36, for example, exemplarily correspond to the four quadrants of the picture 110 and are indicated with reference signs 112a-112d. That is, the whole picture 110 may form one tile as in case of FIG. 37 or may be segmented into more than one tile. The tile segmentation may be restricted to regular ones in which the tiles are arranged in columns and rows only. Different examples are presented below.

As can be seen, the picture 110 is further subdivided into coding (tree) blocks (small boxes in the figure and called CTB above) 114 among which a coding order 116 is defined (here, raster scan order, but may also be different). The picture's sub-division into the tiles 112a-d may be restricted so that tiles are disjoint sets of the blocks 114. Additionally, both blocks 114 and tiles 112a-d may be restricted to a regular arrangement in columns and rows.

If tiles (i.e. more than one) are present, then the (de) coding order 116 raster scans a first complete tile first with then transitioning—also in a raster scan tile order—to the next tile in tile order.

As tiles are en/decodable independent from each other due to the non-crossing of tile boundaries by spatial predictions and context selections deduced from spatial neighborhood, encoder 10 and decoder 12 may encode/decode a picture sub-divided into tiles 112 (formerly indicated by 70), in parallel, independent from each other—except for, for example, an in-loop or post-filtering which may be allowed to cross tile boundaries.

Figure 37:
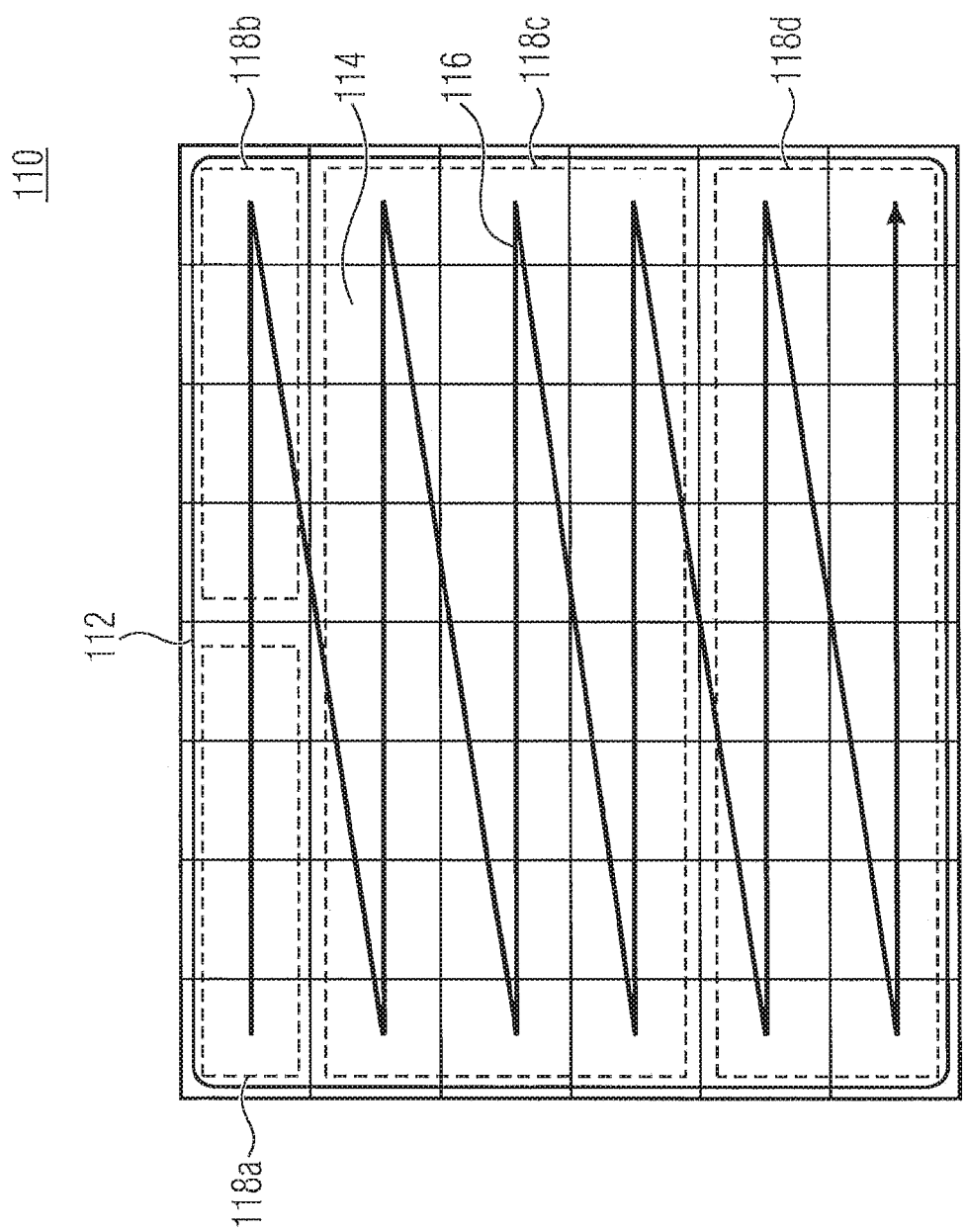

The picture 110 may further be subdivided into slices 118a-d, 180—formerly indicated using reference sign 24. A slice may contain merely a part of a tile, one complete tile or more than one tiles in complete. Thus, the division into slices may also subdivide tiles as in case of FIG. 35. Each slice comprises at least one coding block 114 in complete and is composed of consecutive coding blocks 114 in coding order 116 so that an order is defined among the slices 118a-d following which the indices in the figure have been assigned. The slice division in FIGS. 35 to 37 has been chosen for illustration purposes only. The tile boundaries may signaled in the data stream. The picture 110 may form a single tile as depicted in FIG. 37.

Encoder 10 and decoder 12 may be configured to obey tile boundaries in that spatial prediction is not applied across tile boundaries. The context adaptation, i.e. probability adaptations of the various entropy (arithmetic) contexts may continue over whole slices. However, whenever a slice crosses—along coding order 116—a tile boundary (if present within the inner of a slice) such as in FIG. 36 with regard to slices 118a,b, then the slice is, in turn, subdivided into subsections (substreams or tiles) with the slice comprising pointers (c.p. entry_point_offset) pointing to the beginnings of each subsection. In decoder-loop filters may be allowed to cross tile boundaries. Such filters may involve one or more of a deblocking filter, a Sample Adaptive Offset (SAO) filter and an Adaptive loop filter (ALF). The latter may be applied over tile/slice boundaries if activated.

Figure 38:
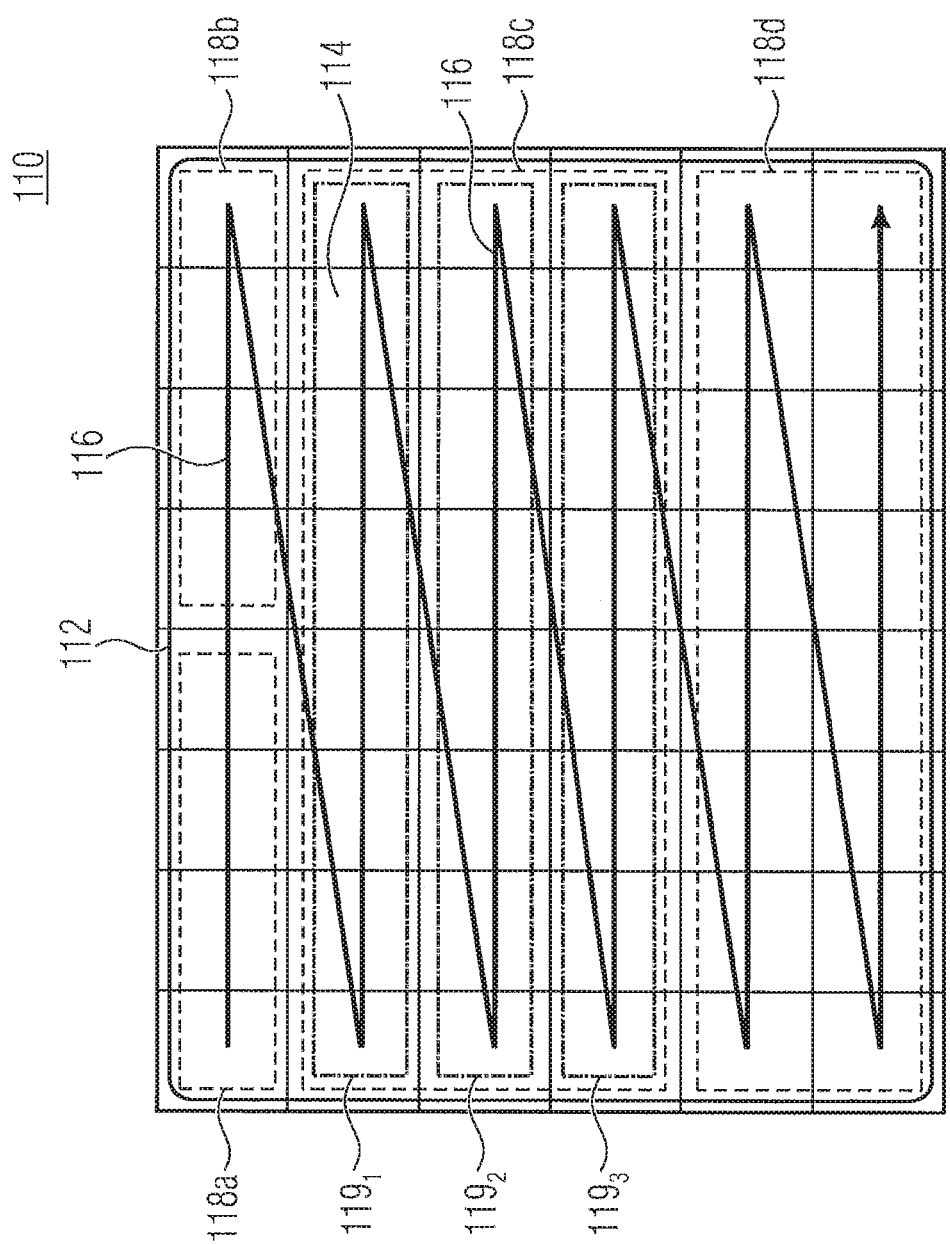
Figure 39:
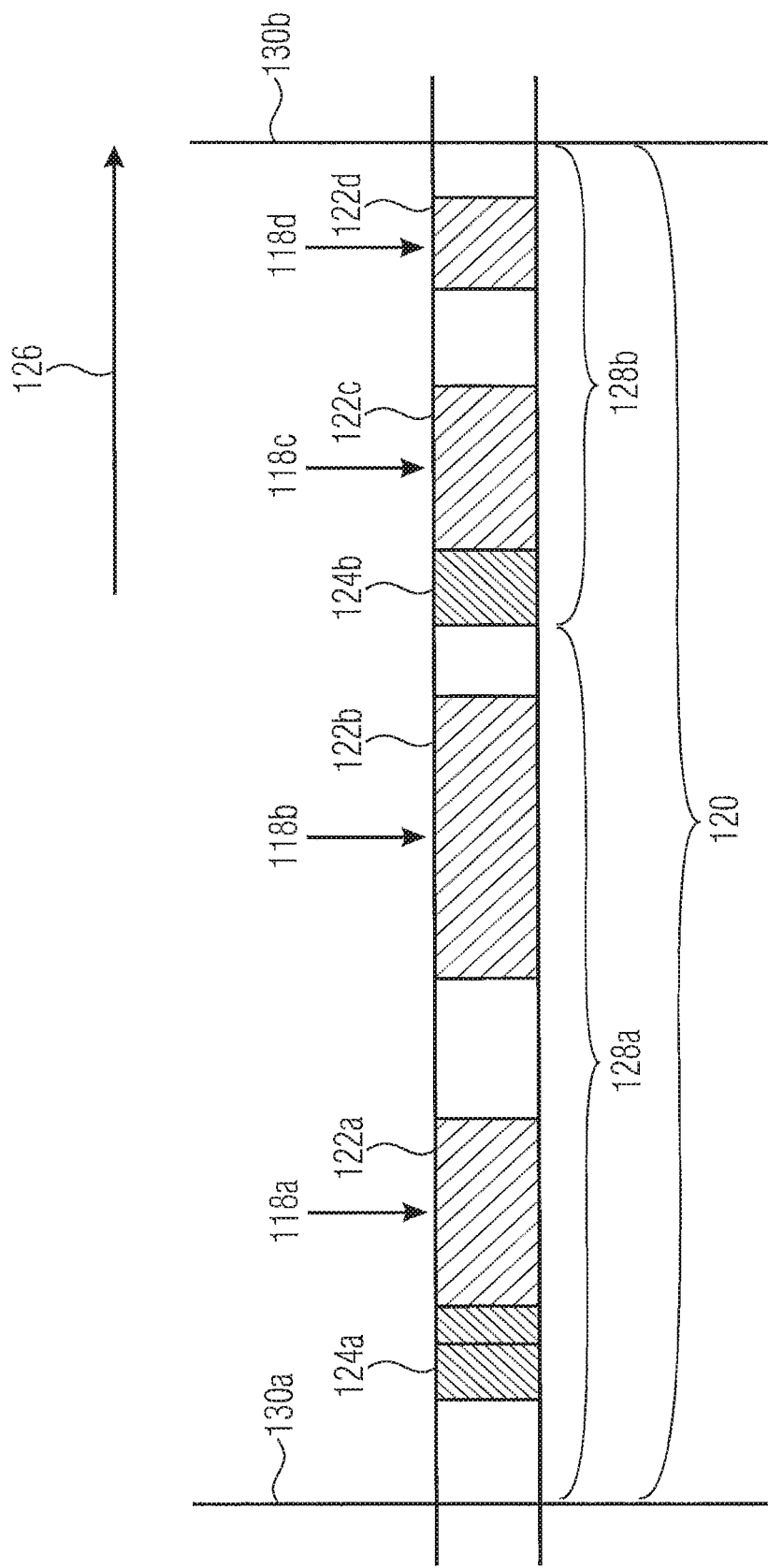
FIG. 39 shows an example of a portion out of a video data stream in accordance with an embodiment using timing control packets being interspersed between the payload packets of an access unit.

Each optional second and following subsections may have their beginning positioned byte-aligned within the slice with the pointer indicating the offset from beginning of one subsection to the beginning to the next subsection. The subsections are arranged within slices in the scan order 116. FIG. 38 shows an example with slice 180c of FIG. 37 being exemplarily subdivided into subsections $119_i$.

With regard to the figures it is noted that slices forming subparts of tiles do not have to end with the row in the tile 112a. See, for example slice 118a in FIGS. 37 and 38.

The figure below shows an exemplary portion of a data stream relating to an access unit associated with the picture 110 of the above FIG. 38). Here, each payload packet 122a-d —formerly indicated by reference sign 32—exemplarily accommodates merely one slice 118a. Two timing control packets 124a,b—formerly indicated by reference sign 36—are shown as being interspersed into the access unit 120 for illustration purposes: 124a precedes packet 122a in packet order 126 (corresponding to de/encoding time axis) and 124b precedes packet 122c. Accordingly, access unit 120 is divided into two decoding units 128a,b formerly indicated by reference sign 38—, the first one of which comprises packets 122a,b (along with optional filler data packets (succeeding the first and second packets 122a, b, respectively) and optional access unit leading SEI packets (preceding the first packet 122a)) and the second one of which comprises packets 118c,d (along with optional filler data packets (succeeding packets 122c,d, respectively)).

As described above, each packet of the sequence of packets may be assigned to exactly one packet type out of a plurality of packet types (nal_unit_type). Payload packets and timing control packets (and optional filler data and SEI packets) are, for example, of different packet types. The instantiations of packets of a certain packet type in the sequence of packets may be subject to certain limitations. These limitations may define an order among the packet types (see FIG. 17) which is to be obeyed by the packets within each access unit so that access unit borders 130a,b are detectable, and remain at the same position within the sequence of packets, even if packets of any removable packet type are removed from the video data stream. For example, payload packets are of the non-removable packet type. However, timing control packets, filler data packets and SEI packets may, as discussed above, be of the removable packet type, i.e. they may be non-VCL NAL units.

In the above example, timing control packets have explicitly been exemplified above by the syntax of slice_prefix_rbsp( ).

Using such an interspersing of timing control packets, an encoder is enabled to adjust the buffering scheduling at the decoder side during the course of encoding the individual pictures of the video content. For example, the encoder is enabled to optimize the buffer scheduling to minimize the end-to-end delay. In this regard, the encoder is enabled to take the individual distribution of coding complexness across the picture area of the video content for the individual pictures of the video content into account. In particular, the encoder may continuously output the sequence of packets 122, 122a-d, $122a\text{-}d_{1\text{-}3}$ on a packet-by-packet basis (i.e. as soon as a current packet has been finalized it is output). By use of the timing control packets, the encoder is able to adjust the buffer scheduling at the decoding side at moments where some of the sub-portions of the current picture have already been encoded into respective payload packets with remaining sub-portions, however, not yet having been encoded.

Accordingly, an encoder for encoding into a video data stream video content in units of sub-portions (see coding tree blocks, tiles or slices) of pictures of the video content, with respectively encoding each sub-portion into one or more payload packets (see VCL NAL units) of a sequence of packets (NAL units) of the video data stream so that the sequence of packets is divided into a sequence of access units and each access unit collects the payload packets relating to a respective picture of the video content, may be configured to intersperse into the sequence of packets timing control packets (slice prefix) so that the timing control packets subdivide the access units into decoding units so that at least some access units are subdivided into two or more decoding units, with each timing control packet signaling a decoder buffer retrieval time for a decoding unit, the payload packets of which follow the respective timing control packet in the sequence of packets.

Any decoder receiving the just-outlined video data stream is free to exploit the scheduling information contained in the timing control packet or not. However, while the decoder is free to exploit the information, a decoder conforming with the codec level is able to decode data following the indicated timing. If exploitation takes place, the decoder feeds its decoder buffer and empties its decoder buffer in units of decoding units. The "decoder buffer" may, as described above, involve the decoded picture buffer and/or the coded picture buffer.

Accordingly, a decoder for decoding a video data stream having video content encoded therein in units of sub-portions (see coding tree blocks, tiles or slices) of pictures of the video content, each sub-portion being respectively encoded into one or more payload packets (see VCL NAL units) of a sequence of packets (NAL units) of the video data stream, the sequence of packets being divided into a sequence of access units so that each access unit collects the payload packets relating to a respective picture of the video content, may be configured to look for timing control packets interspersed into the sequence of packets, subdivide the access units into decoding units at the timing control packets so that at least some access units are subdivided into two or more decoding units, derive from each timing control packet a decoder buffer retrieval time for a decoding unit, the payload packets of which follow the respective timing control packet in the sequence of packets, and retrieve the decoding units from a buffer of the decoder scheduled at times defined by the decoder buffer retrieval times for the decoding units.

Looking for the timing control packet may involve the decoder inspecting the NAL unit header and the syntax element comprised thereby, namely nal_unit_type. If the value of the latter flag equals some value, i.e. is, in accordance with the above examples, 124, then the packet currently inspected is a timing control packet. That is, the timing control packet would comprise or convey the information explained above with respect to pseudo code subpic_buffering as well as subpic_timing. That is, the timing control packets may convey or specify initial CPB removal delays for the decoder or specify how many clock ticks to wait after removal from the CPB of a respective decoding unit.

In order to allow for a repetitive transmission of the timing control packets without unintentionally further dividing the access unit into further decoding units, a flag within the timing control packets may explicitly signal whether the current timing control packet participates in the access unit subdivision into coding units or not (compare decoding unit start flag=1 indicating the start of a decoding unit, and decoding_unit_start_flag=0 signaling the opposite circumstance).

The aspect of using interspersed decoding unit related tile identification information differs from the aspect of using interspersed decoding unit related timing control packets in that tile identification packets are interspersed into the data stream. The above-mentioned timing control packets may additionally be interspersed into the data stream or the decoder buffer retrieval times may be conveyed along with the below explained tile identification information within the same packet commonly. Accordingly, details brought forward in the above section may be used in order to clarify issues in the description below.

A further aspect of the present specification derivable from the above-described embodiments reveals a video data stream having video content encoded therein, using predictive and entropy coding, in units of slices into which pictures of the video content are spatially subdivided, using a coding order among the slices, with restricting predictions of the predictive coding and/or entropy coding to the inner of tiles into which the pictures of the video content are spatially subdivided, wherein the sequence of the slices in coding order are packetized into payload packets of a sequence of packets (NAL units) of the video data stream in the coding order, the sequence of packets being divided into a sequence of access units so that each access unit collects the payload packets having packetized thereinto slices relating to a respective picture of the video content, wherein the sequence of packets has tile identification packets interspersed thereinto identifying tiles (potentially merely one) which are overlaid by slices (potentially merely one) packetized into one or more payload packets immediately following the respective tile identification packet in the sequence of packets.

See, for example, the immediately preceding figure showing a data stream. Packets 124a and 124b shall now represent tile identification packets. Either by explicit signaling (compare single_slice_flag=1) or per convention, the tile identification packet may merely identify tiles which are overlaid by slices packetized into the immediately following payload packet 122a. Alternatively, by explicit signaling or per convention, the tile identification packet 124a may identify tiles which are overlaid by slices packetized into one or more payload packets immediately following the respective tile identification packet 124a in the sequence of packets until the earlier of the end 130b of the current access unit 120, and the starting of a next decoding unit 128b, respectively. See, for example, FIG. 35: if each slice $118a$-$d_{1-3}$ was separately packetized into a respective packet $122a$-$d_{1-3}$, with the subdivision into decoding units being such that the packets are grouped into three decoding units according to $\{122a_{1-3}\}, \{122b_{1-3}\}$ and $\{122c_{1-3}, 122d_{1-3}\}$, then the slices $\{118c_{1-3}, 118d_{1-3}\}$ packetized into the packets $\{122c_{1-3}, 122d_{1-3}\}$ of the third decoding unit would, for example, overlay tiles 112c and 112d, and the corresponding slice prefix would, for example, when referring to the complete decoding unit, indicate "c" and "d", i.e. these tiles 112c and 112d.

Thus, the network entity mentioned further below may use this explicit signaling or convention in order to correctly associate each tile identification packet with one or more payload packets immediately following the identification packet in the sequence of packets. The way the identification may be signaled has exemplarily been described above by way of the pseudo code subpic_tile_info. The associated payload packets were mentioned above as "prefixed slices". Naturally, the example may be modified. For example, the syntax elements "tile_priority" may be left away. Further, the order among the syntax elements may be switched and the descriptor regarding possible bit lengths and encoding principles of the syntax elements is merely illustrative.

A network entity which receives the video data stream (i.e. a video data stream having video content encoded therein, using predictive and entropy coding, in units of slices into which pictures of the video content are spatially subdivided, using a coding order among the slices, with restricting predictions of the predictive coding and/or entropy coding to the inner of tiles into which the pictures of the video content are spatially subdivided, wherein the sequence of the slices in coding order are packetized into payload packets of a sequence of packets (NAL units) of the video data stream in the coding order, the sequence of packets being divided into a sequence of access units so that each access unit collects the payload packets having packetized thereinto slices relating to a respective picture of the video content, wherein the sequence of packets has tile identification packets interspersed thereinto) may be configured to identify, based on the tile identification packets, tiles which are overlaid by slices packetized into one or more payload packets immediately following the respective tile identification packet in the sequence of packets. The network entity may use the identification result so as to decide on transmission tasks. For example, the network entity may handle the different tiles with different priority for playback. For example, in case of packet loss those payload packets relating to tiles of higher priority may be advantageous for a retransmission over payload packets relating to tiles of lower priority. That is, the network entity may first request the retransmission of lost payload packets relating to tiles of higher priority. Merely in case of enough time being left (depending on the transmission rate) the network entity proceeds with requesting the retransmission of lost payload packets relating to tiles of lower priority. The network entity may, however, also be a playback unit which is able to assign tiles or payload packets relating to certain tiles to different screens.

With regard to the aspect of using interspersed region of interest information, it should be noted that the ROI packets mentioned below could coexist with the above mentioned timing control packets and/or tile identification packets, either by combining the information content thereof within common packets as described above with respect to the slice prefixes, or in the form of separate packets.

The aspect of using interspersed region of interest information as described above reveals, in other words, a video data stream having video content encoded therein, using predictive and entropy coding, in units of slices into which pictures of the video content are spatially subdivided, using a coding order among the slices, with restricting predictions and/or entropy coding of the predictive coding to the inner of tiles into which the pictures of the video content are divided, wherein the sequence of the slices in coding order are packetized into payload packets of a sequence of packets (NAL units) of the video data stream in the coding order, the sequence of packets being divided into a sequence of access units so that each access unit collects the payload packets having packetized thereinto slices relating to a respective picture of the video content, wherein the sequence of packets has ROI packets interspersed thereinto identifying tiles of the pictures which belong to a ROI of the pictures, respectively.

With regard to the ROI packets, similar comments are valid as those provided before with respect to the tile identification packets: the ROI packets may identify tiles of the pictures which belong to an ROI of the picture merely among those tiles which are overlaid by slices contained in the one or more payload packets which the respective ROI packet refers to by way of its immediately preceding the one or more payload packets as described above with respect to the "prefixed slices".

ROI packets may allow for identifying more than one ROI per prefixed slices with identifying the associated tiles for each of these ROIs (c.p. num_rois_minus1). Then, for each ROI, a priority may be transmitted allowing for ranking the ROIs in terms of priority (c.p. roi_priority[i]). In order to allow for a "tracking" of ROIs over time during a picture sequence of the video, each ROI may by indexed with an ROI index so that ROIs indicated in the ROI packets may be associated with each other beyond/across picture boundaries, i.e. over time (c.p. roi_id[i]).

A network entity which receives the video data stream (i.e. a video data stream having video content encoded therein, using predictive and entropy coding, in units of slices into which pictures of the video content are spatially subdivided, using a coding order among the slices, with restricting predictions of the predictive coding to the inner of tiles into which the pictures of the video content are divided, while continuing probability adaptation of the entropy coding over the whole slices, wherein the sequence of the slices in coding order are packetized into payload packets of a sequence of packets (NAL units) of the video data stream in the coding order, the sequence of packets being divided into a sequence of access units so that each access unit collects the payload packets having packetized thereinto slices relating to a respective picture of the video content) may be configured to identify, based on the tile identification packets, packets packetizing slices which overlay the tiles which belong to the ROI of the pictures.

The network entity may exploit the information conveyed by the ROI packet in a manner similar as explained above in this previous section regarding the tile identification packets.

With regard to the current section as well as the previous section, it should be noted that any network entity, such as a MANE or decoder, is able to ascertain which tile or tiles are overlaid by the slice or slices of a payload packet currently inspected, simply by surveying the slice order of the slices of the pictures and surveying the progress of the portion of the current picture these slices cover, relative to the position of the tiles in the picture, which may be explicitly signaled in the data stream as explained above or may be known to encoder and decoder by convention. Alternatively, each slice (except the first of a picture in scan order) may be provided with an indication/index (slice_address measured in units of coding tree blocks) of the first coding block (e.g. CTB) same refers to (same codes) so that the decoder may place each slice (its reconstruction) into the picture from this first coding block on into the direction of the slice order. Accordingly, it may suffice if the aforementioned tile information packets merely comprise the index of the first tile (first tile_id_in_prefixed_slices) overlaid by any slice of the associated one or more payload packets immediately following the respective tile identification packet since it is clear for the network entity upon encountering the next tile identification packet in line that if the index conveyed by the latter tile identification packet differs from the previous one by more than one, then the payload packets between those two tile identification packets cover the tiles having the tile index therebetween. This is true if, as mentioned above, both tile subdivision and coding block subdivision are, for example, based on a row/column-wise subdivision having a raster scan order defined there among which is, for both tiles and coding blocks, row-wise, for example, i.e. the tile index increases in this raster scan order as well as the slices follow each other in accordance with the slice order along this raster scan order among the coding blocks.

The aspect of packetized and interspersed slice header signaling described derivable from above embodiments is also combinable with any one of the aforementioned aspects or any combination thereof. The previously explicitly described slice prefixes, for example, in accordance with version 2 unified all these aspects. An advantage of the present aspect is the possibility of rendering slice header data more easily available for network entities as they are conveyed in self-contained packets external to prefixed slices/payload packets, and a repetitive transmission of the slice header data is enabled.

Accordingly, a further aspect of the present specification is the aspect of packetized and interspersed slice header signaling and may be, in other words, seen as revealing a video data stream having video content encoded therein in units of sub-portions (see coding tree blocks or slices) of pictures of the video content, each sub-portion being respectively encoded into one or more payload packets (see VCL NAL units) of a sequence of packets (NAL units) of the video data stream, the sequence of packets being divided into a sequence of access units so that each access unit collects the payload packets relating to a respective picture of the video content, wherein the sequence of packets has interspersed thereinto slice header packets (slice prefix) conveying slice header data for, and missing in, one or more payload packets which follow the respective slice header packet in the sequence of packets.

A network entity which receives the video data stream (i.e. a video data stream having video content encoded therein in units of sub-portions (see coding tree blocks or slices) of pictures of the video content, each sub-portion being respectively encoded into one or more payload packets (see VCL NAL units) of a sequence of packets (NAL units) of the video data stream, the sequence of packets being divided into a sequence of access units so that each access unit collects the payload packets relating to a respective picture of the video content, wherein the sequence of packets has interspersed thereinto slice header packets) may be configured to read slice header along with payload data for the slices from the packets with, however, deriving from the slice header packets slice header data and skipping reading the slice header for one or more payload packets which follow the respective slice header packet in the sequence of packets, but adopting the slice header derived from the slice header packet which the one or more payload packets follow, instead.

As was true with the above mentioned aspects, it is possible that the packets, here the slice header packets, may also have the functionality of indicating to any network entity such as a MANE or decoder, the beginning of a decoding unit or a beginning of runs of the one or more payload packets prefixed by the respective packet. Accordingly, the network entity in accordance with the present aspect may identify the payload packets for which reading the slice header has to be skipped based on the aforementioned syntax elements in this packet, namely single_slice_flag, in combination with, for example, decoding_unit_start_flag, among which the latter flag enables, as discussed above, a retransmission of copies of certain slice header packets within decoding units. This is useful, for example, as the slice header of the slices within one decoding unit may change along the sequence of slices, and accordingly, while slice header packets at the beginning of decoding units may have the decoding_unit_start_flag set (being equal to one), slice header packets positioned therebetween may have this flag not set, so as to prevent any network entity from falsely interpreting the occurrence of this slice header packet as a beginning a new decoding unit.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive video data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Thomas Wiegand, Gary J. Sullivan, Gisle Bjontegaard, Ajay Luthra, "Overview of the H.264/AVC Video Coding Standard", IEEE Trans. Circuits Syst. Video Technol., vol. 13, N7, July 2003.
[2] JCT-VC, "High-Efficiency Video Coding (HEVC) text specification Working Draft 7", JCTVC-I1003, May 2012.
[3] ISO/IEC 13818-1: MPEG-2 Systems specification.
[4] IETF RFC 3550—Real-time Transport Protocol.
[5] Y.-K. Wang et al., "RTP Payload Format for H.264 Video", IETF RFC 6184, http://tools.ietf.org/html/[6]
[6] S. Wenger et al., "RTP Payload Format for Scalable Video Coding", IETF RFC 6190, http://tools.ietf.org/html/rfc6190
[7] T. Schierl et al., "RTP Payload Format for High Efficiency Video Coding", IETF internet draft, http://datatracker.ietforg/doc/draft-schierl-payload-rtp-h265/

What is claimed is:

1. An apparatus for decoding a data stream to reconstruct video content, comprising:
a decoder configured for
extracting, from the data stream, a sequence of packets, representing sub-portions of the video content and organized into a plurality of access units, wherein each of the plurality of access units relates to a picture of the video content and includes one or more decoding units and each of the decoding units includes at least one payload packet, and each of the sub-portions corresponds to a slice, the extracting including entropy decoding of slices across slice boundaries in accordance with a wavefront parallel processing technique;
identifying, in each of the plurality of access units, one or more timing control packets corresponding to the one or more decoding units, respectively, and interspersed in the access unit, wherein each of the timing control packets is indicative of a decoder buffer retrieval time by which content of the corresponding decoding unit is to be retrieved from a buffer;
retrieving, from the buffer, the content of each decoding unit in accordance with a decoder buffer retrieval time associated with the decoding unit, wherein each packet of the sequence of packets includes a packet type field in a packet header of the respective packet, the packet type field for the at least one payload packet being different than the packet type field for the one or more timing control packets; and
decoding the one or more decoding units using predictive decoding to reconstruct the video content.

2. The apparatus of claim 1, wherein the at least one payload packet is of a non-removable packet type and each of the one or more timing control packets is of a removable packet type.

3. The apparatus of claim 1, wherein the sequence of packets includes Supplemental Enhancement Information (SEI) packets of different types, each of the SEI packets includes an SEI packet type field, wherein content of an SEI packet type field of a timing control packet differs from that of a different type of SEI packet.

4. The apparatus of claim 1, wherein the at least one payload packet includes encoded information of a sub-portion of a picture of the video content.

5. The apparatus of claim 1, wherein different types of packets in the sequence of packets are arranged in accordance with a pre-determined organization, and an organization of the packets in the sequence of packets can be determined in accordance with the pre-determined organization when one or more removable packets are removed from the sequence of packets.

6. The apparatus of claim 5, wherein the different type of SEI packet includes a Region of Interest (ROI) packet.

7. An apparatus for encoding video content into a data stream, comprising:
an encoder configured for, based on the video content,
encoding sub-portions of the video content into a sequence of packets organized into a plurality of access units, wherein each of the plurality of access units relates to a picture of the video content and includes one or more decoding units and each of the decoding units includes at least one payload packet, and each of the sub-portions corresponds to a slice, the encoding including entropy encoding of slices across slice boundaries in accordance with a wavefront parallel processing technique; and
interspersing, in each of the plurality of access units, one or more timing control packets corresponding to the one or more decoding units, respectively, wherein each timing control packets is indicative of a decoder buffer retrieval time by which content of the corresponding decoding unit is to be retrieved from a buffer,
wherein each packet of the sequence of packets includes a packet type field in a packet header of the respective packet, the packet type field for the at least one payload packet being different than the packet type field for the one or more timing control packets.

8. The apparatus of claim 7, wherein the at least one payload packet is of a non-removable packet type and each of the one or more timing control packets is of a removable packet type.

9. The apparatus of claim 7, wherein the sequence of packets includes Supplemental Enhancement Information (SEI) packets of different types, each of the SEI packets includes an SEI packet type field, wherein content of an SEI packet type field of a timing control packet differs from that of a different type of SEI packet.

10. The apparatus of claim 7, wherein the at least one payload packet includes encoded information of a sub-portion of a picture of the video content.

11. The apparatus of claim 7, wherein different types of packets in the sequence of packets are arranged in accordance with a pre-determined organization, and an organization of the packets in the sequence of packets can be determined in accordance with the pre-determined organization when one or more removable packets are removed from the sequence of packets.

12. The apparatus of claim 11, wherein the different type of SEI packet includes a Region of Interest (ROI) packet.

13. A method for decoding a data stream to reconstruct video content, comprising:
extracting, from the data stream, a sequence of packets, representing sub-portions of the video content and organized into a plurality of access units, wherein each of the plurality of access units relates to a picture of the video content and includes one or more decoding units and each of the decoding units includes at least one payload packet, and each of the sub-portions corresponds to a slice, the extracting including entropy decoding of slices across slice boundaries in accordance with a wavefront parallel processing technique;
identifying, in each of the plurality of access units, one or more timing control packets corresponding to the one or more decoding units, respectively, and interspersed in the access unit, wherein each of the timing control packets is indicative of a decoder buffer retrieval time by which content of the corresponding decoding unit is to be retrieved from a buffer;
retrieving, from the buffer, the content of each decoding unit in accordance with a decoder buffer retrieval time associated with the decoding unit, wherein each packet of the sequence of packets includes a packet type field in a packet header of the respective packet, the packet type field for the at least one payload packet being different than the packet type field for the one or more timing control packets; and
decoding the one or more decoding units using predictive decoding to reconstruct the video content.

14. The method of claim 13, wherein the at least one payload packet is of a non-removable packet type and each of the one or more timing control packets is of a removable packet type.

15. The method of claim 13, wherein the sequence of packets includes Supplemental Enhancement Information (SEI) packets of different types, each of the SEI packets includes an SEI packet type field, wherein content of an SEI packet type field of a timing control packet differs from that of a different type of SEI packet.

16. The method of claim 13, wherein the at least one payload packet includes encoded information of a sub-portion of a picture of the video content.

17. The method of claim 13, wherein different types of packets in the sequence of packets are arranged in accordance with a pre-determined organization, and an organization of the packets in the sequence of packets can be determined in accordance with the pre-determined organization when one or more removable packets are removed from the sequence of packets.

18. The method of claim 17, wherein the different type of SEI packet includes a Region of Interest (ROI) packet.

\* \* \* \* \*